(12) United States Patent
Galyuk

(10) Patent No.: US 12,157,072 B2
(45) Date of Patent: Dec. 3, 2024

(54) SELECTIVE EXTRACTION OF CANNABINOIDS, PIGMENTS, AND LIPIDS FROM PLANT MATTER

(71) Applicant: CAPNA IP CAPITAL, LLC, Studio City, CA (US)

(72) Inventor: Yevgeniy Galyuk, Sherman Oaks, CA (US)

(73) Assignee: Capna®IP Capital, LLC, Ventura, CA (US)

( * ) Notice: Subject to any disclaimer, the term of this patent is extended or adjusted under 35 U.S.C. 154(b) by 723 days.

(21) Appl. No.: 16/717,313

(22) Filed: Dec. 17, 2019

(65) Prior Publication Data
US 2020/0188812 A1 Jun. 18, 2020

Related U.S. Application Data

(60) Continuation-in-part of application No. PCT/US2018/016130, filed on Jan. 31, 2018, and a division of application No. 15/488,341, filed on Apr. 14, 2017, now Pat. No. 10,035,081.

(51) Int. Cl.
*B01D 11/02* (2006.01)
*B01D 11/04* (2006.01)
*C11B 9/02* (2006.01)
*F25B 7/00* (2006.01)

(52) U.S. Cl.
CPC ........ *B01D 11/0219* (2013.01); *B01D 11/028* (2013.01); *B01D 11/0288* (2013.01); *B01D 11/0292* (2013.01); *B01D 11/0296* (2013.01); *B01D 11/0492* (2013.01); *C11B 9/025* (2013.01); *F25B 7/00* (2013.01)

(58) Field of Classification Search
CPC .............. B01D 11/028; B01D 11/0219; B01D 11/0288; B01D 11/0292; B01D 11/0296; B01D 11/0492; C11B 9/025; F25B 7/00
See application file for complete search history.

(56) References Cited

U.S. PATENT DOCUMENTS 7,700,368 B2 * 4/2010 Flockhart ................ A61P 25/06
  436/177
2017/0360861 A1 * 12/2017 Humphreys ......... A61K 31/352

* cited by examiner

*Primary Examiner* — Sean E Conley
(74) *Attorney, Agent, or Firm* — Patnstr®, APC; T Brody; Peter Jon Gluck, Esq.

(57) ABSTRACT

A system, machine, and methods for selectively extracting chemicals from plant material without co-extracting chlorophyll, lipids and other undesirable constituents from plants, is described here. Extraction uses super-cooled solvents, such as 100% ethanol. The system and method provides plant extracts that are enriched in active compounds, and depleted in chlorophyll.

19 Claims, 20 Drawing Sheets

Figure 1:
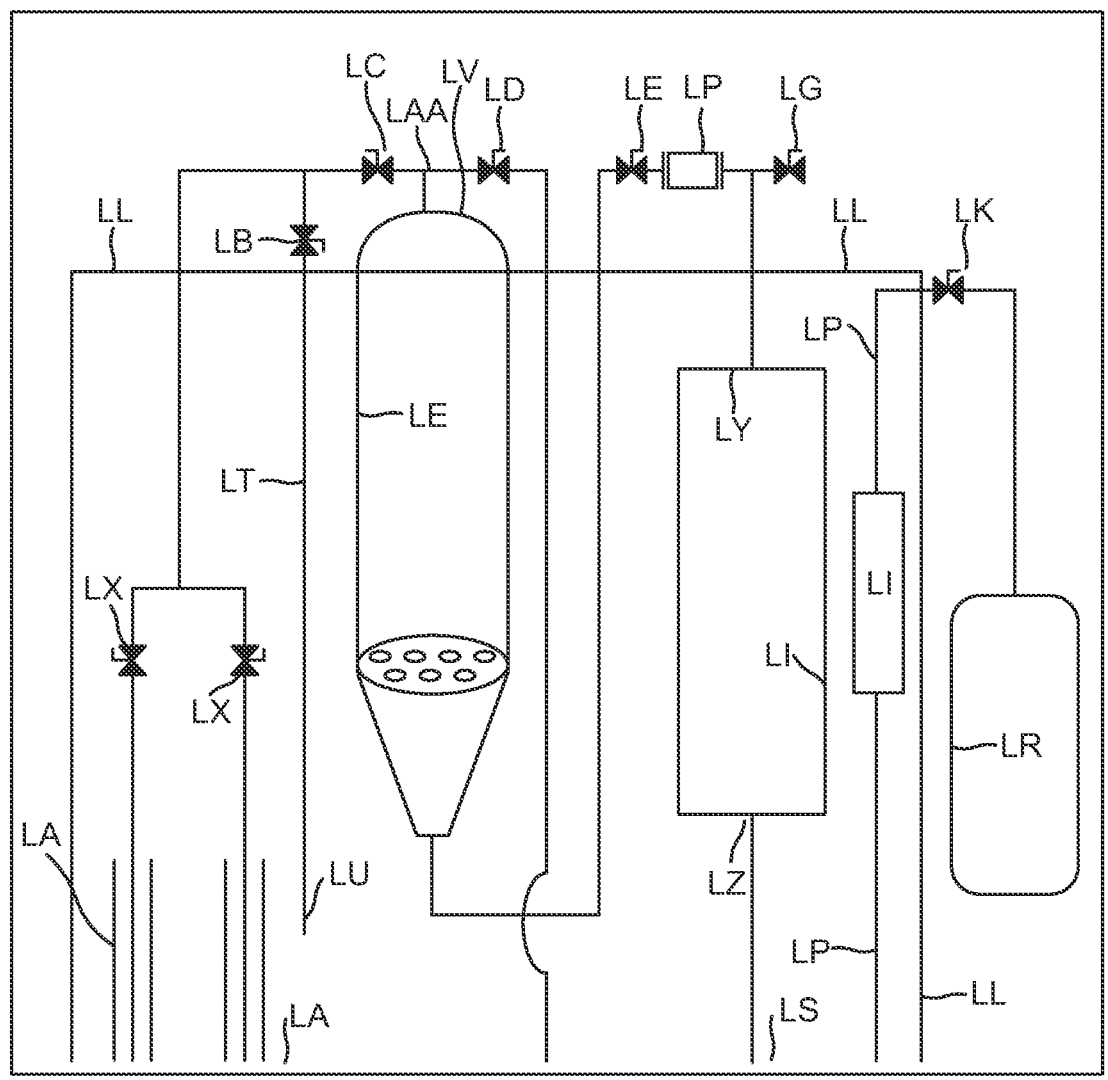

| Compound | Relative abundance (Normalized by yield) | | | | |
|---|---|---|---|---|---|
| | Peak area (Average, Normalized by yield) | | | | |
| | 0°C | -10°C | -30°C | -50°C | -70°C |
| Cannflavin A | 551844722.0 | 530840998.2 | 603554884.2 | 615602312.0 | 658438356.3 |
| Chlorophyll a | 1868714.8 | 7833612.4 | 4299975.6 | 5579636.1 | 3876571.7 |
| Linoleic acid | 520965.6 | 525460.1 | 539246.5 | 540060.4 | 562107.2 |
| Oleic acid | 11712724 | 1129012.3 | 1034150.4 | 895246.0 | 802215.7 |
| Sucrose | 1132033.6 | 1012434.7 | 692692.2 | 681396.4 | 832147.1 |
| Behenyl arachidate (C42) | 237.6 | 110.4 | 96.5 | 90.9 | 77.1 |
| Compound | Peak area (SD, Normalized by yield) | | | | |
| | 0°C | -10°C | -30°C | -50°C | -70°C |
| Cannflavin A | 2205852.1 | 2450648.3 | 10059460.6 | 7891550.4 | 19567733.7 |
| Chlorophyll a | 312405.4 | 34970.1 | 211570.3 | 109805.9 | 294745.0 |
| Linoleic acid | 30649.9 | 43361.7 | 27788.5 | 5576.2 | 25994.7 |
| Oleic acid | 44049.0 | 36724.4 | 49701.5 | 76121.2 | 13111.6 |
| Sucrose | 7502.5 | 43982.0 | 20368.5 | 37353.0 | 74150.3 |
| Behenyl arachidate (C42) | 85.9 | 10.1 | 23.7 | 26.6 | 29.9 |

FIG. 13

| Compound | Peak area (Unnormalized) | | | | |
|---|---|---|---|---|---|
| | Peak area (Average) | | | | |
| | 0°C | -10°C | -30°C | -50°C | -70°C |
| Cannflavin A | 7597062.3 | 7821057.4 | 6880525.7 | 8344814.0 | 6176154.6 |
| Chlorophyll a | 257259.7 | 115416.2 | 49019.7 | 57507.4 | 36362.2 |
| Linoleic acid | 7171.8 | 7756.5 | 6147.4 | 5566.4 | 5460.2 |
| Oleic acid | 16124.5 | 16634.1 | 11789.3 | 9227.0 | 7524.8 |
| Sucrose | 15584.3 | 14916.5 | 7900.1 | 7022.9 | 7805.5 |
| Behenyl arachidate (C42) | | | N/A | | |
| Compound | Peak area (SD) | | | | |
| | 0°C | -10°C | -30°C | -50°C | -70°C |
| Cannflavin A | 30367.2 | 36253.6 | 114677.9 | 81335.8 | 183545.3 |
| Chlorophyll a | 4300.8 | 515.2 | 2411.9 | 1131.7 | 2764.7 |
| Linoleic acid | 421.9 | 838.9 | 316.8 | 57.5 | 243.8 |
| Oleic acid | 606.4 | 541.1 | 566.6 | 784.6 | 123.0 |
| Sucrose | 104.4 | 648.0 | 232.4 | 385.0 | 695.5 |
| Behenyl arachidate (C42) | | | N/A | | |

FIG. 14

| Relative abundance (Normalized by yield) | | | | | | |
|---|---|---|---|---|---|---|
| | Peak area (Average, Normalized by yield) | | | | | |
| Compound | 0°C | -10°C | -30°C | -50°C | -70°C | |
| Cannflavin A | 1.00 | 0.96 | 1.09 | 1.12 | 1.19 | |
| Chlorophyll a | 1.00 | 0.42 | 0.23 | 0.30 | 0.21 | |
| Linoleic acid | 1.00 | 1.01 | 1.04 | 1.04 | 1.12 | |
| Oleic acid | 1.00 | 0.96 | 0.88 | 0.76 | 0.68 | |
| Sucrose | 1.00 | 0.89 | 0.61 | 0.60 | 0.74 | |
| Behenyl arachidate (C42) | 1.00 | 0.46 | 0.41 | 0.38 | 0.32 | |
| | Peak area (SD, Normalized by yield) | | | | | |
| Compound | 0°C | -10°C | -30°C | -50°C | -70°C | |
| Cannflavin A | 0.00 | 0.00 | 0.02 | 0.01 | 0.04 | |
| Chlorophyll a | 0.02 | 0.00 | 0.01 | 0.01 | 0.02 | |
| Linoleic acid | 0.06 | 0.08 | 0.05 | 0.01 | 0.05 | |
| Oleic acid | 0.04 | 0.03 | 0.04 | 0.06 | 0.01 | |
| Sucrose | 0.01 | 0.04 | 0.02 | 0.03 | 0.07 | |
| Behenyl arachidate (C42) | 0.36 | 0.04 | 0.10 | 0.11 | 0.13 | |

FIG. 15

| Compound | Relative abundance (Unnormalized) | | | | | |
|---|---|---|---|---|---|---|
| | Peak area (Average) | | | | | |
| | 0°C | -10°C | -30°C | -50°C | -70°C | |
| Cannflavin A | 1.00 | 1.03 | 0.91 | 0.84 | 0.81 | |
| Chlorophyll a | 1.00 | 0.45 | 0.19 | 0.22 | 0.14 | |
| Linoleic acid | 1.00 | 1.06 | 0.86 | 0.78 | 0.76 | |
| Oleic acid | 1.00 | 1.03 | 0.73 | 0.57 | 0.47 | |
| Sucrose | 1.00 | 0.96 | 0.51 | 0.45 | 0.50 | |
| Behenyl arachidate (C42) | | | N/A | | | |

| Compound | Peak area (SD) | | | | |
|---|---|---|---|---|---|
| | 0°C | -10°C | -30°C | -50°C | -70°C |
| Cannflavin A | 0.00 | 0.00 | 0.02 | 0.01 | 0.02 |
| Chlorophyll a | 0.02 | 0.00 | 0.01 | 0.00 | 0.01 |
| Linoleic acid | 0.06 | 0.09 | 0.04 | 0.01 | 0.03 |
| Oleic acid | 0.04 | 0.03 | 0.04 | 0.05 | 0.01 |
| Sucrose | 0.01 | 0.04 | 0.01 | 0.02 | 0.04 |
| Behenyl arachidate (C42) | | | N/A | | |

FIG. 16

SELECTIVE EXTRACTION OF CANNABINOIDS, PIGMENTS, AND LIPIDS FROM PLANT MATTER

CROSS REFERENCE TO RELATED CASES

This application claims the benefit of, and priority to, U.S. Provisional Patent Application Ser. No. 62/322,751 filed Apr. 14, 2016, U.S. Ser. No. 15/488,341 filed Apr. 14, 2017, PCT/US18/16130 filed Jan. 31, 2018, and Ser. No. 16/605,199 filed Oct. 14, 2019 (this application being filed off of App. No. PCT/US18/16130 filed Jan. 31, 2018, at the 30 month National Phase 2 on Oct. 14, 2019, the contents of which are incorporated herein by reference herein in their entirety.

FIELD OF THE DISCLOSURE

The disclosure relates to systems and methods for extracting oil-containing substances such as plant matter and to oil compositions prepared by those systems and methods.

BACKGROUND OF THE DISCLOSURE

This present disclosure relates to ways of extracting and concentrating cannabinoids and terpenes from plant substrates including hemp, and particularly modifying the characteristics of the solvent to by-pass undesired constituents of plants throughout the extraction process.

Extraction of industrial hemp and cannabis can be done via many methods, using a wide array of FDA-approved food grade solvents. The most commonly used solvents are hydrocarbons such as hexane, pentane, butane or propane. Lipid based solvents such as canola oil, soybean oil, olive oil, flax seed oil, hemp oil are also commonly used in hemp and cannabis extraction methods. Supercritical carbon dioxide is also commonly used in cannabis extraction, but the expensive machinery and the post-extraction steps required to purify a supercritical fluid extraction (SFE) extract of undesired plant lipids, makes SFE the least desirable method for any commercial processor.

Several drawbacks of hydrocarbon extraction methods have been recognized. The most prominent of these drawbacks is the volatility of hydrocarbon solvents. The cost associated with retrofitting a laboratory with explosion proof electronics, ventilation fans, and the like, create enormous start-up costs. Second, pure hydrocarbon solvents such as N-butane or N-hexane are extremely difficult to obtain and therefore are hardly ever used for cannabis extract production. The majority of extracts are created with inferior, low quality butane that contains additives and impurities. Also, butane is explosive.

Lipid-based extractions are safer and less hazardous to health than hydrocarbon-based extractions, but separating the cannabinoids or flavonoids from a lipid emulsion requires a more thorough training in chemistry, as well as more expensive distillation devices.

Various states and local governments are now legalizing cannabis for medical and recreational use. This has created an expanding market for DIY extractions which are obtained through low quality, impure, hydrocarbons such as butane and propane. Unsafe practices by DIY manufacturers have resulted in explosions and fires resulting from use of hydrocarbon solvents such as butane and propane.

SUMMARY OF THE DISCLOSURE

REDUCED TEMPERATURE ETHANOLIC EXTRACTIONS. The present disclosure provides a method for processing cannabis plant matter, wherein the method produces a cannabis extract, and wherein the method comprises exposing the plant matter to an ethanolic solvent that is initially at a predetermined temperature of zero degrees C. or less, wherein the exposing takes place in a vessel, and where a result of the exposing is a mixture of the plant matter and the ethanolic solvent, where the temperature of this mixture is at essentially the same temperature of said predetermined temperature zero degrees C. or less, and wherein mixture comprises a suspension of plant matter and the ethanolic solution, wherein the method includes the steps of: (a) Exposing the cannabis plant matter to the ethanolic solvent, wherein the exposing produces a suspension of the cannabis plant matter in the ethanolic solvent, (b) Maintaining the exposing of the plant matter to the ethanolic solvent, wherein the maintaining is for a predetermined time that is optionally ten minutes, and wherein the exposing results in an extracted plant matter residue and also results in an extract that takes the form of the ethanolic solvent with extracted substances. (c) Separating the extract from the extracted plant matter residue, wherein the extract is optionally maintained at essentially the same temperature of said predetermined zero degrees C. or less, and, (d) Drying the extract to produce a dried extract, and wherein the step of drying removes the ethanol, and also removes the water, if there was any water.

In another aspect, the disclosure provides the above method, wherein the method comprises: (a) Exposing the plant matter to an ethanolic solvent that is initially at a temperature of minus 30 degrees C. and wherein the steps of exposing, maintaining, and separating, are each conducted at minus 30 degrees C. (b) Or exposing the plant matter to an ethanolic solvent that is initially at a temperature of minus 50 degrees C. and wherein the steps of exposing, maintaining, and separating, are each conducted at minus 50 degrees C. (c) Or exposing the plant matter to an ethanolic solvent that is initially at a temperature of minus 70 degrees C. and wherein the steps of exposing, maintaining, and separating, are each conducted at minus 70 degrees C. (d) Or exposing the plant matter to an ethanolic solvent that is initially at one particular temperature in the range between minus 30 degrees C. and minus 70 degrees C., and wherein the steps of exposing, maintaining, and separating, are each conducted at a temperature that is the same one particular temperature in the range between minus 30 degrees C. and minus 70 degrees C.

MINUS 30 DEGREE EMBODIMENT. Also contemplated is the above method, wherein the temperatures of exposing, maintaining, and separating are each conducted at minus 30 degrees C., and wherein the recoveries of the indicated chemicals at minus 30 degrees C. is compared to recoveries of the same chemicals that can be calculated from a control experiment conducted at zero degrees C., wherein the dried extract has a weight (grams), and wherein the value for the weight of the entire dried extract is called a "yield," and wherein the dried extract contains one or more cannabinoids, and wherein the dried extract contains one or more of, chlorophyll a, linoleic acid, oleic acid, a wax, behenyl arachidate (C42), a cannflavin, and cannflavin A, and wherein, the recoveries of one or more or all of: (i) Cannflavin A (91%), (ii) Chlorophyll a (19%), (iii) Linoleic acid (85%), (iv) Oleic acid (73%), (v) Sucrose (51%), (vi) Behenyl arachidate (C42) (41%), are each at the indicated percentage of that found in the control experiment (control experiment with extracting, maintaining, and separating, that is conducted at zero degrees C.), wherein the values for percentage for the data collected at minus 30 degrees have a range that is defined by the standard deviations (SD) set forth in FIGS. 14 and 15.

MINUS 50 DEGREE EMBODIMENT. What is also encompassed, is the above method, wherein the temperatures of exposing, maintaining, and separating are each conducted at minus 50 degrees C., and wherein the recoveries of the indicated chemicals at minus 50 degrees C. is compared to recoveries of the same chemicals that can be calculated from a control experiment conducted at zero degrees C., wherein the dried extract has a weight (grams), and wherein the value for the weight of the entire dried extract is called a "yield," and wherein the dried extract contains one or more cannabinoids, and wherein the dried extract contains one or more of, chlorophyll a, linoleic acid, oleic acid, a wax, behenyl arachidate (C42), a cannflavin, and cannflavin A, and wherein, the recoveries of one or more or all of: (i) Cannflavin A (84%) (ii) Chlorophyll a (22%), (iii) Linoleic acid (78%), (iv) Oleic acid (57%), (v) Sucrose (45%), (vi) Behenyl arachidate (C42) (38%), are each at the indicated percentage of that found in the control experiment (control experiment with extracting, maintaining, and separating that is conducted at zero degrees C.), wherein the values for percentage for the data collected at minus 50 degrees have a range that is defined by the standard deviations (SD) set forth in FIGS. 14 and 15.

MINUS 70 DEGREE EMBODIMENT. In yet another aspect, the present disclosure provides the above method, wherein the temperatures of exposing, maintaining, and separating are each conducted at minus 70 degrees C., and wherein the recoveries of the indicated chemicals at minus 70 degrees C. is compared to recoveries of the same chemicals that can be calculated from a control experiment conducted at zero degrees C., wherein the dried extract has a weight (grams), and wherein the value for the weight of the entire dried extract is called a "yield," and wherein the dried extract contains one or more cannabinoids, and wherein the dried extract contains one or more of, chlorophyll a, linoleic acid, oleic acid, a wax, behenyl arachidate (C42), a cannflavin, and cannflavin A, and wherein, the recoveries of one or more or all of: (i) Cannflavin A (81%), (ii) Chlorophyll a (14%), (iii) Linoleic acid (76%), (iv) Oleic acid (47%), (v) Sucrose (50%), (vi) Behenyl arachidate (C42) (32%), are each at the indicated percentage of that found in the control experiment (control experiment with extracting, maintaining, and separating that is conducted at zero degrees C.), and wherein the values for percentage for the data collected at minus 70 degrees have a range that is defined by the standard deviations (SD) set forth in FIGS. 14 and 15.

What is also contemplated is the above method, further comprising the step of drying the extract, wherein the step of drying produces a substance that comprises one or more of an oil, a powder, a film, a crust, or flakes, or comprises a mixture thereof.

What is provided is the above method, wherein the suspension is entirely a suspension of the cannabis plant matter in the ethanolic solvent or, alternatively, where the suspension is a partial suspension of the cannabis plant matter in the ethanolic solvent with the remaining cannabis plant matter in constant or in occasional contact with the bottom of the vessel.

Moreover, what is provided is the above method, wherein the predetermined time is for two minutes, for four minutes, for six minutes, for eight minutes, for 10 minutes, for 12 minutes, for 14 minutes, or for 16 minutes.

In another aspect, what is provided is the above method, wherein the predetermined time is for two minutes, for four minutes, for six minutes, for eight minutes, for 10 minutes, for 12 minutes, for 14 minutes, or for 16 minutes, and wherein the period of maintaining the plant matter includes a period of about one minute where the mixture is agitated or shaken, and wherein said period occurs within the first two minutes of exposure.

Furthermore, what is provided is the above method, wherein the ethanolic solvent is one of, 100% ethanol, 95% ethanol and 5% water (by volume), or 90% ethanol and 10% water (by volume).

EXACT TEMPERATURE AND "ABOUT" TEMPERATURE EMBODIMENTS. what is provided is the above method, wherein the temperature of the ethanolic solvent prior to mixing, and the temperature of the mixture, is at one of these temperatures: (a) Minus 30 degrees C. (b) Minus 35 degrees C. (c) Minus 40 degrees C. (d) Minus 45 degrees C., (e) Minus 50 degrees C. (f) Minus 55 degrees C. (g) Minus 60 degrees C. (h) Minus 65 degrees C. (g) Minus 70 degrees C., and what is provided is the above method, wherein the temperature of the ethanolic solvent prior to mixing, and the temperature of the mixture, is at one of these temperatures: (a) About minus 30 degrees C. (b) About minus 35 degrees C. (c) About minus 40 degrees C. (d) About minus 45 degrees C. (e) About minus 50 degrees C. (f) About minus 55 degrees C. (g) About minus 60 degrees C. (h) About minus 65 degrees C. (g) About minus 70 degrees C.

Further contemplated is the above method, wherein the cannabis is *Cannabis sativa*, and wherein the cannabis plant matter comprises by weight: (a) At least 90% flowers (by weight), (b) At least 90% leaves (by weight), or (c) Comprises a mixture, wherein at least 90% of the mixture consists of flowers and leaves (by weight).

PREDETERMINED TEMPERATURE EMBODIMENTS. What is provided is the above method, wherein said predetermined temperature is zero degrees C., and wherein the method that is conducted with extraction at zero degrees C. is used to provide control data, and where the control data can be compared with experimental data, and wherein the method is conducted with a predetermined temperature of minus 30 degrees C. or lower, the method conducted at minus 30 degrees C. or lower provides experimental data, and the control data and experimental data can be used in calculations that measure relative enrichment or depletions of one or more of tetrahydrocannabinol (THC), chlorophyll, cannflavin, oleic acid, linoleic acid, and sucrose. Moreover, what is provided is the above method, wherein said predetermined temperature is minus 30 degrees C., minus 40 degrees C., minus 50 degrees C., minus 60 degrees C., or minus 70 degrees C. The present disclosure further discloses the above method, wherein the vessel is an extraction tank, a vat, a tank, a reservoir, a bucket, a flask, or a centrifuge tube.

DEVICE AND FORMULATION EMBODIMENTS. Provided is an oil, a slurry, a terpene, an essential oil, a plurality of terpenes, a powder, a vaping solution, an aerosol, a vape juice, an e-liquid, an e-juice, an oral formulation, a suppository, a sublingual formulation, or a dermal formulation, that comprises a composition prepared by the above method. Also provided is a device that is an e-cigarette, a vaping device, dermal patch, a pharmaceutical capsule, or a pharmaceutical tablet, that comprises a composition prepared by the above method.

TERPENE EMBODIMENTS. The present disclosure provides a formulation that comprises the composition prepared by the above method, wherein the formulation also includes one or more terpenes, and wherein the one or more terpenes are selected from alpha-bisabolol, borneol, camphene, camphor, delta-3-carene, caryophyllene oxide, alpha-cedreen, beta-eudesmol, fenchol, geraniol, guaiol, alpha-humulene, isoborneol, linalool, menthol, nerol, cis-ocimene, trans-ocimene, alpha-phellandrene, alpha-pinene, beta-pinene, sabinene, alpha-terpinene, alpha-terpineol, terpinolene, alpha-guaiene, elemene, farnesene, germacrene B, guaia-1(10),11-diene, trans-2-pinanol, selina-3,7(11)-diene, eudesm-7(11)-en-4-ol, valencene, eudesm-7(11)-en-4-ol, beta-caryophyllene, limonene, and myrcene. In exclusionary embodiments, the system, compositions, extracts, devices, formulations, and methods, can exclude any system, composition, extract, device, formulation, and method, that comprises one or more of the above-mentioned terpenes. What can be excluded is systems, compositions, and methods, for example, where the concentration of any one terpenes (or the concentration of all terpenes), is over 0.01% by weight, over 0.02% by weight, over 0.04% by weight, over 0.05% by weight, over 0.1% by weight, over 0.5% by weight, over 1.0% by weight, over 2% by weight, over 4% by weight, over 1.0% by weight, over 2% by weight, over 5% by weight, over 10% by weight, and so on.

Extraction System Embodiments.

The present disclosure provides the following system. What is provided is a system comprising a solvent tank (1.A), an extraction tank (1.H), a collection tank (1.I), and a plurality of fluid lines, wherein the system is capable of extracting plant matter with a solvent at an ultra-cold temperature, wherein this solvent is a fluid that does not contain chemicals extracted from the plant matter of the system, and wherein a solution is a solvent that comprises chemicals extracted from the plant matter of the system, wherein the system comprises:

(i) An environment box (1.L) that is capable of maintaining an ultra-cold temperature of structures, solvents, and solutions that reside inside the environment box, wherein the environment box surrounds and envelops the solvent tank (1.A), the extraction tank (1.H), and the collection tank (1.I), wherein the environment box comprises an upper surface, a lower surface, and an interior region;

(ii) Wherein the solvent tank (1.A) is operably linked to the extraction tank (1.H) with a fluid line;

(iii) Wherein the system comprises a solvent flooding valve (1.C) that resides in a fluid line that is operably linked with the solvent tank (1.A) and the extraction tank (1.H), wherein opening solvent flooding valve permits transfer of solvent from the solvent tank (1.A) to the extraction tank (1.H);

(iv) Wherein the extraction tank (1.H) comprises an interior, an extraction tank inlet (1.V), an extraction tank outlet (1.W), an extraction tank upper region (1.BB), wherein opening of solvent flooding valve (1.C) allows solvent from solvent tank (1.A) to pass through solvent flooding valve (1.C) and through extraction tank inlet and into extraction tank;

(v) Wherein the extraction tank (1.H) comprises a lid, door, or aperture that is capable of allowing transfer of plant matter to interior of extraction tank;

(vi) Wherein a first fluid line leads from solvent tank to extraction tank branching point (1.AA), and wherein a second fluid line leads from extraction tank outlet (1.W) to said extraction tank branching point, wherein the extraction tank branching point (1.AA) is operably linked to extraction tank inlet (1.V), wherein the extraction tank branching point is capable of directing solvent obtained from solvent tank into extraction tank for extracting plant matter with solvent, and wherein the extraction tank branching point is capable of directing solution obtained from collection tank outlet into extraction tank for extracting plant matter by recirculating the solution obtained from collection tank (1.I);

(vii) Wherein the collection tank (1.I) comprising a collection tank inlet (1.Y) and a collection tank outlet (1.Z), wherein extraction tank outlet is operably linked to collection tank inlet by a fluid line, wherein flow of solution from extraction tank outlet to collection tank inlet is controllable by in-line valve (1.E), wherein the collection tank outlet is operably linked with a collection tank branching point that comprises a first branch and a second branch, wherein first branch of collection tank branching point is operably linked by a fluid line that is capable of transmitting solution from collection tank to extraction tank, wherein flow of solution from extraction tank outlet to collection tank inlet is controllable by a solution return valve (1.D), wherein the second branch of collection tank branching point is operably linked by a fluid line that is capable of transmitting solution from collection tank (1.I) to evacuation line (1.P), wherein flow of solution from extraction tank outlet to evacuation line (1.P) is controllable by in-line valve (1.K) and, wherein flow of solution from extraction tank outlet to evacuation line (1.P) is configured for removing solution from environment box and configured for transmitting solution to the evacuation tank (1.R);

(viii) Wherein regarding the solution return valve (1.D) and the evacuation valve (1.K), the opening of solution return valve (1.D) and closing evacuation valve (1.K) promotes or allows recirculating of solution from collection tank to extraction tank for the purpose of further extracting chemicals from plant matter; and wherein closing solution return valve (1.D) and opening evacuation valve (1.K) promotes or allows removal of solution from all tanks and fluid lines in said environment box;

(ix) Wherein the system is capable of a first extraction of plant matter with solvent to produce a first extract, followed by one or more extractions of plant matter with solution that is recirculated from collection tank to produce at least a second extract, which is followed by a final extraction of plant matter with solvent to produce a final extract, and wherein the collection tank (1.I) is capable of receiving all of the first extract, the at least a second extract, and the final extract, and wherein the collection tank is capable of storing a mixture of the first extract, the second extract, and the final extract.

In a temperature embodiments, what is provided is the above system wherein the temperature in the environment box is maintainable in the range of −60 to −50, −60 to −45, −60 to −40, −60 to −35, −60 to −30, −60 to −25, −60 to −20, or where the temperature is maintainable in the range of −55 to −45, −55 to −40, −55 to −35, −55 to −30, −55 to −25, or where the temperature is in the range of −50 to −40, −50 to −35, −50 to −30, −50 to −25, −50 to −20, or where the temperature is maintainable in the range of −45 to −40, −45 to −35, −45 to −30, −45 to −25, −45 to −20, or where temperature is maintainable in the range of −40 to −30, −40 to −25, −40 to −20, −40 to −15, and the like.

In vacuum embodiments, what is provided is the above system, further comprising a vacuum pump (1.O) and a plurality of vacuum lines, wherein flow of solvent from solvent tank (1.A) to extraction tank (1.H), flow of solution from extraction tank outlet to collection tank (1.I), and flow of solution from collection tank outlet to evacuation line (1.P), are each driven by vacuum from said vacuum pump.

In vacuum valve embodiments, what is embraced is the above system, further comprising a vacuum pump and a plurality of vacuum lines, wherein flow of solvent from solvent tank (1.A) to extraction tank (1.H), flow of solution from extraction tank outlet to collection tank (1.I), and flow of solution from collection tank outlet to evacuation line (1.P), are each driven by vacuum from said vacuum pump, and wherein system further comprises: (i) Vacuum valve (1.M) that controls suction of vacuum from vacuum pump to upper region (1.BB) of extraction tank (1.H); (ii) Vacuum valve (1.N) that controls suction of vacuum from vacuum pump to upper region (1.CC) of collection tank (1.I); and (iii) Vacuum valve (1.Q) that control suction of vacuum from vacuum pump to evacuation tank (1.R).

In vacuum pump embodiments, what is contemplated is the above system, further comprising a vacuum pump (1.O) and a plurality of vacuum lines, wherein flow of solvent from solvent tank (1.A) to extraction tank (1.H), flow of solution from extraction tank outlet to collection tank (1.I), and flow of solution from collection tank outlet to evacuation line (1.P), are each driven by vacuum from said vacuum pump, and wherein flow of solvent and flow of solution are not driven by any device other than a vacuum pump, and wherein flow of solvent and flow of solution are not driven by direct contact of solvent or solution with any rotor, propellor, or hose subjected to peristaltic forces.

In tank liner embodiments, the present disclosure embraces the above system, wherein the extraction tank (1.H) comprises a tank liner and a false bottom, wherein the tank liner is configured to receive and secure plant matter, wherein the tank liner comprises a plurality of filtering apertures, optionally, apertures of about 10 micrometers in diameter, and wherein the false bottom is configured to secure the tank liner inside of extraction tank and to facilitate extraction of plant matter. Apertures can be about 5 micrometers, about 10, about 15, about 20, about 25, about 30, about 35, about 40, about 50, about 60 about 70, about 80, about 90, or about 100 micrometers in diameter, or any range consisting of what is bracketed by any two of these numbers.

In cooling jacket embodiments, what is provided is the above system, wherein exterior surface of one or more of solvent tank (1.A), extraction tank (1.H), and collection tank (1.I) are covered at least in part by a cooling jacket, wherein the cooling jacket is capable of receiving cold air or cold fluid from a freezer.

In evacuation embodiments, what is provided is the above system, that further comprising an evacuation tank (1.R), wherein the evacuation tank is outside of environment box (1.L), and wherein evacuation line (1.P) is operably linked with collection tank outlet and with evacuation tank (1.R), and wherein evacuation tank is capable of receiving solution that is transmitted from collection tank (1.I) via evacuation line (1.P) to evacuation tank (1.R), and wherein evacuation line passes from interior of environment box (1.L) to exterior of environment box.

In tank liner and cone embodiments, what is provided is the above system, wherein the extraction tank (1.H) comprises an inverted cone structure (narrow side up, wide side down), wherein the inverted cone structure is capable of supporting a false bottom, and wherein the false bottom is configured for supporting a tank liner, and wherein the inverted cone structure is configured to receive and collect solution generated by extracting plant matter with solvent, where solution falls from false bottom, and is capable of funneling the solution to extraction tank outlet.

In filter embodiments, what is provided is the above system, further comprising a filter housing (1.J), wherein the filter housing resides in the evacuation line (1.P), wherein the evacuation line leads from collection tank outlet (1.Z) to evacuation tank (1.R), wherein the filter housing comprises a filter that is capable of removing particulate matter from the solution.

In plant matter embodiments, it is understood that the "plant matter" is the workpiece of the system of the present disclosure. What is encompassed is the above system in combination with the workpiece, where wherein the extraction tank comprises: (i) Plant matter; (ii) Plant matter derived from a cannabis plant; (iii) Plant matter derived from a cannabis plant and not any plant matter derived from any other type of plant. Moreover, for all embodiments that are described herein, what is provided are embodiments where the workpiece is other than "plant matter," for example, where the workpiece is a synthetic composition, where the workpiece takes the form of bacteria or fungus, where the workpiece takes the form of animal matter, and so on.

In solvent embodiments, the solvent tank contains ethanol that is at least 95% ethanol, ethanol that is at least 98% ethanol, or 100% ethanol.

In cold air intake embodiments, the present disclosure provides a cold air intake tube (1.T) and a cold air intake valve (1.B), wherein the cold air intake tube is substantially or completely located inside of the environment box, and wherein the cold air intake tube has an upper-end terminus and a lower-end terminus, wherein the lower-end terminus is constitutively open to air inside of the environment box, and wherein the lower-end terminus is positioned near interior bottom of environmental box, and wherein the lower-end terminus is capable of receiving cold air from interior of environment box, and (i) Wherein the upper-end terminus is secured to upper surface of environment box and is capable of directing passage of cold air from interior of environmental box to fluid lines located at exterior of environmental box, wherein cold air intake valve (1.B) is located exterior of environment box, and the cold air intake tube (1.T) is operably linked to a cold air intake valve (1.B), and (ii) Wherein the cold air intake valve (1.B) is capable of being closed in the situation where the solvent needs to be drawn out of solvent tank (1.A) and into extraction tank (1.H) and when vacuum from vacuum pump (1.O) is applied to top interior of extraction tank (1.BB), and (iii) Wherein the cold air intake valve (1.I) is capable of being opened in the situation where vacuum from vacuum pump (1.O) is applied to collection tank (1.I) in order to draw solution out of extraction tank outlet and to enter collection tank inlet, wherein in the situation when cold air intake valve (1.B) is open, and vacuum from vacuum pump (1.O) is applied to collection tank (1.I), the open cold air intake valve (1.B) is capable of acting as a vent to alleviate excess vacuum.

In solvent tank embodiments, the present disclosure provides a plurality of solvent tanks, wherein each of said solvent tanks is operably linked with a corresponding solvent tank valve, wherein the system is configured to draw solvent from only one at a time of the solvent tanks for use in plant matter extraction, and wherein the system is configured to switch from an initial solvent tank to a subsequent solvent tank when the first solvent tank is emptied of solvent.

In sight glass embodiments, the system includes at least one sight glass that is located in-line of at least one fluid line.

In methods embodiments, the present disclosure provides the following method, as well as compositions, extracts, solutions, and purged solutions, provided by the following method. What is encompassed is a method for selectively extracting a chemical from plant matter, wherein the extracting is accomplished by a system that comprises a solvent tank, an extraction tank, a collection tank, and fluid line capable of conveying solvent from solvent tank to extraction tank for initial extraction of plant matter, a fluid line capable of conveying a solution from extraction tank to collection tank wherein "solution" is defined as a solvent that contains chemicals extracted from plant matter, a fluid line capable of recirculating solution from collection tank back to extraction tank for further extraction of plant matter, and a fluid line capable of transmitting solution from collection tank to an evacuation line, wherein the system further comprises an extraction tank inlet, extraction tank outlet, collection tank inlet, and collection tank outlet, wherein the system further comprises fluid line valves that comprises a solvent flooding valve (1.C), a solution return valve (1.D), a solution collection valve (1.E), and an excavation valve (1.K), and wherein system further comprises a vacuum pump (1.O) that is operably linked to a plurality of vacuum line valves, wherein the vacuum line valves comprise an extraction tank vacuum valve (1.M), a collection tank vacuum valve (1.N), and an evacuation tank vacuum valve (1.Q), wherein said fluid line valves and vacuum line valves are capable of controlling the selective transmission of solvent from the solvent tank to the extraction tank, the selective transmission of solution from the extraction tank to the collection tank, the selective transmission of solution from the collection tank back to the extraction tank for recirculation, and the selective transmission of solution from the collection tank to the evacuation line (1.P), wherein the extracting is accomplished by a cold solvent that is at a temperature in the range of minus 60 degrees C. to minus 30 degrees C., wherein the temperature is measurable by probing solvent that resides in extraction tank, the method comprising:

(i) The step of introducing plant matter into the extraction tank;

(ii) The step of transmitting solvent from the solvent tank into the extraction tank, resulting in a mixture of solvent and plant matter;

(iii) The step of allowing solvent to contact the plant matter that is in the extraction tank;

(iv) The step of allowing solvent to extract chemicals from the plant matter resulting in the creating of the solution;

(v) Wherein agitation is either applied to or is not applied to the mixture of solvent and plant matter;

(vi) The step of draining at least a portion of the solution in the extraction tank and transmitting said at least a portion of the solution to the collection tank to produce a solution residing in the collection tank;

(vii) The step of delivering at least a portion of the solution residing in the collection tank back to the extraction tank via a recirculating step;

(viii) The step of allowing the solution delivered via the recirculating step to contact and further extract plant matter;

(ix) The step of draining at least a portion of the solution in the extraction tank from the immediately previous step, and transmitting said at least a portion of the solution to the collection tank;

(x) The step of controlling said fluid line valves and said vacuum line valves for allowing the transmission of solvent from solvent tank to extraction tank, followed by the step of controlling said fluid line valves and vacuum line valves for allowing the transmission of solution from extraction tank to collection tank, which is then followed by the step of controlling said fluid line valves and vacuum line valves for allowing the transmission and recirculation of solution from the collection tank to the extraction tank, and eventually followed by the step of controlling said fluid line valves and vacuum line valves for allowing transmission of solution from the collection tank to the evacuation line.

In a final extraction method embodiment, what is provided is the above method, further comprising a final extraction step, wherein the final extraction step comprises transmitting solvent from solvent tank (1.A) to extraction tank (1.H) and allowing the solvent to extract any residual chemicals from the plant matter, followed by transmission of solution to the collection tank, and finally by transmission of solution from collection tank to the evacuation line.

In solvent embodiments, what is provided is the above method, further comprising the step of filling solvent tank (1.A) with ethanol that is at least 90% ethanol, at least 95% ethanol, or about 100% ethanol.

In agitation-free embodiments, what is provided is the above method that excludes any agitation of the mixture of solvent and plant matter, and wherein agitation is not applied to the mixture of solvent and plant matter.

In vacuum-activated embodiments, what is provided is the above method, wherein transmissions of solvent and solution are driven by a force originating from a mechanical device, and where the only mechanical device that is used to drive transmission of solvent and solution is the vacuum pump.

In batchwise embodiments, what is provided is the above method, that is batchwise, wherein the batchwise method comprises introducing plant matter into the extraction tank, filling extraction tank with a volume of solvent, followed by extraction of plant matter, and then followed by draining of at least 50%, at least 60%, at least 70%, at least 80%, at least 90%, or about 100%, of the volume of solution from extraction tank to produce a drained solution, wherein the drained solution is moved from extraction tank to collection tank, which is followed by transmission of at least 50%, at least 60%, at least 70%, at least 80%, at least 90%, or about 100%, of solution from collection tank back to extraction tank. Also provided is the above method that is batchwise and not continuous.

In a contrasting continuous method, the present disclosure also encompasses a continuous (non-batchwise) method, wherein the continuous method comprises introducing plant matter into the extraction tank, filling extraction tank with a volume of solvent, followed by extraction of plant matter, which is then followed by a period of time wherein solution from extraction tank outlet is continuously circulated to inlet of extraction tank, to produce a recirculation duration, and where volume of solvent that is recirculated is equivalent to the volume of solvent, equivalent to two times the volume of the solvent, equivalent to about three times the volume of the solvent, equivalent to about four times the volume of the solvent, equivalent to about five times the volume of the solvent, or equivalent to greater than about five times the volume of the solvent.

In embodiments where there are alternate times when collection tank is emptied, what is provided is the above method, wherein solution is emptied from collection tank and transmitted into the evacuation line where one of the following conditions precedent has been satisfied: (i) After performing the initial solvent extraction step and one or more solution extraction steps; (ii) After performing the initial solvent extraction step, and one or more solution extraction steps, and the final solvent extraction step; (iii) After performing the initial solvent extraction step and one or more solution extraction steps, followed by emptying the collection tank, and then performing the final solvent extraction step.

In a purging embodiment, what is provided is the above method, further comprising the step of purging solvent out of a solution produced by the steps of initial extraction of plant matter with solvent to produce a solution, followed by one or more steps of re-extraction of plant matter with solution via one or more recirculation steps, and finally followed by extracting the previously extracted plant matter with fresh solvent to produce a final solution, wherein the final solution is purged to remove at least 50%, at least 60%, at least 70%, at least 80%, at least 90%, or at least 95% of solvent that is present in the final solution.

In composition embodiments, what is provided is a solution, purged solution, filtered solution, colorless solution, de-colorized solution, produced by the above method. Also, provided is a solution provided by the above method, to which a fragrance has been added, to which a color or dye has been added, to which a pharmaceutical agent has been added, and the like.

In embodiments, the present disclosure provides an improved system comprising a modular ultra low, cascade type refrigeration compressor system. What is also provided is the above system, wherein the ultra-low refrigeration compressor unit circulates Freon® through a coil which lines an insulated compartment, further comprising at least a refrigerated compartment capable of achieving temperatures between -1 degrees C. and -81 degrees C. The refrigerant can be a Freon® compound, dichlorodifluoromethane (Freon 12), trichlorofluoromethane (Freon 11), chlorodifluoromethane (Freon 22), dichlorotetrafluoroethane (Freon 114), and trichlorotrifluoroethane (Freon 113).

What is also embraced is the above system, wherein the refrigerated compartment houses a vessel in which plant material is stored for extraction, and wherein the refrigerated compartment houses a vessel which serves as an intermittent storage ballast for extract rich solution, and the refrigerated compartment houses an inline filter strainer assembly. Also contemplated is the above system, wherein the filter housing assembly is in line with the evacuation plumbing of the system, and wherein a 10 micron nylon, polyethylene (PE), polypropylene (PP), or stainless steel material filter bag is housed within the filter strainer assembly.

In another aspect, the present disclosure provides the above system, wherein the refrigerated compartment houses at least four solvent storage tanks. Also provided is the above system, wherein the refrigerated compartment (Environment Box (1.L)) houses six solvent storage tanks. Also provided is the above system, wherein the solvent storage tanks hold 1 gallon, 2 gallons, 3 gallons, 4 gallons, 5 gallons, or 6 gallons.

Also embraced is the above system, wherein the refrigerated compartment houses stainless steel plumbing and the plumbing connects all of the vessels within the refrigerated compartment. Also provided is the above system, wherein valves are positioned onto the plumbing. Also contemplated, is the above system, wherein the valves are positioned outside of the refrigerated compartment. Also provided is the above system, wherein the plumbing inside the refrigerated compartment allows for the transfer of solvent from vessel to vessel. Also embraced is the above system, wherein the transfer of fluid happens at ultra low temperatures -1 degrees C. to -81 degrees C.

In yet another aspect, the present disclosure provides the above system, wherein the transfer of fluid happens via vacuum. Also provided is the above system, further comprising a vacuum pump, vacuum plumbing, and valving. Also provided is the above system, which comprises of a vacuum pump and vacuum plumbing positioned on the outside of the refrigerated compartment. Also embraced is the above system, that further comprises a cold trap container inside the refrigerated compartment, in line with the plumbing connected to the vacuum pump.

In yet another embodiment, the present disclosure provides a safer and more reliable extraction process, comprising, in combination, a pre-processing step; a contacting step; a filtration step; an evaporation step; a recovery step; and a purging step as described whereby the resultory extract is substantially free of any lipids and chlorophyll. Another aspect of the above safer and more reliable extraction process, what is provided is that process wherein the term solvent is defined to be 100% grain ethanol. Also provided is that above process that includes a solvent recovery step which can be accomplished via simple distillation or rotary evaporator apparatus. Also provided is the above process, that further includes a purging step under vacuum to remove remaining solvent from the extract.

BRIEF DESCRIPTIONS OF THE DRAWINGS

The X-axis of the figures refer to a "yield." The "yield" refers to the weight of the indicated chemical (the chemical being identified on the figure itself), where this "yield" is with regard to the dry weight of the ethanol extract (before subjecting the extract to chromatographic analysis), following evaporating the ethanol extract until dried. Regarding the step-by-step laboratory method for obtaining this weight, the weight of a 50 mL centrifuge tube was measured under these two conditions: (1) Ethanol extract in the 50 mL centrifuge tube, and (2) Same ethanol extract in the same 50 mL centrifuge tube, but after drying all of the ethanol. Subtracting weight (2) from weight (1), gives the reference point (the weight of the dried extract) for calculating yield. As stated before, the dried extract was reconstituted in 0.9 mL of methanol, prior to chromatographic analysis.

Figure 6:
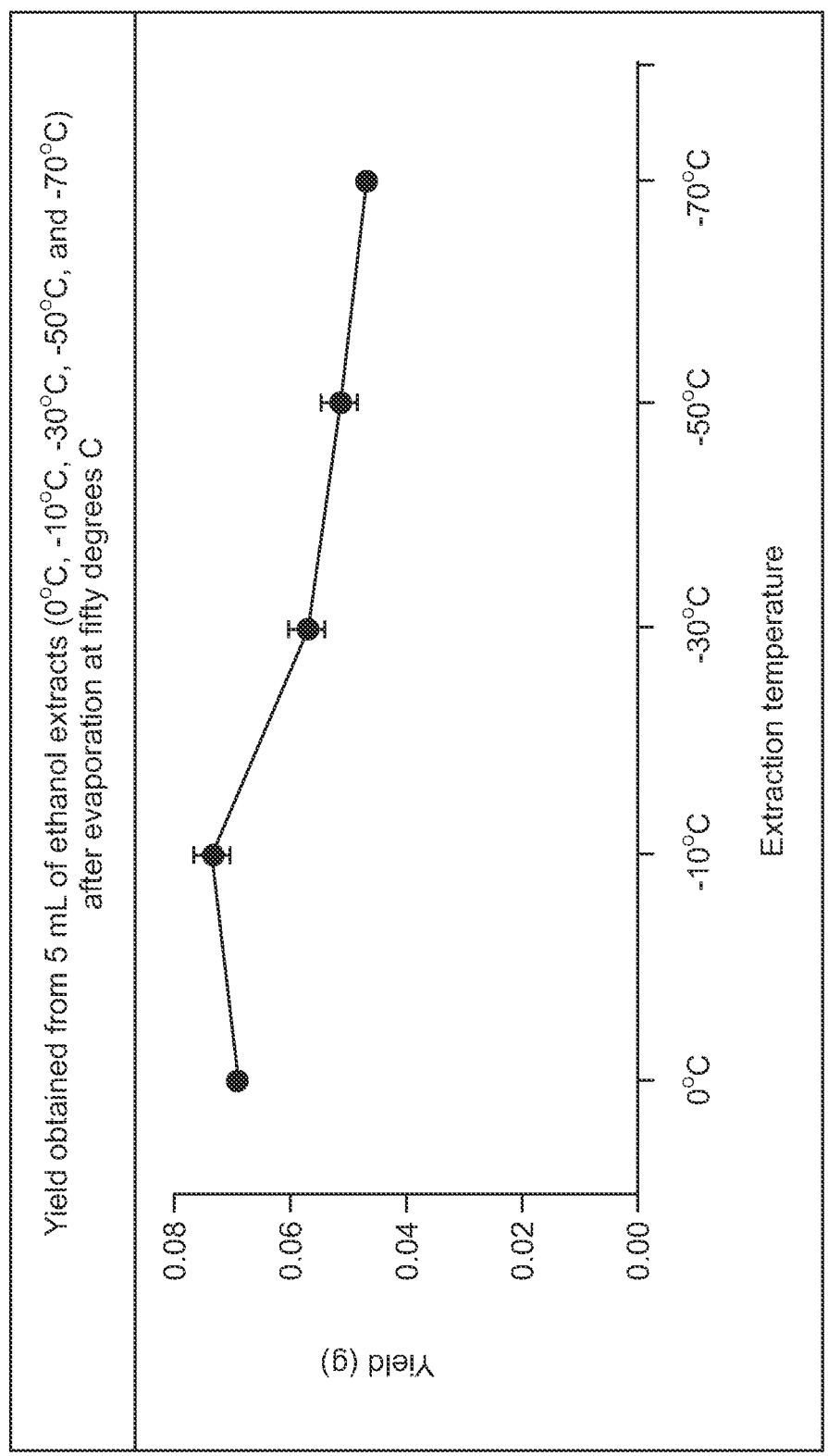

WHAT IS YIELD. FIG. 6, and most of the subsequent figures, have numbers that are based on something called, "yield." The actual value for "yield" may be different for samples, depending on the temperature of preparation. Five different ethanol extracts, each containing only what was extracted from cannabis flower at one of five different temperatures, were each evaporated to dryness, resulting in a solid (perhaps, an oily material). The value for "yield" for a given sample was calculated by performing a simple calculation, that is, subtraction. There were five tubes, and each tube got one of the respective five ethanol extracts. The total weight of chemicals (pigments, oils, sugars, etc.) that is extracted from a constant weight of cannabis flower will vary (or more accurately, may vary) on the temperature used for extraction. The value for "yield" is calculated as follows: [Weight of tube that contains the ethanol extract] minus [Weight of tube that contains the ethanol extract after being dried to evaporate all of the ethanol]. In other words, the value for "yield" is just the weight of the "solid stuff" that is left after evaporating all of the ethanol. The unit of "yield" is grams.

FIG. 1 discloses a system, where the system includes extraction tank, collection tank, various fluid lines, and evacuation tank.

Figure 2:
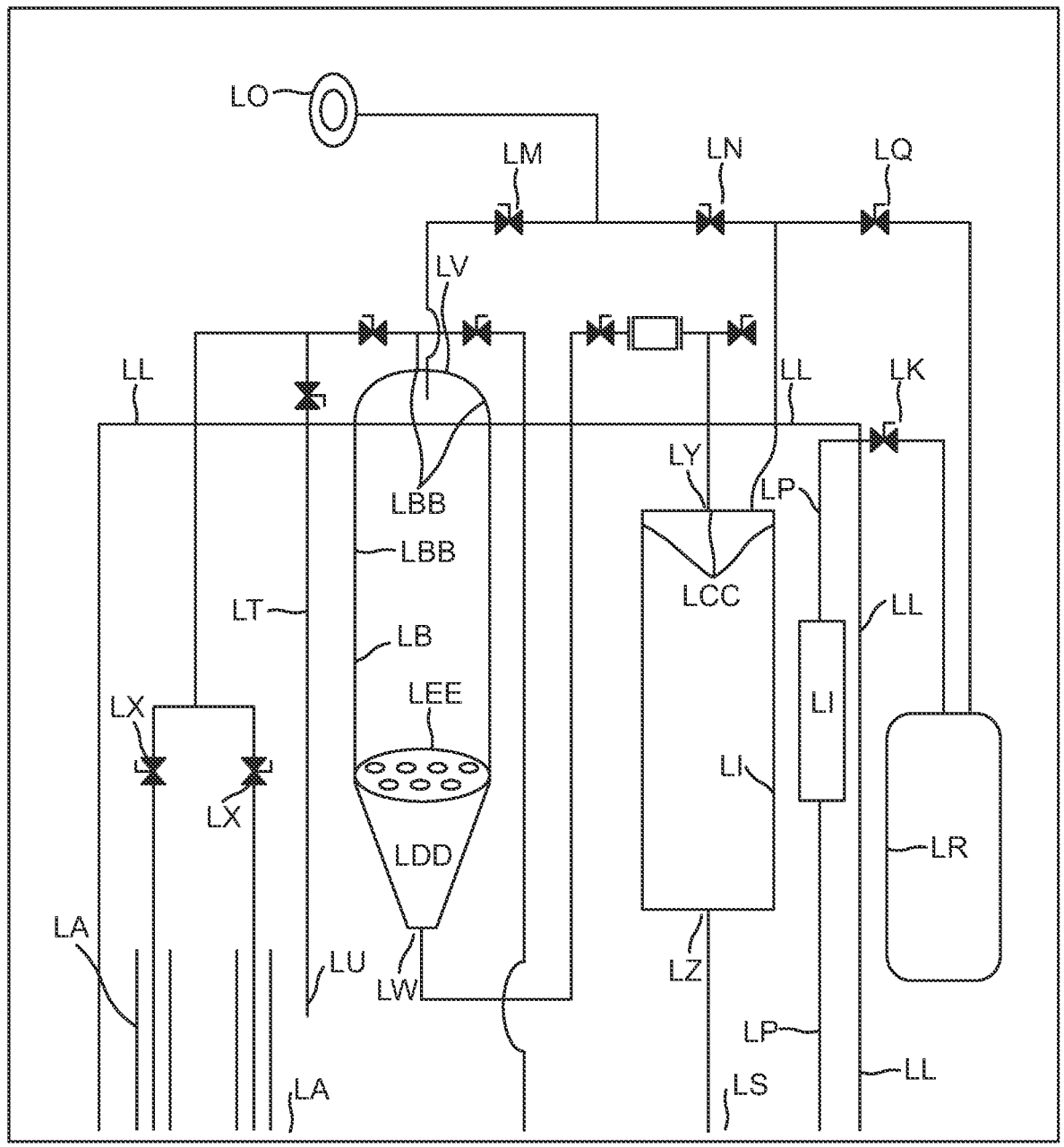

FIG. 2 discloses the same system as shown in FIG. 1, but with additional structures that are exterior of environmental box, where these additionally disclosed structures include vacuum pump and several valves.

Figure 3:
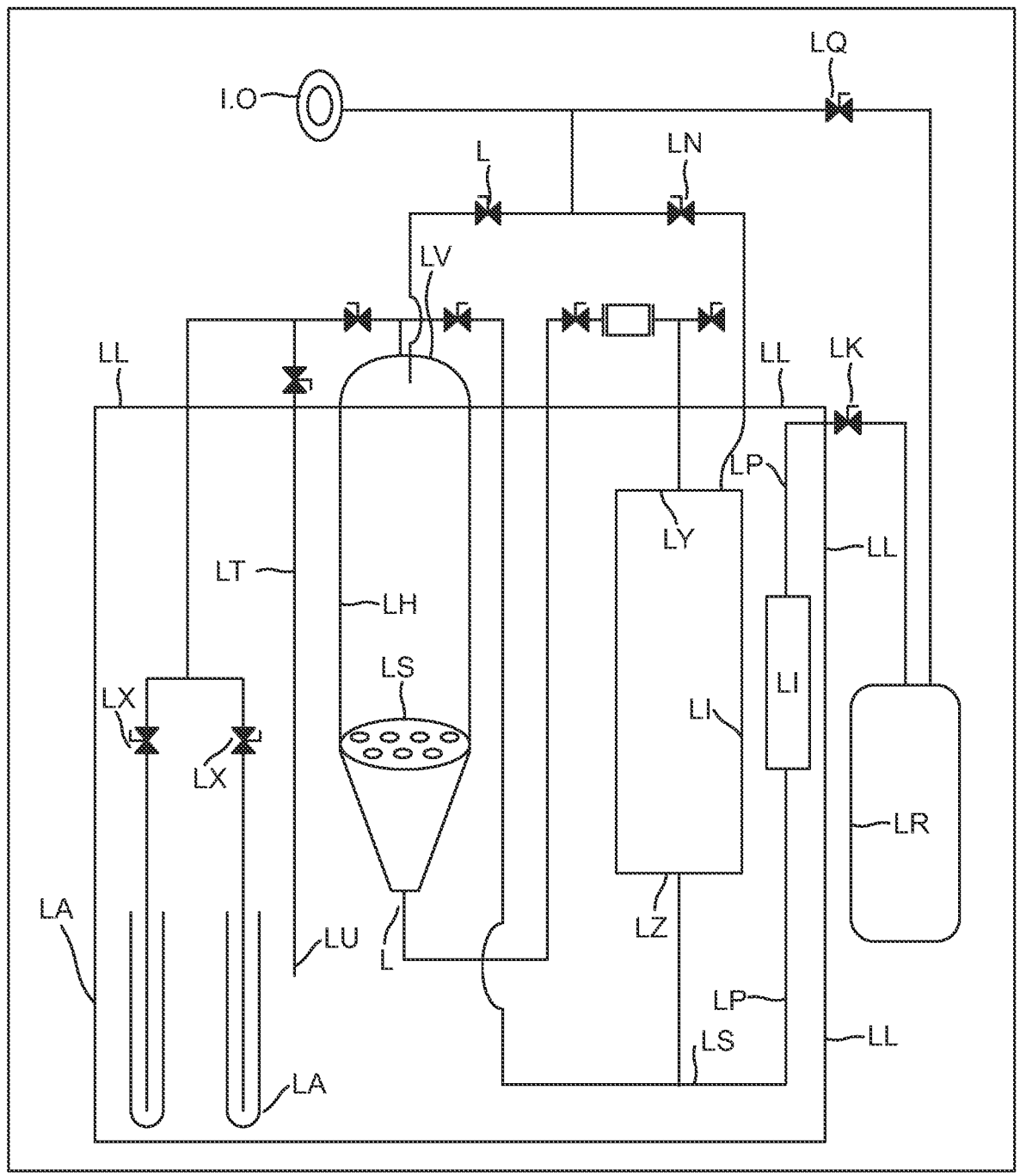

FIG. 3 discloses a variation of the system shown in FIG. 2, where the variation occurs in the positioning of the vacuum line and valve relating to vacuum pump and evacuation tank.

Figure 4:
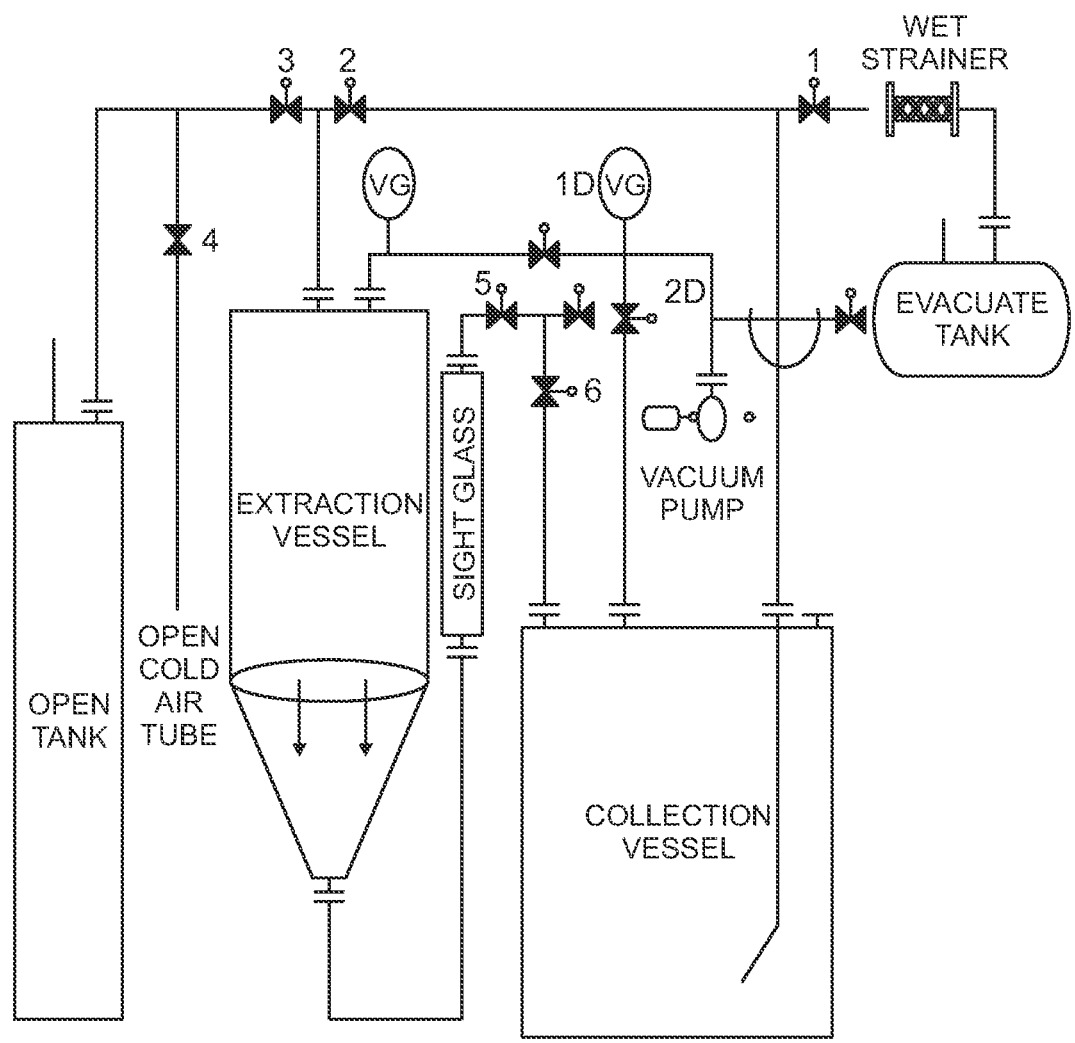

FIG. 4 discloses a variation of the system shown in FIG. 1 and FIG. 2.

Figure 5:
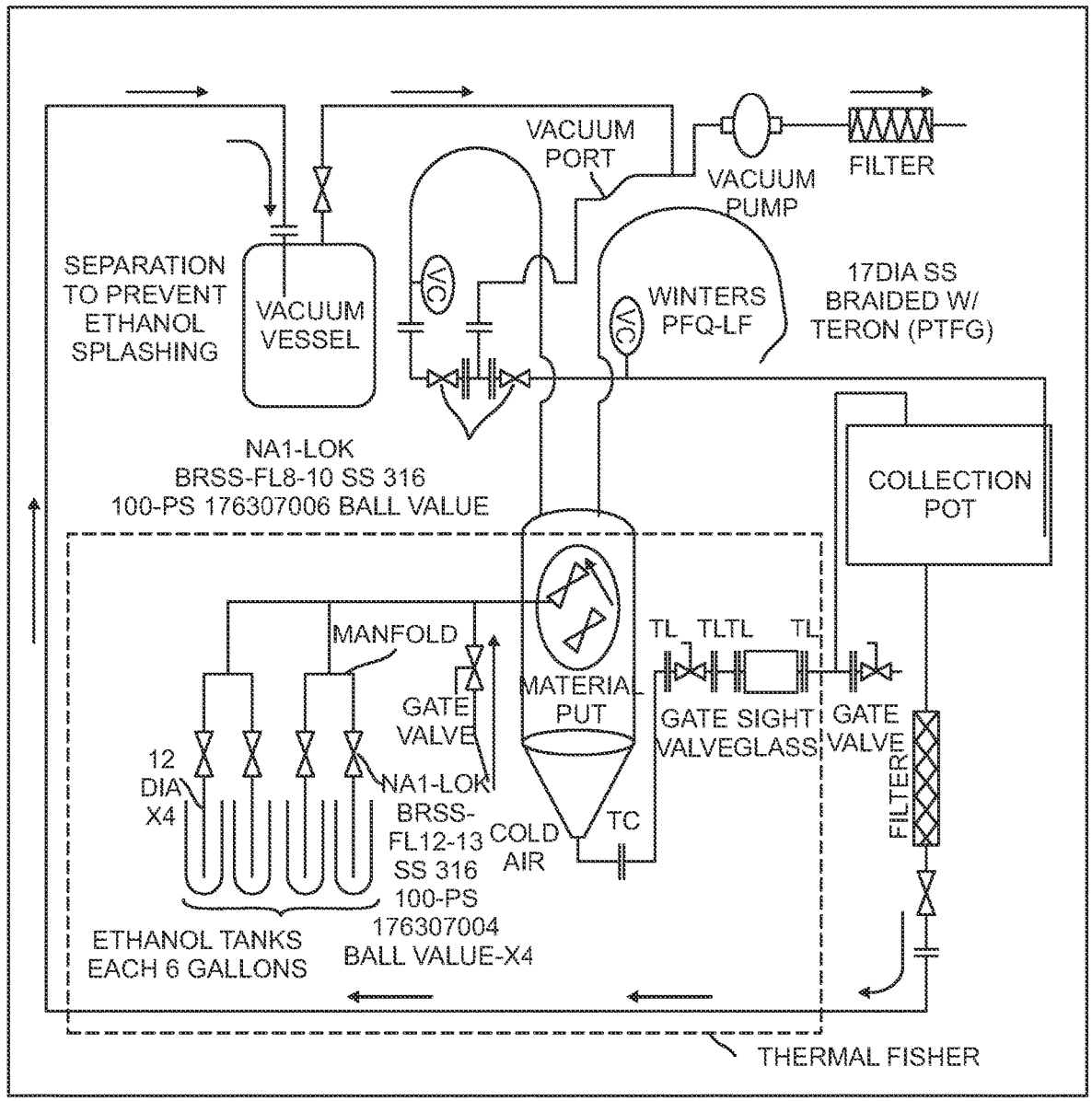

FIG. 5 discloses a variation of the system shown in FIG. 1 and FIG. 2.

FIG. 6. Yield obtained from 5 mL of ethanol extracts, where extraction was at one of 0° C., minus 10° C., minus 30° C., minus 50° C., and minus 70° C., after evaporation of the extract at fifty degrees C.

Figure 7:
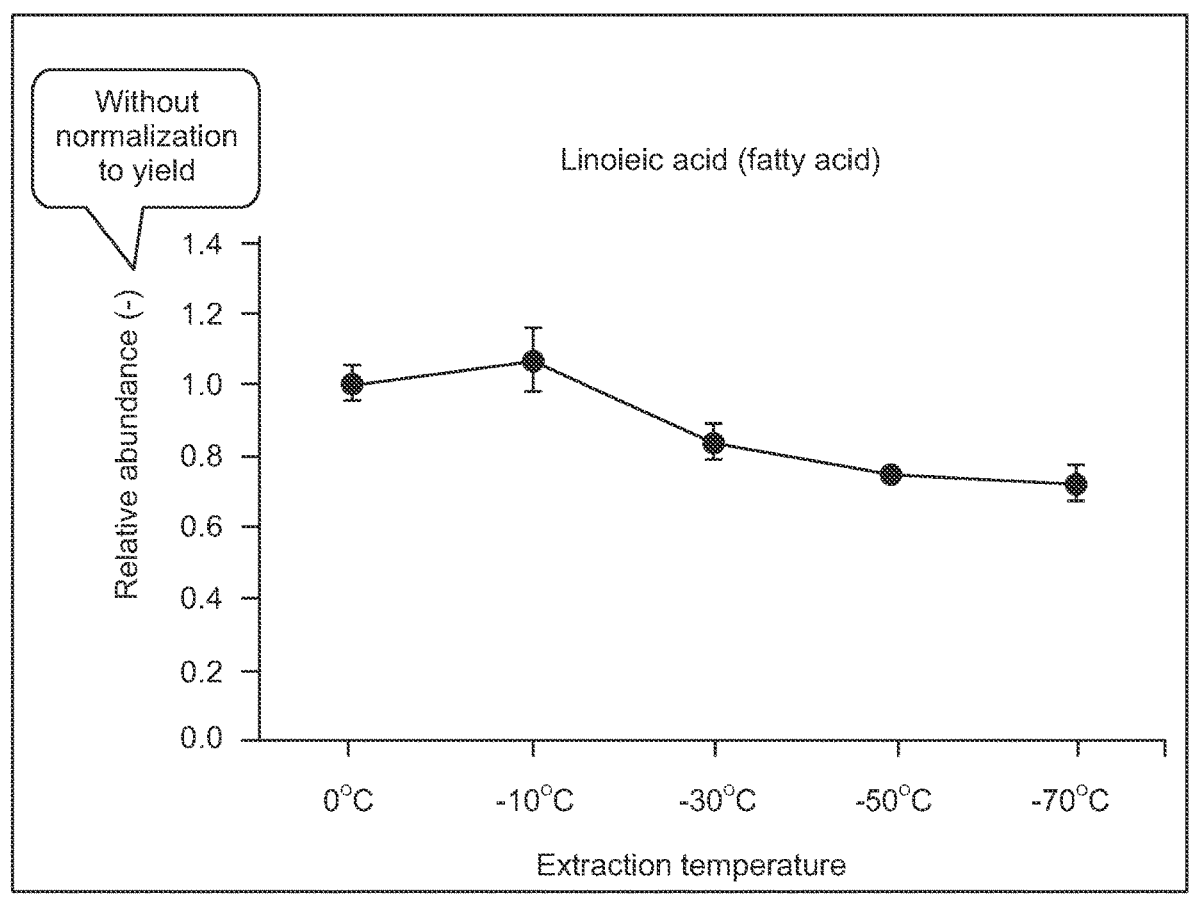

FIG. 7A. Relative abundance of linoleic acid (without normalization to yield).

Figure 8A:
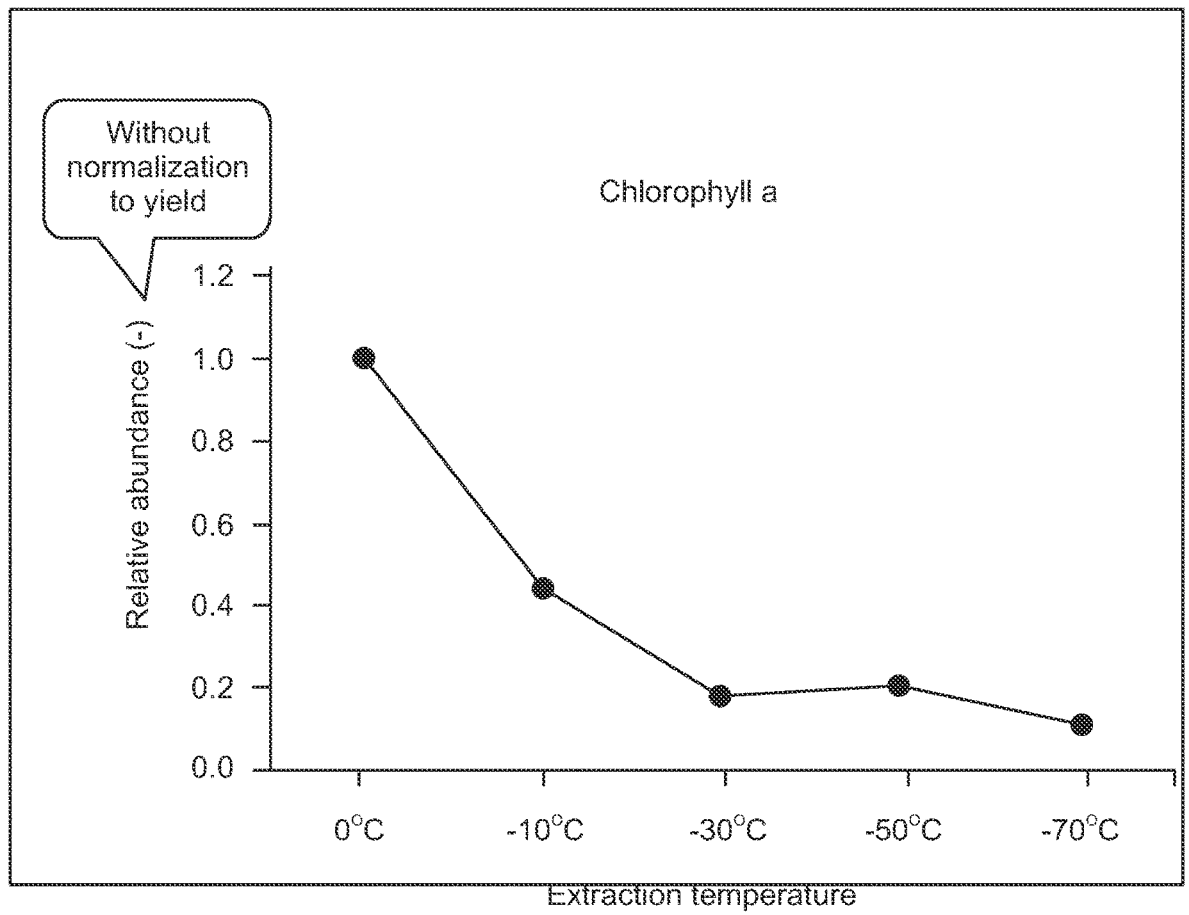

FIG. 8A. Relative abundance of chlorophyll A (without normalization to yield).

Figure 8B:
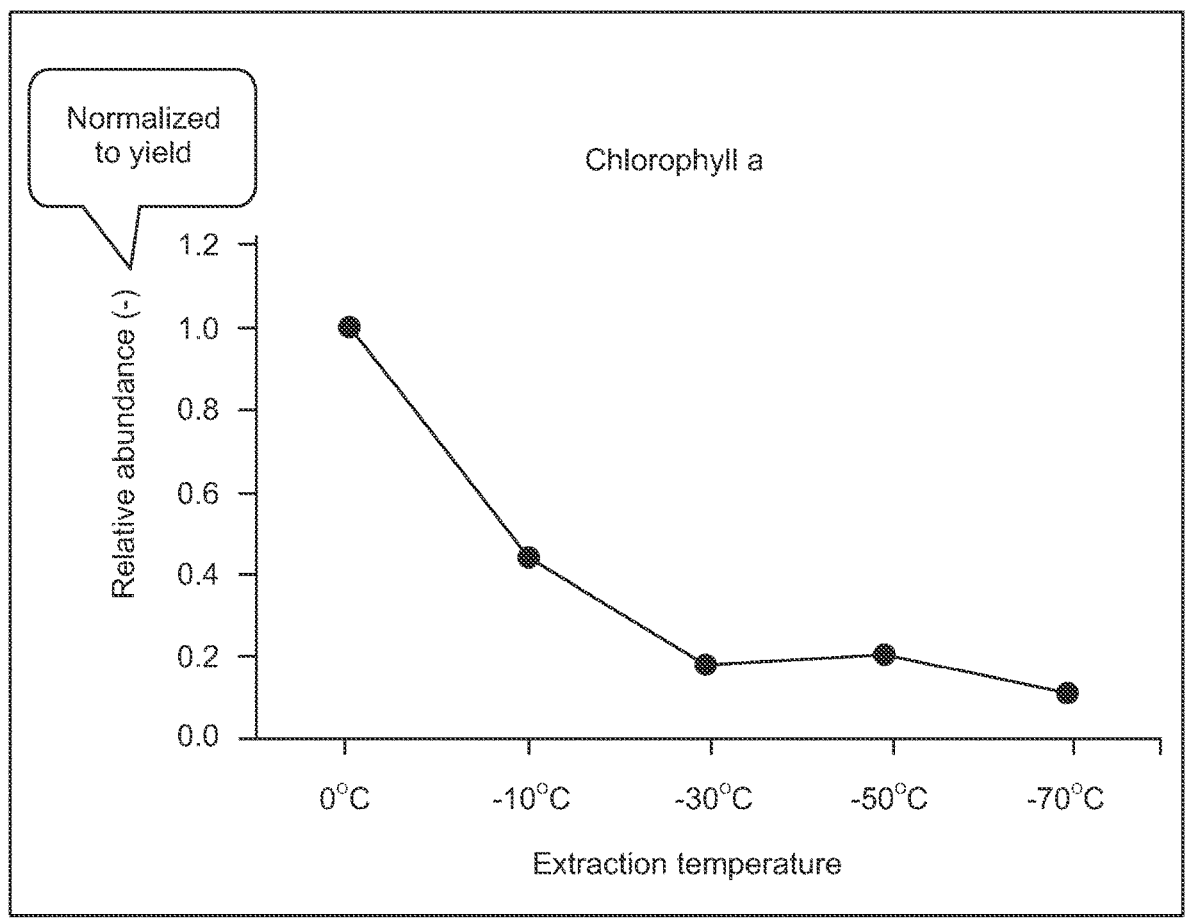

FIG. 8B. Relative abundance of chlorophyll A (normalized to yield).

Figure 9A:
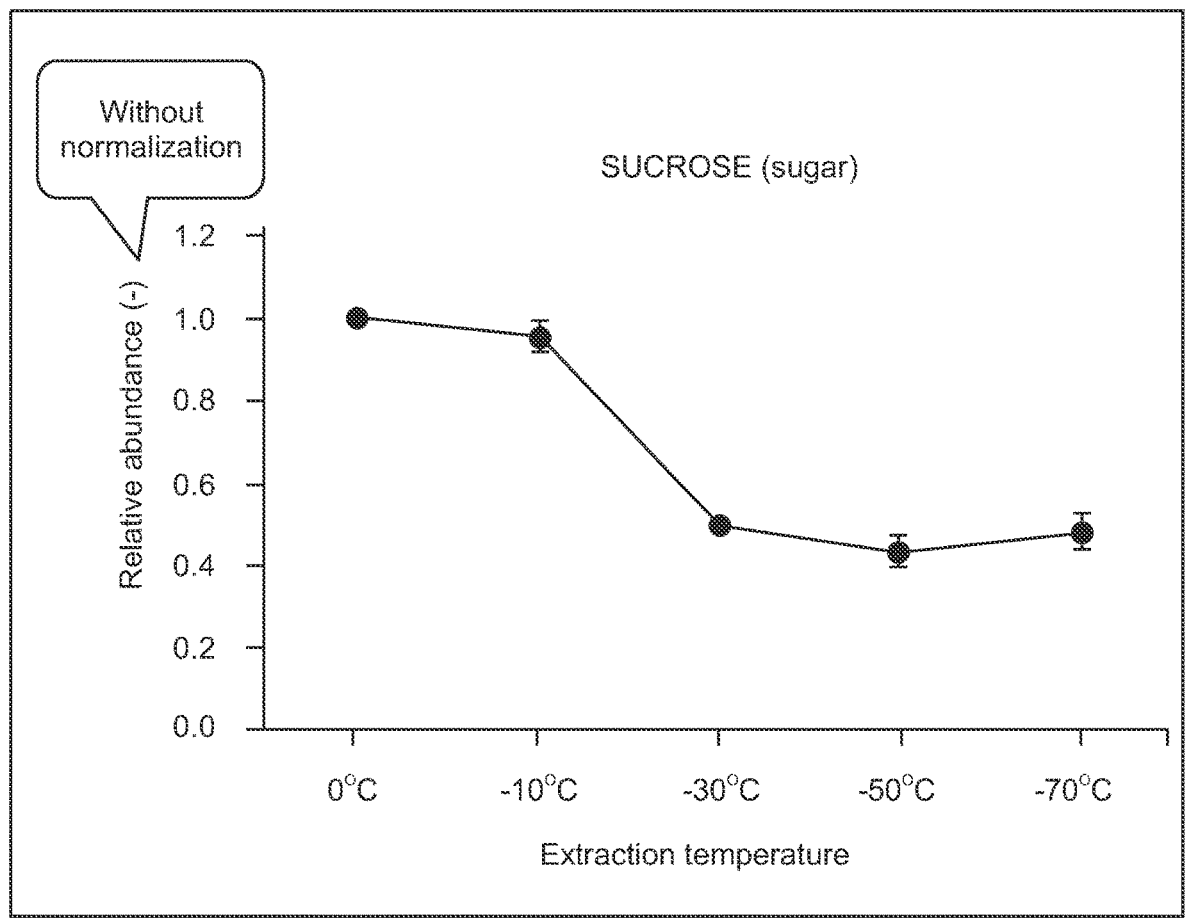

FIG. 9A. Relative abundance of sucrose (without normalization to yield).

Figure 9B:
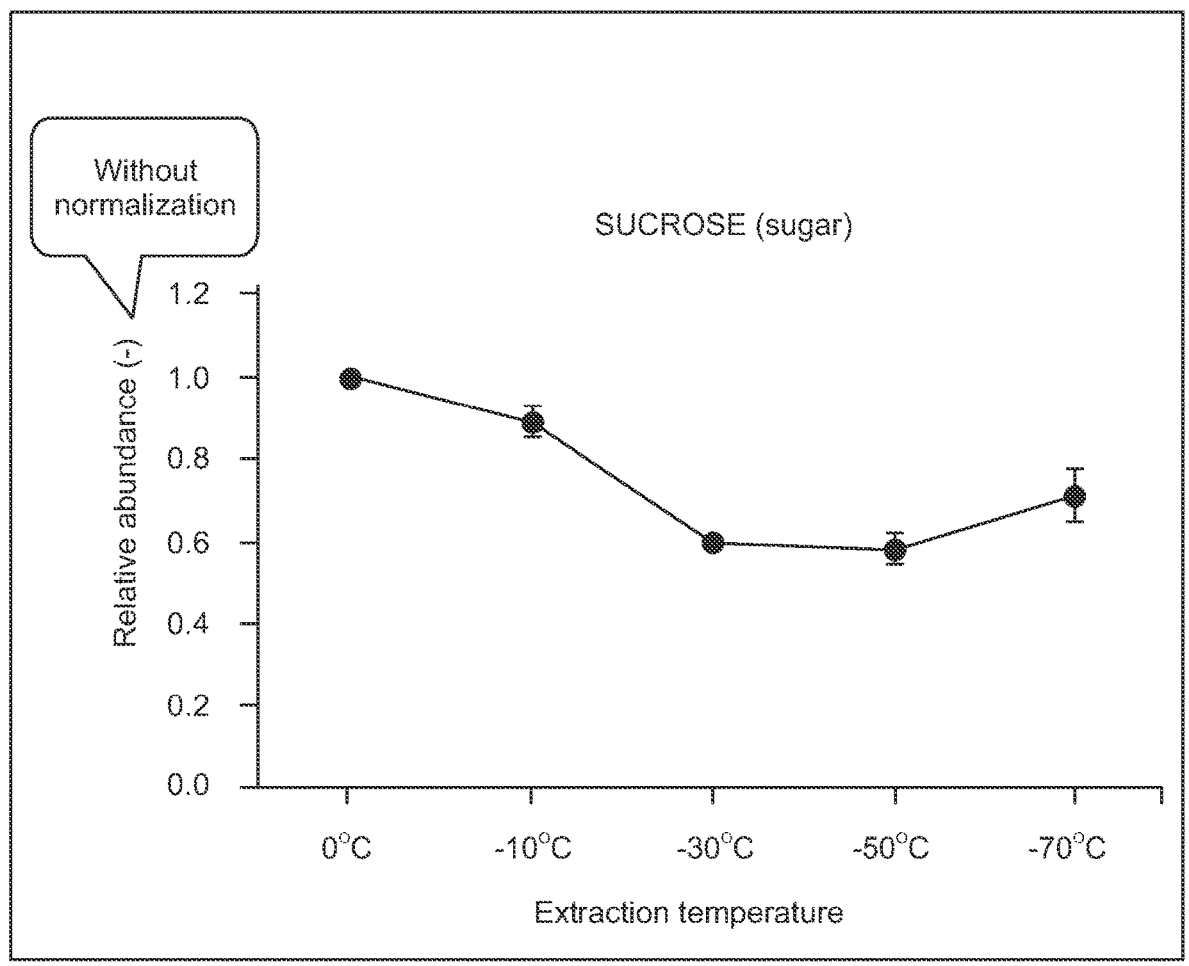

FIG. 9B. Relative abundance of sucrose (normalized to yield).

Figure 10A:
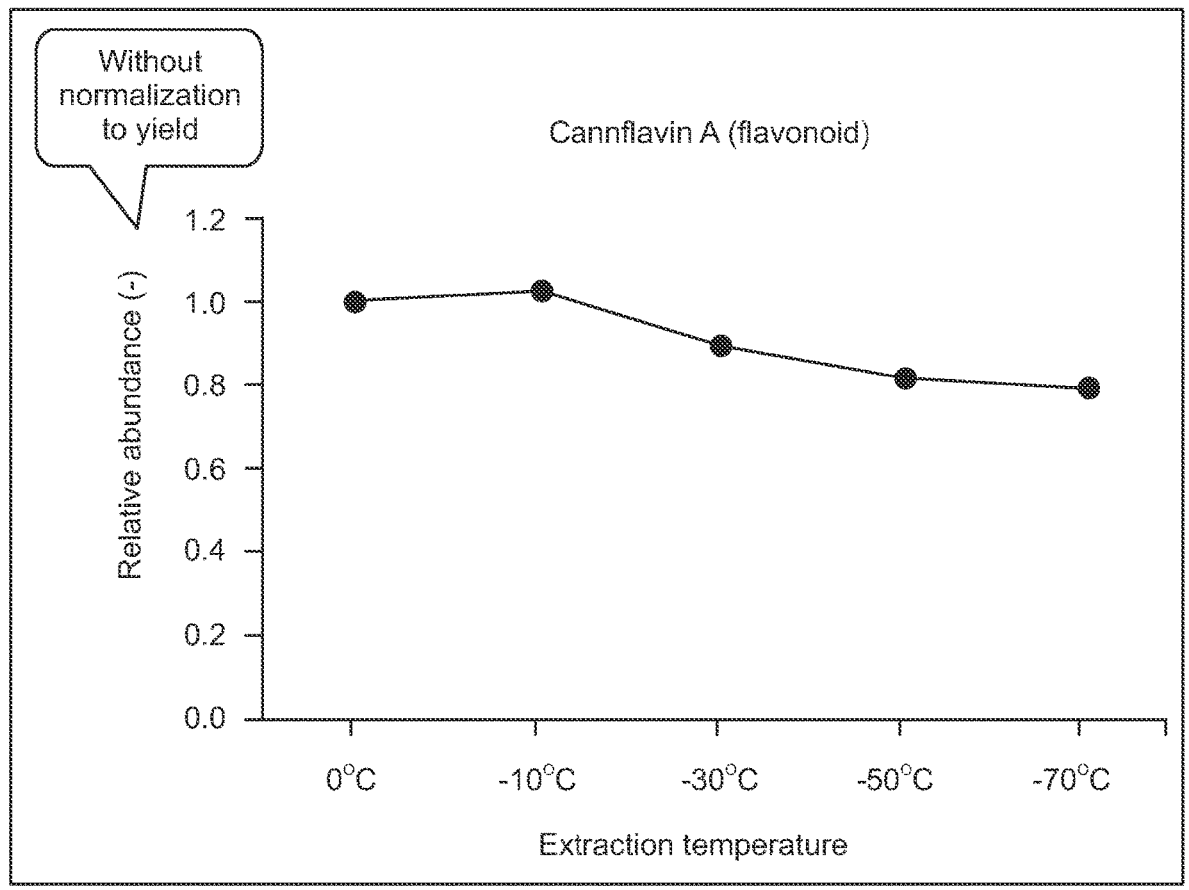

FIG. 10A. Relative abundance of cannflavin A (flavonoid) (without normalization to yield).

Figure 10B:
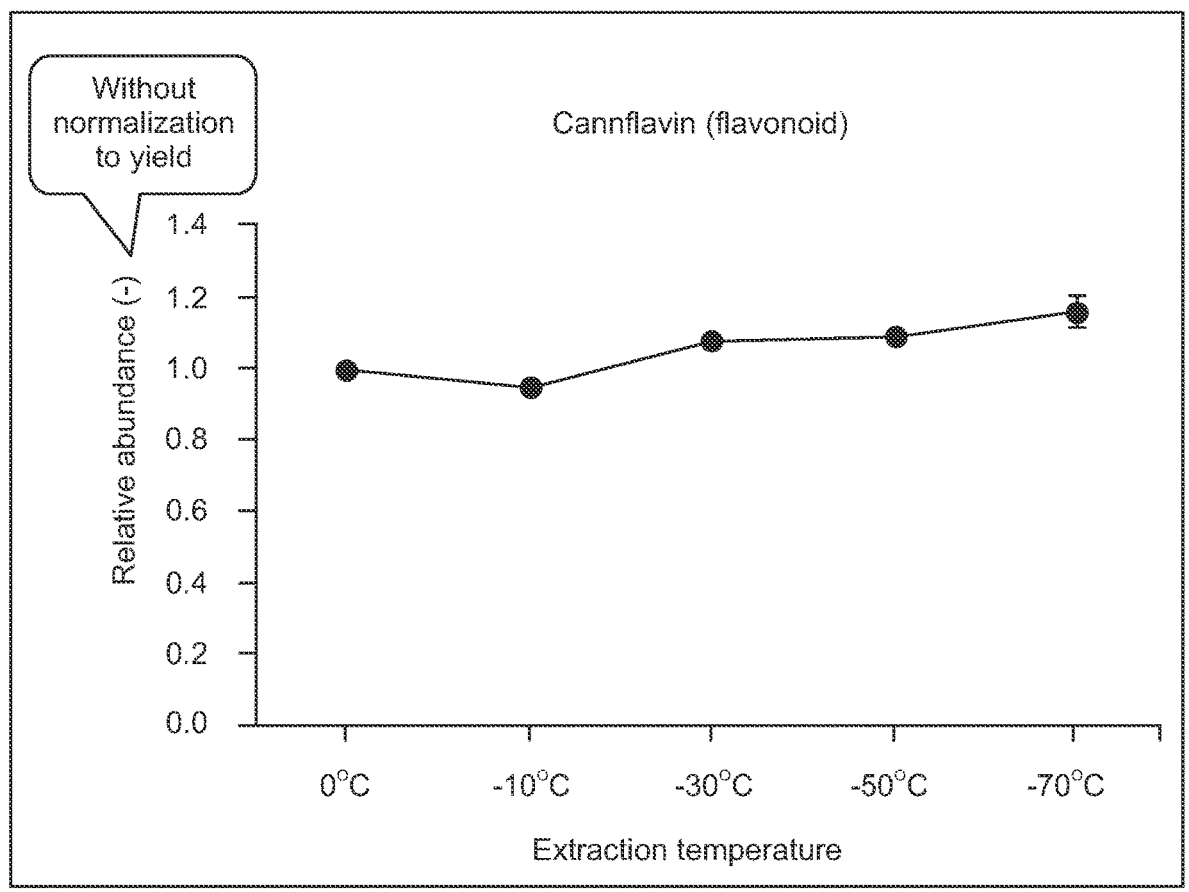

FIG. 10B. Relative abundance of cannflavin A (flavonoid) (normalized to yield).

Figure 11A:
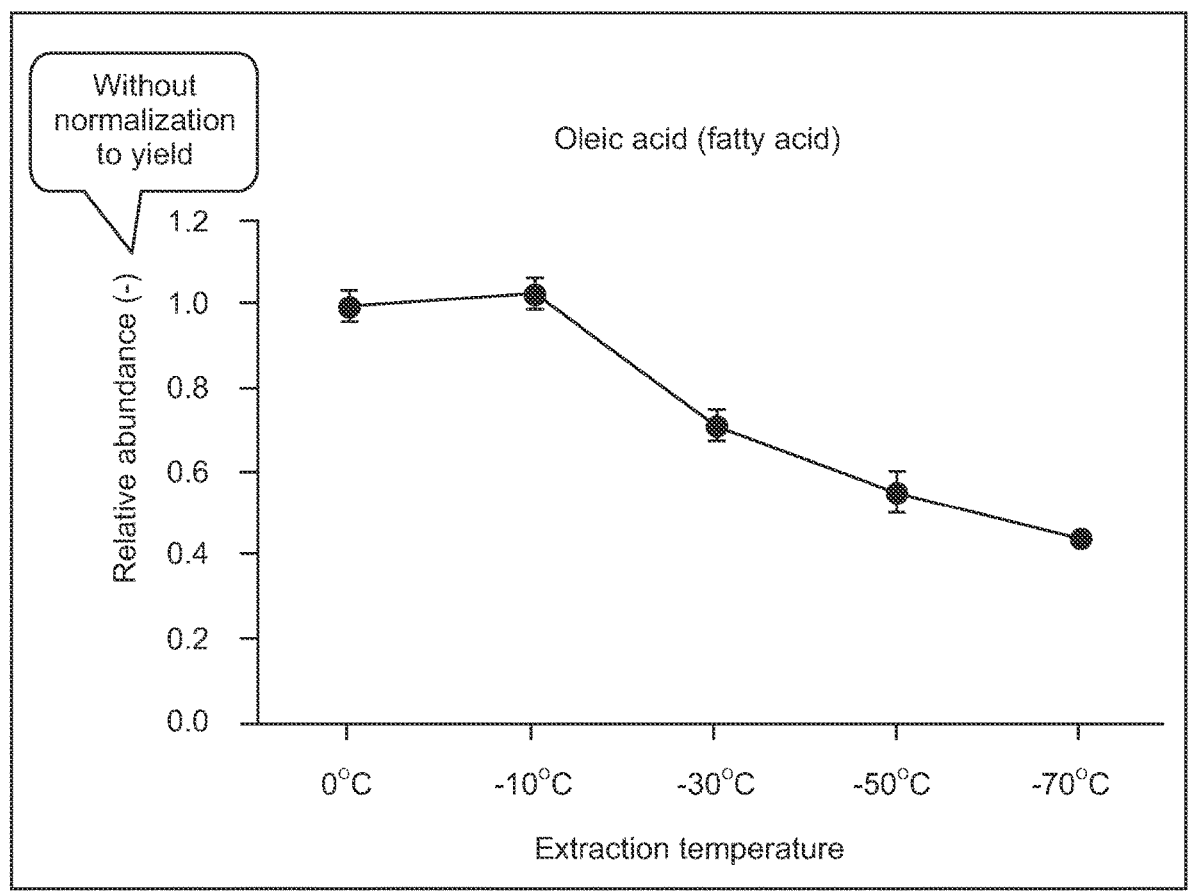

FIG. 11A. Relative abundance of oleic acid (fatty acid) (without normalization to yield).

Figure 11B:
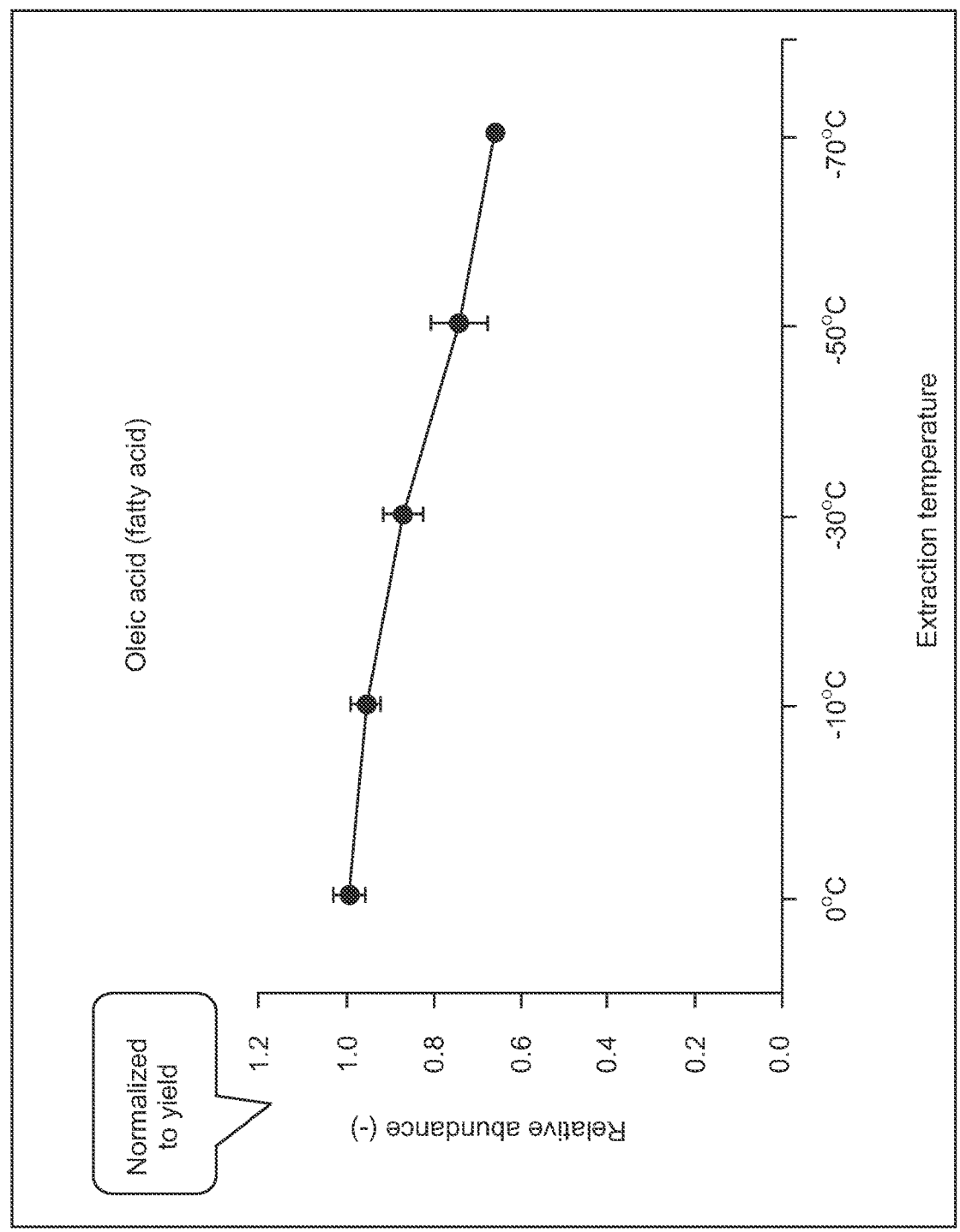

FIG. 11B. Relative abundance of oleic acid (fatty acid) (normalized to yield).

Figure 12:
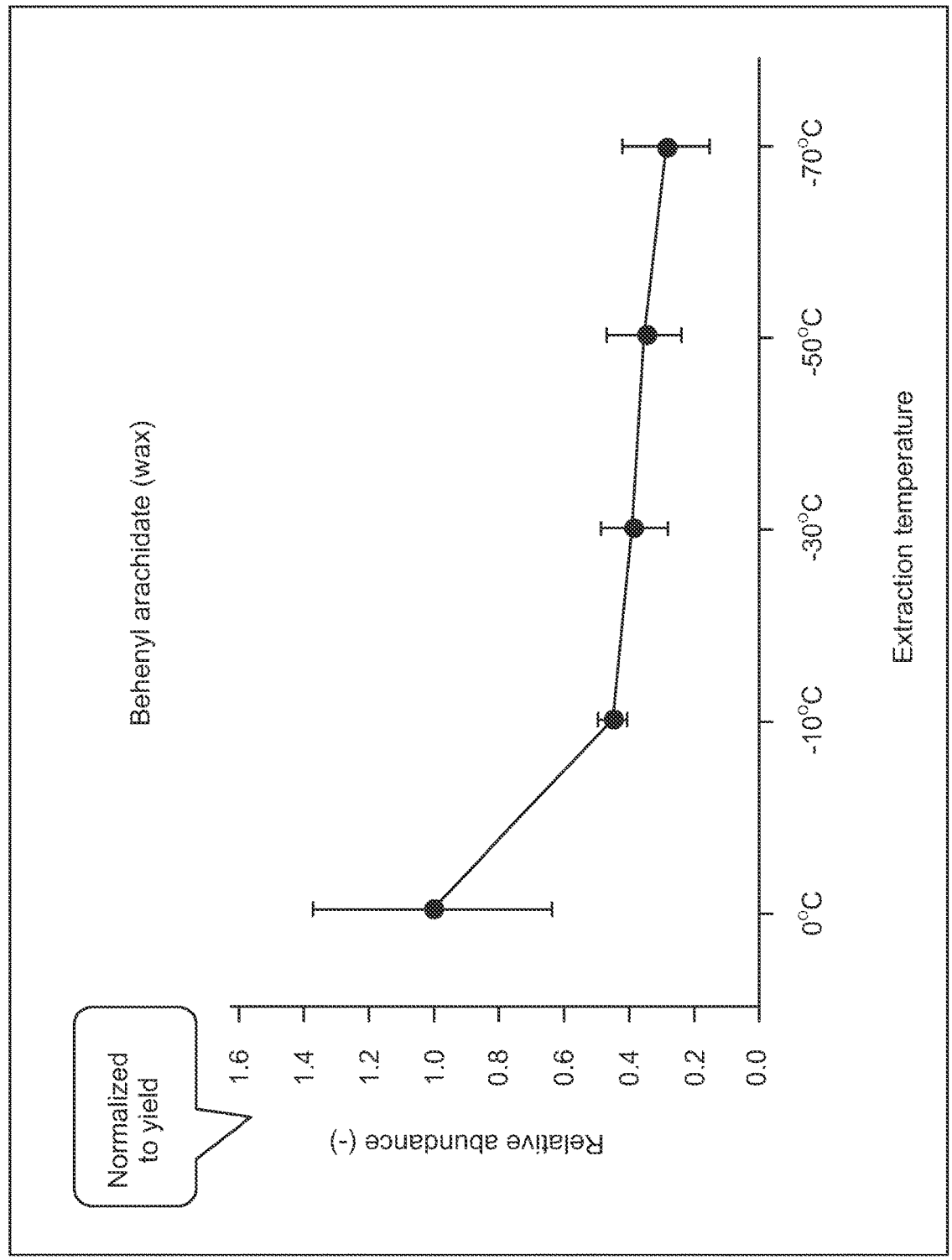

FIG. 12 likewise depicts Benenyl arachidate (wax) (normalized to yield).

FIG. 13. Table showing peak area from chromatograph data, of six different chemicals (data normalized by yield).

FIG. 14. Table showing peak area from chromatogram data, of six different chemicals (data not normalized).

FIG. 15. Table showing relative abundance of six different chemicals (data normalized by yield).

FIG. 16. Table showing relative abundance of six different chemicals (data not normalized).

"About" limitations, as it applies to temperature. Where a specific temperature is identified as being, "about," the term about can mean, plus or minus one degree C., plus or minus two degrees C., plus or minus three degrees C., plus or minus four degrees C., plus or minus five degrees C., and so on.

Exemplary Dry Weight of Cannabinoid in the Dried Extract.

This provides various yield values of total cannabinoids, or of specific cannabinoids, or of mixtures of two, three, four, five, or six specific cannabinoids. The recited values for "yield" are with regard to weight of dried ethanol extract (after drying the ethanol extract, but before reconstitution and before removing aliquots of the reconstituted extract for chromatographic analysis). The yield (percent by weight of total amount of a given dried cannabinoid derived from a given unfractionated dried extract) are disclosed by the following exemplary values for the yield. These yield values can apply to, total plant-derived cannabinoids (phytocannabinoids), tetrahydrocannabinol (THC), delta-9-THC, delta-8-THC, cannabidiol (CBD), tetrahydrocannabinolic acid (THCA), cannabidiolic acid (CBDA), cannabigerol (CBG), cannabichromene (CBC), cannabicyclol (CBL), cannabivarin (CBV), tetrahydrocannabivarin (THCV), cannabidivarin (CBDV), and so on. Actually, what is provided below is the "relative abundance" of the indicated cannabinoid.

Relative Abundance Values with Normalization.

Values for total cannabinoid content, with normalization to the yield (extraction at minus 30 degrees C.). The present disclosure provides systems, compositions, oils, extracts, powders, and related methods, where the relative abundance for total cannabinoids with resulting from extraction at minus 30 degrees C., is about 10, about 8, about 6, about 4, about 2, about 1, about 0.8, about 0.6, about 0.4, about 0.2, about 0.1, or about 0.05.

The present disclosure provides systems, compositions, oils, powders, and related methods, where the relative abundance for total cannabinoids resulting from extraction at minus 30 degrees C., is at least 10, at least 8, at least 6, at least 4, at least 2, at least 1, at least 0.8, at least 0.6, at least 0.4, at least 0.2, at least 0.1, or at least 0.05.

The present disclosure also provides systems, compositions, oils, extracts, powders, and related methods, where the above values refer to only one type of cannabinoid, such as THC, delta-8 THC, delta-9 THC, cannabidiol, and so on, as well as to designated mixtures of two or more cannabinoids.

Values for total cannabinoid content, with normalization to the yield (extraction at minus 50 degrees C.). The present disclosure provides systems, compositions, oils, extracts, powders, and related methods, where the relative abundance for total cannabinoids to the yield resulting from extraction at minus 50 degrees C., is about 10, about 8, about 6, about 4, about 2, about 1, about 0.8, about 0.6, about 0.4, about 0.2, about 0.1, or about 0.05.

The present disclosure provides systems, compositions, oils, extracts, powders, and related methods, where the relative abundance for total cannabinoids to the yield resulting from extraction at minus 50 degrees C., is at least 10, at least 8, at least 6, at least 4, at least 2, at least 1, at least 0.8, at least 0.6, at least 0.4, at least 0.2, at least 0.1, or at least 0.05.

The present disclosure also provides systems, compositions, oils, extracts, powders, and related methods, where the above values refer to only one type of cannabinoid, such as THC, delta-8 THC, delta-9 THC, cannabidiol, tetrahydrocannabinolic acid (THCA), cannabidiolic acid (CBDA), cannabigerol (CBG), and so on, as well as to designated mixtures of two or more cannabinoids.

Values for total cannabinoid content, with normalization to the yield (extraction at minus 70 degrees C.). The present disclosure provides systems, compositions, oils, extracts, powders, and related methods, where the relative abundance for total cannabinoids to the yield resulting from extraction at minus 70 degrees C., is about 10, about 8, about 6, about 4, about 2, about 1, about 0.8, about 0.6, about 0.4, about 0.2, about 0.1, or about 0.05.

The present disclosure provides systems, compositions, oils, extracts, powders, and related methods, where the relative abundance for total cannabinoids to the yield resulting from extraction at minus 70 degrees C., is at least 10, at least 8, at least 6, at least 4, at least 2, at least 1, at least 0.8, at least 0.6, at least 0.4, at least 0.2, at least 0.1, or at least 0.05.

The present disclosure also provides systems, compositions, oils, extracts, powders, and related methods, where the above values refer to only one type of cannabinoid, such as THC, delta-8 THC, delta-9 THC, cannabidiol, tetrahydrocannabinolic acid (THCA), cannabidiolic acid (CBDA), cannabigerol (CBG), and so on, as well as to designated mixtures of two or more cannabinoids.

In embodiments, the term "about" can refer to a range that extends to both the half-way mark between the next higher value and the half-way mark between the next lower value.

Narrower "about" ranges are contemplated. The term "about" can refer to a range that extends to both the quarter-way mark between the next higher value and the quarter-way mark between the next lower value.

Relative Abundance Values without Normalization.

Values for total cannabinoid content, without normalization to the yield (extraction at minus 30 degrees C.). The present disclosure provides systems, compositions, oils, extracts, powders, and related methods, where the relative abundance for total cannabinoids with resulting from extraction at minus 30 degrees C., is about 10, about 8, about 6, about 4, about 2, about 1, about 0.8, about 0.6, about 0.4, about 0.2, about 0.1, or about 0.05.

The present disclosure provides systems, compositions, oils, extracts, powders, and related methods, where the relative abundance for total cannabinoids resulting from extraction at minus 30 degrees C., is at least 10, at least 8, at least 6, at least 4, at least 2, at least 1, at least 0.8, at least 0.6, at least 0.4, at least 0.2, at least 0.1, or at least 0.05.

The present disclosure also provides systems, compositions, oils, extracts, powders, and related methods, where the above values refer to only one type of cannabinoid, such as THC, delta-8 THC, delta-9 THC, cannabidiol, tetrahydrocannabinolic acid (THCA), cannabidiolic acid (CBDA), cannabigerol (CBG), and so on, as well as to designated mixtures of two or more cannabinoids.

Values for total cannabinoid content, without normalization to the yield (extraction at minus 50 degrees C.). The present disclosure provides systems, compositions, oils, extracts, powders, and related methods, where the relative abundance for total cannabinoids to the yield resulting from extraction at minus 50 degrees C., is about 10, about 8, about 6, about 4, about 2, about 1, about 0.8, about 0.6, about 0.4, about 0.2, about 0.1, or about 0.05.

The present disclosure provides systems, compositions, oils, extracts, powders, and related methods, where the relative abundance for total cannabinoids to the yield resulting from extraction at minus 50 degrees C., is at least 10, at least 8, at least 6, at least 4, at least 2, at least 1, at least 0.8, at least 0.6, at least 0.4, at least 0.2, at least 0.1, or at least 0.05.

The present disclosure also provides systems, compositions, oils, extracts, powders, and related methods, where the above values refer to only one type of cannabinoid, such as THC, delta-8 THC, delta-9 THC, cannabidiol, tetrahydrocannabinolic acid (THCA), cannabidiolic acid (CBDA), cannabigerol (CBG), and so on, as well as to designated mixtures of two or more cannabinoids.

Values for total cannabinoid content, with normalization to the yield (extraction at minus 70 degrees C.). The present disclosure provides systems, compositions, oils, extracts, powders, and related methods, where the relative abundance for total cannabinoids to the yield resulting from extraction at minus 70 degrees C., is about 10, about 8, about 6, about 4, about 2, about 1, about 0.8, about 0.6, about 0.4, about 0.2, about 0.1, or about 0.05.

The present disclosure provides systems, compositions, oils, extracts, powders, and related methods, where the relative abundance for total cannabinoids to the yield resulting from extraction at minus 70 degrees C., is at least 10, at least 8, at least 6, at least 4, at least 2, at least 1, at least 0.8, at least 0.6, at least 0.4, at least 0.2, at least 0.1, or at least 0.05.

The present disclosure also provides systems, compositions, oils, extracts, powders, and related methods, where the above values refer to only one type of cannabinoid, such as THC, delta-8 THC, delta-9 THC, cannabidiol, tetrahydrocannabinolic acid (THCA), cannabidiolic acid (CBDA), cannabigerol (CBG), and so on, as well as to designated mixtures of two or more cannabinoids.

In embodiments, the term "about" can refer to a range that extends to both the half-way mark between the next higher value and the half-way mark between the next lower value. Narrower "about" ranges are contemplated. The term "about" can refer to a range that extends to both the quarter-way mark between the next higher value and the quarter-way mark between the next lower value.

Values for Cannabinoid Content (In Terms of Dry Weight) Relative to a Given Value of Chlorophyll a Content (In Terms of Dry Weight).

The present disclosure provides systems, compositions, oils, extracts, powders, and related methods, where the total cannabinoid content following extraction (extraction at minus 30 degrees) by the methods of the present disclosure, is at least 100% by weight (1.0 times) of the total extraction of chlorophyll A, at least 1.2 times, at least 1.4 times, at least 1.6 times, at least 1.8 times, at least 2.0 times, at least 2.2 times, at least 2.4 times, at least 2.6 times, at least 2.8 times, at least 3.0 times, at least 3.5 times, at least 4.0 times, at least 5 times, at least 6 times, at least 8 times, at least 10 times, at least 15 times, at least 20 times, at least 25 times, at least 30 times, at least 35 times, at least 40 times, at least 45 times, at least 50 times, at least 60 times, at least 70 times, at least 80 times, at least 90 times, at least 100 times, at least 120 times, at least 140 times, at least 160 times, at least 180 times, at least 200 times, at least 240 times, at least 280 times, at least 300 times, by weight that of the total extraction of chlorophyll A.

As an alternative to using the above cutoff values to refer to an amount of total cannabinoid relative to amount of chlorophyll A, the above cutoff values can refer to an amount of THC, to an amount of delta-8 THC, to an amount of delta-9 THC, to an amount of cannabidiol (CBD), to an amount of tetrahydrocannabinolic acid (THCA), to an amount of cannabidiolic acid (CBDA), to an amount of cannabigerol (CBG), or to an amount of two or more of the above-named cannabinoids, relative to an amount relative to an amount of chlorophyll A.

As an alternative to using the above cutoff values that are relative to an amount of chlorophyll A, the skilled artisan can use an amount of total lipids, or to an amount of total waxes, or to an amount of linoleic acid (a fatty acid), or to an about of cannflavin A (a flavonoid), and so on.

DETAILED DESCRIPTION

As used herein, including the appended claims, the singular forms of words such as "a," "an," and "the" include their corresponding plural references unless the context clearly dictates otherwise. All references cited herein are incorporated by reference to the same extent as if each individual patent, and published patent application, as well as figures, drawings, sequence listings, compact discs, and the like, was specifically and individually indicated to be incorporated by reference.

Meanings of Terms

The present disclosure provides a system that has structures enclosed by a low temperature freezer, where the freezer maintains low temperatures of devices within the freezer, such as solvent tanks, extraction tank, collection tank, and fluid transmission lines that connect these devices. The fluid transmission lines may take the form of pipes, hoses, tubing, and the like. Also, the system includes structures that reside outside of the freezer, such as lines leading from a vacuum pump to extraction tank, to collection tank, and to an evacuation tank. The evacuation tank is preferably outside of the freezer. The terms "fluid line," "line," and "fluid transmission line," and the like are synonymous, unless defined otherwise or indicated otherwise by the context.

"Derived" as in plant matter "derived" from a given plant, refers to plant matter that is derived by one or more of harvesting, chopping, extracting (with a solvent such as ethanol, acetone, diethyl ether, butane, or ether), or extracting with water, with a "non-solvent" such as vegetable oil, or combinations thereof), drying, grinding, slicing, folding, desiccating, drying at room temperature under atmospheric conditions, drying at room temperature under vacuum, drying at an elevated temperature, e.g., 50 degrees C., under atmospheric conditions, or drying at elevated temperature at a elevated temperature, e.g., 50 degrees C., and so on. Preferred methods of deriving are methods that minimally damage the plant or that minimally release one or more of oils, resins, aromatics, fat-soluble chemicals, and water-soluble chemicals, from the plant.

In exclusionary embodiments, the system, device, compositions, reagents, extracts, oils, and methods of the present disclosure can exclude any system, device, composition, or extract, that was prepared by one or more of the above-disclosed methods, and can exclude any procedure that includes one or more of the above-disclosed methods.

A goal of the system is to extract plant matter at a sub-zero temperature, where extraction is via a solvent such as ethanol, and where the sub-zero temperature enables the selective extraction of certain chemicals, but not of other chemicals, from plant matter. The plant matter may be cannabis, and the chemicals to be extracted are cannabinoids, and the chemicals to be left behind and not extracted include chlorophyll. The freezer is named "environment box." The "environment box" can take various forms, where all of these forms are encompassed by this term, unless expressly stated otherwise or dictated by the context. The environment box can be an insulated box with a built-in refrigeration unit. Alternatively, the environment box can be an insulated box where the interior is cooled by a separate refrigeration unit, for example, where the separate refrigeration unit delivers cold air that is circulated throughout environment box (or where a separate refrigeration unit delivers cold fluid via pipeline, where pipeline is connected to a network of pipes, serving as a heat exchanger, that reside in environment box).

In the present disclosure, the terms "extraction tank" and "extraction vessel" refer to the same thing. Also, the terms "collection tank" and "collection vessel" refer to the same thing. The term "plant matter" and "plant material" refer to the same thing, unless specified otherwise.

Table 1 provides a legend that identifies structures in the figures. Where a structure is illustrated and identified in one figure, and where a corresponding structure is illustrated (but not identified) in another figure, the skilled artisan will be able to compare the figures, and by referring to the legend will be able to identify the corresponding structure in the other figure.

TABLE 1

Legend Identifying Structures in the Figures
Table 1. Legend that identifies structures in the figures

| | |
|---|---|
| 1.A | Solvent storage tank |
| 1.B | Cold air intake valve (airlock valve) |
| 1.C | Solvent flooding valve |
| 1.D | Solution return valve |
| 1.E | Solution collection valve |
| 1.F | Sight glass |
| 1.G | Ambient atmosphere sucking valve |
| 1.H | Extraction tank |
| 1.I | Collection tank |
| 1.J | Inline filter housing |
| 1.K | Evacuation valve |
| 1.L | Environment box |
| 1.M | Extraction tank vacuum valve |
| 1.N | Collection tank vacuum valve |
| 1.O | Evacuation tank vacuum pump |
| 1.P | Evacuation line |
| 1.Q | Vacuum valve |
| 1.R | Evacuation tank |
| 1.S | Collection tank branching point |
| 1.T | Cold air intake tube |
| 1.U | Cold air intake tube air inlet |
| 1.V | Extraction tank inlet |
| 1.W | Extraction tank outlet |
| 1.X | Solvent tank valve |
| 1.Y | Collection tank inlet |
| 1.Z | Collection tank outlet |
| 1.AA | Extraction tank inlet branching point |
| 1.BB | Extraction tank upper region that, when in use, comprises air (or gas) and not any fluid |
| 1.CC | Collection tank upper region that, when in use, comprises air (or gas) and not any fluid |
| 1.DD | Cone-shaped portion of extraction tank. Cone-shaped portion may be an integrated part of extraction tank, or it may be an "add-on" that is attached to bottom of extraction tank |
| 1.EE | False bottom |

In exclusionary embodiments, the system, device, and methods, of the present disclosure can exclude any system, device, and method that comprises one or more of the structures that are disclosed in this table.

Workpieces and Solvents

A preferred workpiece of the present disclosure takes the form of plant matter. The plant substrate is preferably dry. Drying methods are not crucial for the extraction process. Typically the plant matter is gently ground to a particle size below 0.5 cm$^2$. Mechanical grinding or chopping is not recommended as it opens up cells and undesired co-extracted chemicals can enter the solution. Lignans, sugars, and chlorophyll are some of the co-extracted chemicals found in machine ground plant material extracts. The process for grinding, preferably non-mechanical grinding, should be as gentle as possible. The present disclosure provides an extract produced by processing plant matter by the system and method of the present disclosure. Also, the present disclosure provides composition comprising one or more refined chemicals, as derived from and produced by processing plant matter by the system and method of the present disclosure.

For extraction, 100% ethanol is preferred. Our data has shown that at a ratio of 90% ethanol/10% water, a hydrosol begins to form during the reduction phase (evaporation of ethanol from oil). Although this is not a problem for the extraction process itself, it is a problem for extract post processing. The water must then be separated from the oil. Likewise, the water content in the extract tends to trap some of the water soluble essentials such as terpenes. This can be a problem for operators who intend to produce a full spectrum extract and do not want to lose any essential oils to post processing.

In exclusionary embodiments, the present system, method, and compositions produced by the system, can exclude any system and method where ethanol is not used for extracting, and can exclude any system and method where ethanol is used for extracting but where the ethanol is not 100% ethanol. Also the present system and method can exclude any system and method, where a hydrosol is formed.

Contact time is typically limited to how long it takes to build ideal vacuum for collection procedure, and this is preferably about 30 seconds. The recirculation procedure requires 5-7 recirculations of the solution over the plant material, this would equate to 30 seconds×7 equals about 4 minutes of actual contact time. But, since the solution is constantly poured over the plant material, and about 20% of the ethanol introduced into the material is actually retained in the material, the plant material is constantly soaked in solution. Once that material is thoroughly wetted through recirculation procedures, it is then rinsed with a fresh batch of ethanol. The clean rinse volume is determined by the operator based on the amount of material placed in the extraction vessel. Usually that is 30% of ethanol to overall weight of material based on a ratio of 1 gallon=1 pounds of plant material.

Extraction preferably batchwise. In exclusionary embodiments, the system and methods of the present disclosure can exclude any extraction method, any system that performs an extraction method, and any composition prepared by that system, where extraction is by a process other than batchwise.

The time for extraction is only determined by the operator and his familiarity with the system. A skilled extraction operator can turn an extraction around in about 15-20 minutes. Turnaround time is limited by how long it takes to get to an appropriate amount of vacuum in a vessel to engage a strong flow. This can vary with different vacuum pumps. A 8 cfm. vacuum pump will take longer to reach optimal vacuum than a 16 cfm vacuum pump.

Ideal vacuum for flooding procedure: −20 inches of mercury (inhg). Ideal vacuum for recirculation procedure: −20 inches of mercury. Ideal vacuum for collection procedure: −28 inches of mercury. Ideal vacuum for evacuation procedure: −28 inches of mercury.

Plurality of Solvent Storage Tanks

System of the present disclosure can comprise one or more solvent storage tanks, where each solvent storage tank is operably linked with a corresponding solvent storage tank valve. In use, only one solvent storage tank is used at a time, that is, for providing solvent to Extraction Tank (1.H). Preferably, each solvent storage tank holds six U.S. gallons. Preferably, system of the present disclosure includes four solvent storage tanks, each with a corresponding storage tank valve. In one aspect, all solvent storage tanks are situated inside of Environment Box (1.L), thereby ensuring that the solvent is kept at the same temperature as that inside the environment box. For initiating delivery of solvent to Extraction Tank (1.L) and for continuing delivery of solvent to extraction tank, cold air intake valve (1.B) is closed, solvent flooding valve (1.C) is opened, and vacuum from vacuum pump is applied to Extraction Tank. In a preferred embodiment, vacuum applied to Extraction Tank is minus 20 inches of mercury.

Cold air intake valve (1.B) is alternatively called, airlock valve or gate valve.

In embodiments, the present disclosure provides a system that comprises one solvent storage tank, two, three, four, five, six, seven, eight, nine, or ten, and the like, solvent storage tanks. The one or more solvent storage tanks of the present disclosure are all housed inside of Environment Box (1.L). In exclusionary embodiments, the present disclosure can exclude any system, device, apparatus, or method, that comprises one or more solvent storage tanks and where at least one of the solvent storage tanks is not enclosed by an environment box. Regarding the present disclosure, an environment box is an airtight enclosure, optionally shaped like a box, that substantially prevents exchange of environmental air with air inside of environment box, and substantially reduces warming of objects, fluids, and plant matter inside of environment box. This reduced warming is accomplished by reducing transfer of heat originating from environmental air to air inside of environment box. Environmental air refers, for example, to room-temperature air that occurs in parts of the laboratory where laboratory personnel conduct their work. "Environmental air" is not the same as air inside of environment box. This definition of air does not refer to molecules and atoms that constitute the air, but instead refers to the location of the air.

Branching Points Residing at Extraction Tank Inlet and at Collection Tank Outlet Regarding flow of solution downstream of collection tank outlet, the relative flow at collection tank branching point, that is, towards the left branch or to the right branch, is controlled by evacuation valve (1.K) and solution return valve (1.D). Closing evacuation valve (1.K) and opening solution return valve (1.D) allows or promotes recirculation of solution from collection tank back to extraction tank. Regarding the flow of solvent and the flow of solution through extraction tank inlet and into extraction tank (1.H), the relative flow at extraction tank branching point, that is, from solvent tank to extraction tank inlet or from collection tank to extraction tank inlet, is controlled by solution flooding valve (1.C) and solution return valve (1.D). In short, opening solution flooding valve (1.C) and closing solution return valve (1.D) promotes or allows transmission of solvent from solvent tank into extraction tank. Conversely, closing solution flooding valve (1.C) and opening solution return valve (1.D) promotes recirculation of solution from collection tank into the extraction tank, for the purpose of further extracting plant matter.

Alternative to Branching Point Structures

Instead of using the branching point structure, the present disclosure provides system where extraction tank branching point and extraction tank inlet is replaced by two extraction tank inlets, where the first extraction tank inlet is dedicated to receiving solvent from solvent tank, and the second extraction tank inlet is dedicated to receiving solution from collection tank. Also the present disclosure provides system where collection tank branching tank and collection tank outlet is replaced by two collection tank outlets, where first collection tank outlet is dedicated to transmitting solution from collection tank back to extraction tank (recirculating the solution), and the second collection tank outlet is dedicated to transmitting solution from collection tank to evacuation line. In exclusionary embodiments, the present disclosure can exclude a system or device that comprises a branching point.

Generally Regarding Valves

The valves shown in the figures include ¾ inch compression valves, ½ inch compression valves, and 1.5 inch sanitary butterfly valves. For the sake of the PID, it may not be critical to utilize any particular design of the valves. In a preferred embodiment, all of the valves are hand powered. The system is manual and requires an operator to perform the extraction. The jacketed system built by the inventors is an automated system and has pneumatic actuators on the valves. The actuators are powered by compressed air, passed through a solenoid actuated by a PLC.

The valves act to either isolate or engage flow. The flow can be of air, vacuum, or liquid. All valves are quarter turn valves that either open or close. No metering is done by the valves on these systems. The direction of flow is determined by the vacuum being applied. If vacuum is applied to extraction vessel, opening a valve on a wet line will draw solution or ethanol into that extraction tank. Likewise, if vacuum is applied to collection vessel, a valve will start or stop the flow of liquid to that tank.

Preferred Uses Inside of Environment Box and Outside of Environment Box

In embodiments, the temperature of the internal cold compartment of the environment box is displayed on a LCD screen on the HMI of the compressors. This temperature reading is enough for an operator to know that the machine is ready for operation. Optionally, thermocouples an be placed into the various tanks and plumbing to monitor the temperatures at every step. A system and method that employs thermocouples is not preferred. The present disclosure can exclude any system and method that employs thermocouples, for example, to monitor the temperature of fluids inside fluid lines and inside tanks or vessels.

If the overall temperature of the system is below −50 C we know that it is ready for operation. The typical temperature setting on the system is −60 C. Having the freezer compartment set below −45 C (ideal temperature for extraction) allows for cooling compensation. Some of the wet plumbing must be externalized due to the positioning of the valves. As we recirculate the solution through out the system, it tends to warm ever so slightly. We always set the freezer component to a lower temperature to compensate for that warming.

Referring to FIG. 1, illustrated is an inventive vessel—wet plumbing and freezer compartment assembly which has produced advantageous results. Super-cooling processes have driven these advantageous results with this system. Solvent Storage Tank (1.A) is operatively and communicatively linked to cold air intake valve (1.B) via known lines to those skilled in the art as shown. Solvent flooding valve (1.C) then runs via lines to the solution return valve (1.D) as shown above Extraction Tank (1.H). Solution collection valve (1.E) is then ported through sight glass (1.F) and down to Extraction Tank (1.I) and is connected to inline filter housing (1.J) along to evacuation valve (1.K).

FIG. 1 shows an inlet at the top of Extraction Tank (1.H). Extraction tank inlet can receive solvent from solvent flooding valve (1.C) is open (and solution return valve (1.D) is closed), and it can receive solution when solution return valve (1.D) is open (and solvent flooding valve (1.C) is closed). The term "solvent" or "clean solvent" refer to solvent prior to exposure to any plant material. The term "solution" refers to any solvent that has been contacted with any plant material. Where any "solution" is recirculated and used to extract a partially extracted plant material, this "solution" is still called a "solution" and is not called a "solvent."

The following explains what controls the proportion of material passing through solvent flooding valve (1.C) versus material passing through solution return valve (1.D). The plumbing is arranged in such a way that two wet lines are connected to a single port at the top of the lid. Once vacuum is built in the Extraction Tank (1.H), valve (1.C) will open the flow of clean ethanol from a Solvent Storage Tank. Likewise, valve (1.D) will engage the flow of solution from the Collection Tank (1.I), back into the Extraction Tank for what is called the "recirculation procedure." The detailed arrangement of the plumbing allows a single port to double as the flooding and recirculating channel. These valves work independently of one another and are never used to flood the Extraction Tank with BOTH, clean ethanol and solution at the same time.

The following concerns the proportion of material passing through valve (1.C) versus material passing through valve (1.D). There is never a time when BOTH clean ethanol and solution are delivered into the Extraction Tank at the same time. Clean ethanol introduction and solution recirculation happen at different stages of the extraction process. Clean solvent is introduced into the Extraction Tank as very FIRST step in the extraction process. Afterwards, a recirculation of the solution over the plant material is what allows maximum extraction efficiency. After a thorough recirculation procedure, another clean batch of ethanol can be introduced into the Extraction Tank to perform a "final cleanse" or "final wash" of the plant substrate. This "final wash" frees up any solution saturated in actives from the plant substrate.

Accordingly, the present disclosure provides a system and method, where clean solvent, such as clean ethanol, is delivered as an "initial batch" into an Extraction Tank as the very first step in the extraction process, followed by one or more steps where clean solvent is not delivered into the Extraction Tank but instead there is a recirculation of solution (solution comprising substances extracted from the plant matter) over the plant material, and where this recirculation provides for maximum extraction of chemicals from the plant matter. After the one or more steps where there is recirculation of solution comprising substances extracted from the plant matter, in some embodiments there is not any further extraction using clean solvent, while in other embodiments, there is a final extraction (final cleanse, final wash) of the plant matter with a "final batch" of clean solvent. The "initial batch" can be delivered all at once, or as more than one consecutive smaller batches, or as two consecutive smaller batches, or as three consecutive smaller batches, and so on. The "final batch" can be delivered all at once, or as more than one consecutive smaller batches, or as two consecutive smaller batches, or as three consecutive smaller batches, and so on.

Introducing Plant Matter into the Extraction Tank

Extraction Tank has a lid. This lid is attached to Extraction Tank via a hinge. The lid opens, allowing tank liner to be inserted into Extraction Tank. Plant material can be top fed, or it can be placed into the tank liner prior to inserting into Extraction Tank. The tank liner is a combination of two polyester materials: a rough, 70 US mesh outer shell, and a fine 508 US mesh inner lining that acts as the filter. The tank liner can be cylindrical, where it resembles in general form and function, a cylindrical coffee filter that is placed into an extraction chamber that has a cylindrical conformation. More familiar are conical coffee filters with a conical extraction chamber, and the tank liner of the present disclosure can also be conical, where it is placed inside a chamber having a conical conformation. Whatever the overall shape, the tank liner is porous, and optionally has both an inner shell and an outer shell.

In the flooding procedure, super-cooled ethanol is drawn from Solvent Tank by vacuum into Extraction Tank at a preferred vacuum of minus 20 inches mercury. After passage of solvent (e.g., ethanol) or solution through extraction tank outlet, solvent or solution can be dispersed over plant matter out of one aperture, out of 2, 3, 4, 5, 6, 7, 8, 9, or 10 apertures, out of 10-20 apertures, out of 100-200 apertures, out of 200-1000 apertures, or out of a plurality of apertures, or out of greater than 10 apertures, or greater than 100 apertures, or greater than 1000 apertures. System can be configured so that the solvent or the solution is dispensed as a gushing fluid, as a dripping fluid, as a spray, as a mist, or as any combination of the above, as any of the above in a continuous manner or as any of the above in an intermittent manner.

For each extraction step, that is, with either solvent or with solution, available volume in Extraction Tank can be filled to about 2%, about 4%, about 6%, about 8%, about 10%, about 15%, about 20%, about 30%, about 40%, about 50%, about 60%, about 70%, about 80%, about 90%, about 95%, about 100%, or to a volume that consists of a range defined by any two of the above percent values.

For transfer of solution from Extraction Tank to Collection Tank, preferred vacuum is minus 28 inches mercury. For recirculating step, solution from Collection Tank is drawn to Extraction Tank at a preferred vacuum of minus 20 inches mercury. For filling Evacuation Tank, preferred vacuum is minus 28 inches mercury. For the step of filling Evacuation Tank, solution can be drawn from only Collection Tank (in the situation where solution from Extraction Tank has already been transferred to Collection Tank). Alternatively, for filling Evacuation Tank, solution can be simultaneously drawn from both Extraction Tank via valve (1.E) to Collection Tank, and finally to Evacuation Tank.

Regarding the false bottom that is used to support tank liner, FIG. 1 shows a false bottom in the shape of a disc. Alternatively, or in addition, false bottom can take the form of an inverted cone (pointy side up, broad circular end down). False bottom has apertures or perforations that are preferably 2 millimeters in diameter. The liner, which contains plant matter, can reside directly on top of disc-shaped false bottom or directly on top of inverted cone false bottom.

Branching Points in Flow Lines and Coordinated Opening and Closing of Valves

This concerns the branching point at the outlet to Collection Tank (1.I), and it concerns valve (1.D) and valve (1.K). Direction of flow is controlled only by whichever direction vacuum is applied. Transfer of solution from Collection Tank (1.I) to Extraction Tank (1.H) is propelled by vacuum in Extraction Tank (1.H) and by opening of valve (1.D). Here, this vacuum and valve opening drives flow to the leftward direction at the branching point. But if vacuum is applied at valve (1.K) and if valve (1.K) is open, then flow is driven at the branching point to the right.

In embodiments, the system and method of the present disclosure is capable of simultaneously opening valve (1.D) and closes valve (1.K). Also, the system and method of the present disclosure is capable of simultaneously closing valve (1.D) and opening valve (1.K). In some embodiments, the vacuum coming from Extraction Tank (1.H) is continuous where opening of valve (1.D) is the sole control that forces solution at the branching point to the left. But in other embodiments, vacuum coming from Extraction Tank (1.H) is turned on, or is increased, and where opening of valve (1.D) allows solution at the branching point to travel to the left. In exclusionary embodiments, the present invention can exclude any system, method, or composition made by the system or method, that does not include one or both of the above mechanisms that control flow at the branching point.

Regarding valve (1.K) and vacuum applied downstream of valve (1.K), in some embodiments vacuum is continuous and the sole control that forces solution at the branching point to the right is opening of valve (1.K). But in other embodiments, vacuum applied downstream of valve (1.K) is turned on, or is increased, and where opening of valve (1.K) allows solution at the branching point to travel to the right. In exclusionary embodiments, the present invention can exclude any system, method, or composition made by the system or method, that does not include one or both of the above mechanisms that control flow at the branching point.

Recirculating Solution from Collecting Tank Back to Extraction Tank

This concerns use of Collection Tank (1.I) as an "intermittent holding vessel that allows for closed loop recirculation." In exclusionary embodiments, the present disclosure can exclude any system, method, or products made with the system or method, where the system or method does not have any "intermittent holding vessel that allows for closed loop recirculation." In detail, vacuum can be applied to Collection Tank (1.I) which draws solution from Extraction Tank (1.H). The reverse of this flow can be accomplished, by creating a vacuum in Extraction Tank (1.H) which pulls or draws solution from Collection Tank (1.I). Flow from Extraction Takn (1.H) to Collection Tank (1.I) is via the pipe (or hose, conduit) that communicates from bottom (outlet) of Extraction Tank (1.H) to top (inlet) Collection Tank (1.H). The reverse flow, is via the pipe (hose, conduit) that communicates from bottom (outlet) of Collection Tank (1.H) to top (inlet) of Extraction Tank (1.H).

This concerns recirculation. Once the clean ethanol enters Collection Tank (1.H) and contacts plant material, it immediately becomes a "solution." Any time we refer to "recirculating" it must be a recirculation of a solution and not of a clean solvent. The solution stays chilled as it is housed in a controlled environment which maintains a temp below −50 degrees C. The entire process happens at these temperatures. Flooding of plant material with solvent, recirculation of the solution over the plant material, and filtration happen at a pre-determined temperature which allows us to lock out water-soluble molecules.

In exclusionary embodiments, the present disclosure can exclude any system, method, or compositions prepared by the system or method, where there is not any recirculation with a solution bearing compounds extracted from plant matter. Also, what can be excluded is any system, method, or composition that is prepared, where filtration is not at a temperature (or not at a pre-determined temperature) that locks out water-soluble molecules.

In exclusionary embodiments, the present disclosure can exclude any system or method that uses a mechanism for driving fluids that operates other than by applying vacuum, for example, the present disclosure can exclude any system or method that uses a mechanism for driving fluids that is a centrifugal pump, rotary vane pump, screw pump, peristaltic pump, and the like. Pumps suitable for the present disclosure can include (or exclude) centrifugal pump, twin screw pump, 3-spindle screw pump, peristaltic pump rotary vane pump, valve pump. Pumps and valves are available from, e.g., ITT Bornemann, Germany; SPXFLOW, Delavan, Wis.; Flomatic Corp., Glens Falls, N.Y.; CLA-VAL, Costa Mesa, Calif.; Fisher Scientific; Singer, Surrey, British Columbia).

Agitation and Stirring

This concerns agitation, as it applies to stirring, jets of fluid, vibration, shaking, rocking, and the like, as it applies to the Extraction Tank and contact of solvent with plant material in the Extraction Tank. In exclusionary embodiments, the present disclosure can exclude any system, apparatus, method, or composition prepared by the system or method, that includes agitation or that includes a device capable of subjecting a solvent or solution to agitation.

By way of definition, the term "agitation" as it applies to agitation of plant matter, of plant material, or of a mixture of solvent and plant matter, the term "agitation" intentionally does not take into account (and excludes) agitation caused by vibration that is found throughout many buildings resulting from passage of air through heating vents, resulting from nearby vehicular traffic, and the like. Also, by way of definition, the term "agitation" intentionally does not take into account and excludes any agitation caused by dripping of solvent out of input valve and over any plant matter residing in Extraction Tank, and excludes any agitation caused by dripping of fluids from one fragment of plant material on to another fragment of plant material.

Extracting Oils and Other Chemicals from Plant Matter

This concerns using a solvent for extracting plant material, and where oils are extracted into the solvent. Where an oil is extracted into a solvent to produce a solution that is rich in active ingredients, such as active ingredients that comprise cannabinoids, any oil, or any oily material, or any lipophilic substances, in the solution can be removed by an ancillary device. The ancillary device can be a rotary evaporator or a falling film evaporator. Falling film evaporators, rotary evaporators, distilling apparatus, and other separation equipment are available from, e.g., Thermal Kinetics, Amherst, N.Y.; Hebeler Process Solutions, Tonawanda, N.Y., Fisher Scientific, and Thomas Scientific (Swedesboro, N.J.).

Steps in Methods of the Present Disclosure

FIG. 4 also shows the plumbing and how the prior arts systems were improved, while FIG. 5 shows optimized systems for select moieties, as discussed above. FIG. 4 shows control valves 1, 2, 3, 4 and 6 with gate valve 4, vacuum gauge 1D. In FIG. 5, the vacuum pump is attached via plumbing to three vessels in the system. Extraction vessel, collection vessel, and an external evacuation vessel. In FIG. 5. they're referred to as Material Pot (extraction vessel), Collection Pot (collection vessel), and Vacuum Vessel (evacuation vessel). Each one of these vessels has a vacuum port that connects plumbing and a valve to the vacuum pump. The evacuation vessel is external and allows us to evacuate the solution from the system via vacuum assist. The evacuation vessel is connected to valve 1.K from FIG. 1.

In FIG. 4, the horizontal fluid line shown at the very top connects valve 1 to valve 2, and serves as the recirculation pipe as well as the evacuation pipe. This line transmits from the collection vessel to the extraction vessel. This line also serves as the evacuation line, when steps are taken for evacuation. In FIG. 1, that pipe line starts below the Collection Tank and splits to the left and right. The branch to the left leads to valve 1.D, and the branch to the right leads to valve 1.K.

In FIG. 4, the vacuum is always applied to the air space of the tanks (the vacuum line does NOT connect into the wet plumbing.)). The inventor's believe that at the temperatures at which the system is operated, the ethanol actually has a negative vapor pressure and is absorbing moisture from atmosphere. The inventors do not typically sense any ethanol vapor being evacuated from the vacuum pump.

In FIG. 5, the Material Pot does the same thing as Extraction Vessel shown in FIG. 4. In FIG. 5, the Collection Pot does the same thing as Collection Vessel that is shown in FIG. 4.

Vacuum Gauge and Advantage of Vacuum Assist

The abbreviation "VG" as shown in FIG. 4 and FIG. 5 means, "vacuum gauge." Both the Extraction Vessel and the Collection Vessel have a vacuum gauge to determine how much vacuum is in either tank at any given time. The vacuum level is a visual cue to the operator, as to when to open a valve and when to close the valve. An advantage of using vacuum for driving flow of solvent and of solutions through fluid lines and into and out of various tanks, is that vacuum assist does not create flammable aerosols.

As discussed in Ser. No. 62/322,751, Step 3 of the present invention includes for the necessary amount of contact time between plant substrate and solvent to create a heavy yielding extract solution. Contact time should be carried out at a temperature range of −30 degrees C. to −50 degrees C.

Step 4 of the present invention includes a filtration step to remove all plant material from the solvent. This step is carried out at a temperature range of −30 degrees C. to −50 degrees C.

Step 5a of the present invention includes a process for reduction of the concentrate solution by means of atmospheric evaporation of the solvent.

Step 5b of the present invention includes a process for recovery of the solvent from the concentrate solution.

Step 6a and 6b of the present invention include a process by which a concentrate can be purged of solvent to produce a nutraceutical in accordance with the present disclosure.

FIG. 4 is a flow chart of the method which includes the use of an extraction apparatus in accordance with the present disclosure.

Steps 1 and 2 include the pre-processing step of freezing solvent and plant substrate to desired temperature between −30 degrees C. and −50 degrees C.

Step 3 of the present invention includes the pre-processing step of chilling the extraction apparatus to a temperature between −30 degrees C. and −50 degrees C. via cryo chiller.

Step 4 of the present disclosure requires the chilled solvent to be added to pre-chilled Extraction Tank.

Step 5 of the present disclosure requires the chilled plant substrate to be added to Extraction Tank.

Step 6 of the present disclosure includes allowing the solvent to contact the plant substrate for a desired time between 1 minute and 60 minutes.

Step 7a of the present disclosure includes a solvent evacuation step via positive pressure.

Step 7b of the present disclosure includes a solvent evacuation step via negative pressure.

Step 8 of the present disclosure includes a process in which the solvent and plant substrate are separated via inline filtration.

Steps 1 and 2 of the flow chart represent a pre-processing step which includes a method of chilling the solvent and plant substrate to a desired temperature between −1 degrees C. and −50 degrees C., preferably in a range between −30 degrees C. and −50 degrees C., ideally in a range between −40 degrees C. and −45 degrees C. In one embodiment of the present invention, step 1 can be carried out via ultra low freezer set to preferred temperature. In another embodiment of the present invention, step 1 can be carried out via re-circulating cryo chiller connected to a holding vessel filled with solvent.

Step 2 of a process of the present disclosure can be carried out via ultra low freezer wherein the plant substrate is stored in the ultra low freezer to achieve the desired temperature between −40 degrees C. and −45 degrees C. Step 2 of FIG. 1 in the present invention includes, the plant substrate is placed inside of a micro mesh bag and inserted into the Extraction Tank of prior to step 3 of FIG. 1 of the provided method.

Step 3 of a process includes that the Extraction Tank is stainless steel, aluminum, borosilicate, or ptfe. Step 3 of FIG. 1 includes that the Extraction Tank is set inside of a freezer able to maintain the desired temperate of −50 degrees C. Step 3 of FIG. 1 includes the addition of chilled solvent to Extraction Tank. Step 3 of FIG. 1 includes a contact time between solvent and plant substrate to allow desired solubles to enter the solvent and create a solution rich in essential oils, cannabinoids and terpenes. Step third includes that the desired contact time is between 1 minute and 60 minutes, preferably between 3 and 10 minutes, ideally between 2 and 5 minutes.

Step 4 includes a method for separating the cannabinoid rich solution from plant substrate. Step 4, includes a Collection Tank (1.I) is placed into the freezer in which Step 3 of was carried out. Step 4 of includes that a strainer is placed onto the Collection Tank and the plant substrate is placed into the strainer to allow for a gravity assisted drain. The draining process must be carried out in the preferred temperature range of −40 degrees C. and −45 degrees C. to exclude the co-extraction of lipids and chlorophyll during the Step of described. In another embodiment of Step 4, the plant substrate held in a micron bag through Step 3. In this embodiment the plant material is removed with the micron bag. In another embodiment of Step 4 the micron bag filled with the plant substrate is placed inside the strainer to allow the residual solvent to drain into the Collection Tank (1.I) through gravity assist. In another embodiment of Step 4, the collected cannabinoid rich solution is then further filtered to remove small particles via Buchner funnel and Erlenmeyer flask with vacuum assist. In this embodiment of the filtration Step 4 ambient room temperature is acceptable as the bulk of plant substrate has been removed via strainer and micron bag.

Steps in Methods of the Present Disclosure (Further Descriptions)

FIG. 1 shows the use of an extraction apparatus designed to perform extraction in accordance with the present invention.

Steps 1 and 2 of the process represent a pre-process step in which both the solvent and plant substrate are chilled to a desired temperature between −1 degrees C. and −50 degrees C., preferably to a temperature between −30 degrees C. and −50 degrees C., ideally to a temperature range between −40 degrees C. and −45 degrees C. In this embodiment of the aforementioned step, the use of an ultra-low freezer is adequate. In another embodiment of Step 1 the solvent can be chilled via jacketed Extraction Tank (1.H) and cryo chiller assembly. This step requires a long period of time to achieve the desire temperature of the solvent, and therefore it is recommended that an ultra-low storage freezer is acquired to prevent a bottle necking at Step 1 or 2.

Step 3 includes a jacketed Extraction Tank such as a chemical reactor. In another embodiment of Step 3 of a jacketed Collection Tank, such as a chemical reactor can be added to the apparatus. In this embodiment, the jacketed Collection Tank allows to create a re-circulating system to move chilled solvent from Collection Tank back into the Extraction Tank. Re-circulating chilled solvent over the plant substrate, has been recognized to produce a richer concentration of desired essential oils, cannabinoids, flavonoids and terpenes in the solution concentrate. In a third embodiment of Step 3 a jacketed holding vessel, such as a chemical reactor, can be added to the apparatus assembly. In this embodiment the holding vessel allows for mechanical feeding of the solvent into the Extraction Tank, eliminating strenuous manual labor of pouring solvent into the Extraction Tank by hand. In all embodiments of Step 3 the vessels must be able to maintain a desired temperature range of −40 degrees C. to −45 degrees C.

Step 4a includes a process in which the chilled solvent is transferred into the Collection Tank (1.I). Step 1 of FIG. 4 allows for the solvent to be chilled within the vessel via circulation of cooling solution within the jacket walls of the vessel. Step 4b includes a process in which the plant substrate is placed inside the Extraction Tank of the apparatus. In one embodiment the plant substrate can be loosely placed inside the Extraction Tank. In another embodiment the Extraction Tank is lined with a micron mesh screen bag prior to the introduction of the plant substrate into the vessel. Lining the Extraction Tank with a micron screen bag allows for immediate separation of solution concentrate and plant substrate during the solution concentrate evacuation of Steps 6a and 6b. This method also allows for the quick evacuation of plant substrate from the Extraction Tank by simply removing the bag filled with plant substrate out of the vessel.

Step 5 allows for contact time between chilled solvent and chilled plant substrate. The contact period should be carried out at the ideal temperature range between −40 degrees C. and degrees −45 C. Contact time can be between 1 minute and 60 minutes, preferably between 3 minutes and 10 minutes, ideally between 1 minute and 5 minutes.

Step 7 includes a process of inline separation of solution concentrate and plant substrate. An embodiment Step 4b of FIG. 4 provides that plant substrate is placed within a micron mesh bag prior to its introduction into the Extraction Tank. This embodiment of Step 4b has been recognized as the most simple and cost effective way of inline filtration. In another embodiment of Step 7, a solid stainless steel micron screen can be introduced via a false bottom inside the Extraction Tank. In this embodiment of Step 7, the plant substrate sits atop the false bottom stainless micron mesh as the solution concentrate is drawn through it and out of the Extraction Tank. In a third embodiment of Step 7 a filter holder can be introduced in line between the Extraction Tank and Collection Tank into the apparatus assembly.

Step 8 of FIG. 4 includes the collection of solution concentrate from the Extraction Tank into a jacketed Collection Tank referenced in embodiments of Step 3.

Step 9a includes a process of recirculation of solution concentrate back over the plant substrate to create a richer concentration of desired constituents of the plant substrate. Recirculation can be performed via mechanical solvent pump, positive pressure in Collection Tank, or negative pressure within Extraction Tank. The preferred method for recirculation is by manipulating pressure within the vessels. Moving the solution concentrate from vessel to vessel via negative pressure has proven to be the most cost effective as vacuum pumps have a long life expectancy and do not require much maintenance. Pressurizing the vessels to move the solution concentrate has also been recognized as effective, but the added expense of food grade nitrogen or expensive moisture traps and filters for ambient air compressors have proven to be burdensome. Mechanical solvent pumps have been recognized as an effective means of moving the solvent and solution concentrate, but the costs associated with such devices would deter small operators from applying this method.

Step 9b includes a method for evacuating the solution concentrate from the Collection Tank. As referenced in Step 9a, moving the solvent or solution concentrate can be achieved via positive or negative pressure within the vessels of the apparatus. For evacuation, it is been discovered that a simple drain at the bottom vessel is suitable for evacuation of the solution concentrate. Positive pressure can be applied to the Collection Tank to expedite the evacuation process.

Step 10 provides a method for separating the concentrate from solvent via rotary evaporator, simple distillation, or atmospheric evaporation. The preferred method is rotary evaporator as this method allows for recovery of the solvent in its entirety. The recovered solvent is put back into circulation for future extraction, making this method one of the most cost effective for any processor.

According to another embodiment of the system, other features are taught. In another embodiment of the present invention, a system comprising of jacketed reactor Extraction Tank, jacketed reactor Collection Tank, plumbing, valves, hoses, ultra low circulating chiller, vacuum pump, liquid nitrogen holding Dewar, pressure regulators, LN2 phase separators, pneumatic actuators, electronic relay switches and air compressor.

In this embodiment, the system is scaled for larger throughput, with vessels capable of holding up to 20 pounds (lbs.) of plant material and up to 40 gallons of solvent.

In this embodiment of the present invention, an ultra-low circulating chiller is attached to the jackets on the reactor vessels.

The ultra-low recirculating chiller is set to the desired temperature set point of −75 degrees C. and allowed time to chill the internal chamber of the reactor vessels.

The vessels are interconnected via sanitary plumbing, pneumatic actuated valves in a manner which allows for the transfer of solvent into the Extraction Tank, and the recollection of the extract rich solution produced during extraction back into the Collection Tank.

In this embodiment, the Collection Tank acts as the solvent storage vessels prior to commencing the extraction. During extraction procedure, the Collection Tank acts as an intermittent solution storage vessel during recirculation procedures.

Plant material is loaded into a mesh screen bag and placed inside the Extraction Tank. Allowing time for the material to chill to a desired temperature of below −35 degrees C., preferably below −45 degrees C., ideally below −55 degrees C.

Solvent is placed inside the collection and allowed time to chill to the necessary temperature range between −45 and −75 degrees C. It has been discovered that the ideal extraction temperature is in the range of −45 C and −50 degrees C. system parameters are always set to a lower temperature to compensate for the heating of solvent and material during fluid transfers. The solvent will typically gain 5 degrees during each fluid transfer. A typical recirculation procedure requires the solvent to be moved up to 5 times from Extraction Tank to Collection Tank and back. This raises the overall temperature of the solvent in the system by up to 25 degrees C.

Cryo Chiller Versus Other Cooling Machines

A cryo chiller is as an effective device to chill the extraction apparatus by circulating a cooling solution throughout the jackets of the vessel included in the apparatus assembly. Not all of our systems employ a cryo chiller. Non-cryo chiller embodiments employ refrigeration compressors to chill an insulated box that houses all of the crucial components. Drawings for the chiller powered system can be submitted. In exclusionary embodiments, the present disclosure can exclude any system, method, or compositions prepared by the system, where a cryo chiller was used.

Advantages of Recirculation

The term "recirculation" refers to recirculating a "solution" and does not refer to any recirculating of any "solvent." The term "solution" refers to a solvent that contains chemicals extracted from plant material. Plant matter is contacted by super-cooled ethanol, that is enough for an extraction of the essentials to take place. By recirculation, the system achieves a super saturation of the solution, and ultimately the system and method flushes the remaining desired chemicals ("actives") from the plant matter by a final cleansing rinse with clean solvent.

In another embodiment of the present invention, a solvent transfer pump can be employed to move solvent from one vessel to the next, or to recirculate the solution within the Extraction Tank. Mechanical pumps have shown to be efficient but tend to generate more heat the desired, therefore heating the solvent during fluid transfers or recirculation. The method does not predictably work as desired in that lipids and chlorophyll become available to the solvent at temperatures above −40 degrees C.

Need to Maintain Low Temperature During Filtering

The inventors experimented with several methods of extracting, draining and filtering. Using a Buchner funnel to filter the solution of fine dust was one of the ways we tried doing so. It became clear that even the slightest amount of plant dust in the solution would "bleed green" or allow for the extraction of chlorophyll at a room temperature filtration. In designing our machine and system, we placed the filter housing and filter INSIDE the freezer compartment. This prevents the fine plant dust from reaching a temperature at which it can start seeping chlorophyll into the extract rich solution during filtration.

Filters and Filter Assemblies

In a preferred embodiment filtering of particulates and dust released from plant matter during extraction process is accomplished by a "tank liner" that is inserted into the extraction vessel. In this embodiment, no filter is needed in the fluid line (pipeline) that connects extraction tank outlet to collection tank inlet. However, a filter can be used in the fluid line that is in addition to "tank liner" and a filter can be used in fluid line where there the system does not include any "tank liner."

In alternative embodiments, filtering in the Extraction Tank can accomplished with paper filter, plastic polymer filter such as a Millipore® filter, micron mesh tank liner, or a cake of diatomaceous earth (Celite®), where the filter is supported by a false bottom. False bottom can be a disc with holes for allowing fluid to pass through. Mesh filters such as Spectra/Meshs® woven filters are available from, Thomas Scientific, Swedesboro, N.J. and Utah Biodiesel Supply, Clinton, Utah.

Applied vacuum results in more effective draining and filtering than gravity alone. In filtering embodiments, the present disclosure provides filter taking the form of an "inverted cone" where the cone is perforated and acts as a false bottom. This "inverted cone" design increases the overall surface area, in comparison to a disc-shaped false bottom. The increased surface area provided by the "inverted cone" increases efficiency of filtering and draining.

Extraction Tanks

In alternative embodiments, entire extraction tank can be cone-shaped, or can be substantially cone-shaped, where extraction of plant material occurs in one part of the cone-shaped extraction tank, and where filter assembly occurs in a different part of the cone-shaped extraction tank. In alternative embodiments, filter assembly can be cone-shaped and can be housed within a cylinder-shaped extraction tank. Alternatively, filter assembly can be cone-shaped and can be in physical contact with cylinder-shaped extraction tank, where cone-shaped filter assembly is not housed inside of cylinder-shaped extraction tank. In other embodiments, the term "extraction tank" can be used to refer to the sum of (tank where extraction occurs) plus (filter assembly), even where filter assembly is attached to and in direct physical contact with tank where extraction occurs.

In exclusionary embodiments, the present disclosure can exclude any device or system, where filtering uses a disc-shaped false bottom or any filtering device that has a flat conformation, such as a disc-shaped false bottom, square-shaped false bottom, or rectangle-shaped false bottom.

In addition to, or as an alternative to, filter assembly in Extraction Tank (1.H), the present disclosure can provide an in-line filter that is downstream of Extraction Tank outlet and upstream of collection valve (1.E). This in-line filter can have pores that are about 2, about 4, about 6, about 8, about 10, about 15, about 20, about 30, about 40, about 50, about 60, about 70, about 80, about 90, about 100, about 150, about 200, and so on, micrometers in diameter, or any combination thereof. Also, in-line filter can take the form of a series of different types of filters, for example, where the first filter encountered by flowing solution has largest pores, the last filter has the smallest pores, and a middle filter has pores of an intermediate size.

Downstream of Collection Tank (1.I) and upstream of exit valve (1.K) is evacuation line with an in-line filter housing (1.J). Filter located inside of in-line filter housing collects any particulate matter that was not retained by the filter in the Extraction Tank (1.H). In-line filter preferably has pores that are about 10 micrometers in diameter and, can have pores that are about 2, about 4, about 5, about 6, about 8, about 10, about 15, about 20, about 30, about 40, about 50, about 60, about 70, about 80, about 90, about 100, and so on, micrometers in diameter, or any combination thereof. The term "strainer" can be used instead of "in-line filter." The skilled artisan will understand that if there is a filter that is part of a system or apparatus, then there will necessarily be some sort of housing or assembly that positions and secures the filter.

Coordinating Vacuum Pumping with Air Locks

The direction of the flow is determined by which direction vacuum is being applied from. Preferably, the exit valve (1.K) is operably linked to and in communication with an external Evacuation Tank (1.R). Preferably, this operable linking is via polytetrafluoroethylene (PTFE) tubing or silicon tubing. The Evacuation Tank (1.R) is also operably linked to a vacuum pump that creates an negative pressure. Once vacuum develops in the evacuation tank, exit valve (1.K) is opened to engaged the flow from Collection Tank (1.I) into the Evacuation Tank (1.R). Likewise, exit valve (1.K) can be directly linked to an auto-feed valve of a rotary evaporator. The negative pressure in the rotary evaporatory ("rotavap") will act as the driving force that sucks the solution out of Collection Tank (1.I) and into the rotary evaporator for a "direct feed" set up.

Operating the Cold Air Intake Valve that is Located In-Line with Cold Air Intake Tube Cold air intake valve (1.B) is alternatively called, airlock valve or gate valve. Cold air intake valve is operably liked with upper-end terminus of cold air intake tube. Cold air intake tube has upper-end terminus and lower-end terminus. The cold air intake tube reaches to the very bottom of the Environment Box (ultra low temperature freezer chest) (1.L) that houses all of the components pictured in FIG. 1. The temperature inside the Environment Box (1.L) is typically between −60 C and −75 C. The cold air intake valve (1.B) acts as an airlock. When cold air intake valve is in the OPEN position, valve (1.C) acts as a vent for Extraction Tank (1.H).

When the cold air intake valve is CLOSED, valve (1.C) draws solvent from a Solvent Storage Tank (1.A) inside the Environment Box. This solvent is preferably ethanol.

Since we use vacuum for liquid transfers within the system, each tank needs a vent to prevent an equilibrium of vacuum, which ultimately stops the flow. The Extraction Tank needs to suck cold air during this process to prevent the plant material from warming too much. The Collection Tank (1.I) sucks ambient atmosphere (via valve 1.G) because it never holds plant material, and the little bit of warm air that enters that tank during recirculation procedures does not influence the extraction process in any way. If the cold air intake was not there, we would equalize vacuum in both tanks during the collection of solution from the plant material. If the extraction tank was vented to atmosphere, the draw of warm, room temperature air, into the Extraction Tank would raise the overall temperature inside the Extraction Tank (1.H). Where the present system is used for extracting plant material that contains chlorophyll, the raising of overall temperature inside of Extraction Tank (1.H) leads to a release of chlorophyll into the solution. This release of chlorophyll into the solution is NOT desirable and thus it is the case that raising of the overall temperature must be avoided.

Structures for Controlling Vacuum

FIG. 4 shows the same structures as in FIG. 1, except FIG. 4 additionally shows structures for controlling vacuum. What is shown is Evacuation Tank (1.R), vacuum valve (1.M), vacuum valve (1.N), vacuum pump (1.O), airlock valve (1.P), and vacuum valve (1.Q). A vacuum flow line is operably linked with interior of Extraction Tank (1.H), where Extraction Tank resides at proximal terminus of vacuum flow line. The vacuum flow line is also operably linked with a branching vacuum line that leads to vacuum pump. Moreover, the vacuum flow line is operably linked with interior of Collection Tank (1.I). The distal terminus of vacuum flow line is operably linked with interior of Evacuation Tank (1.R). The physical contact of vacuum flow line, in the sequence of physical contact from the proximal terminus of vacuum flow line to the distal terminus of vacuum flow line is as follows: Extraction Tank (1.H); Vacuum valve (1.M); Branching line to vacuum pump; Branching line to Collection Tank (1.I); Vacuum valve (1.Q); and Evacuation Tank (1.R). Regarding the physical nature that allows operable linking of vacuum flow line to Extraction Tank, Collection Tank, and Evacuation Tank, the physical contact of vacuum flow line with these tanks is preferably flush with the upper surface with each of these tanks to avoid any splashing of drops or mist into the vacuum flow line. Alternatively, vacuum flow line may extend for a small distance into one or more of these tanks, for example, by a distance of 1 millimeter (mm), 2 mm, 5 mm, 10 mm, 15 mm, and so on. In addition, splashing of drops or mist into vacuum flow line can be prevented by a deflecting shield, by a cotton plug, and so on, that covers point of operable linking of vacuum flow line with interior of tanks.

Dewatering, Winterization, Charcoal

The systems, methods, and compositions provided by the present disclosure can include a dewaterizing agent, such as a porous solid, sodium sulfate, magnesium sulfate, and silica. Also, the present disclosure can exclude any system, method, or composition, that has a dewaterizing agent. The present disclosure can include, or it can exclude, a winterizing step. Winterizing can involve cooling an extract to precipitate, for example, waxes, followed by removing the precipitate by filtering. The present disclosure can include activated charcoal, and a method using activated charcoal. Alternatively, any system or method using activated charcoal can be excluded.

Machines for Shredding, Chopping, or Grinding Oil-Containing Materials

The present disclosure can include shredder, metering bin, pelletizer, cooler bin, crumbler, screen or screener, or hammer mill (reduces particulate hemp to size in range of, for example, 1.0 micrometers (μm) to 500 μm, 1.0 μm to 400 μm, 1.0 μm to 300 μm, 1.0 μm to 200 μm, 1.0 μm to 100 μm, 1.0 μm to 50 μm, 1.0 μm to 25 μm, or to a size in the range of, for example, 0.2 micrometers (μm) to 500 μm, 0.2 μm to 400 μm, 0.2 μm to 300 μm, 0.2 μm to 200 μm, 0.2 μm to 100 μm, 0.2 μm to 50 μm, 0.2 μm to 25 μm, or to a size in the range of, 2 micrometers (μm) to 500 μm, 2 μm to 400 μm, 2 μm to 300 μm, 2 μm to 200 μm, 2 μm to 100 μm, 2 μm to 50 μm, 2 μm to 25 μm, and the like). Also, the present disclosure can exclude one or more these equipments.

Content of Cannabinoids, Chlorophyll, Waxes, and Other Compounds in Whole Cannabis, Cannabis Leaves, and Cannabis Flowers.

Chlorophyll, as well as chlorophyll breakdown products, can be detected and measured by way of a spectrophotometer, spectropolarimeter, and high pressure liquid chromatography (HPLC) (see, e.g., Porra et al (1989) Biochim. Biophys. Acta. 975:384-394; Roiser M H et al (2015) J. Agric. Food Chem. 63:1385-1392). Chlorophyll can be measured using a chlorophyll meter (Minolta, SPAD-502, Konica-Minolta, Tokyo, Japan). Chlorophyll content in fresh hemp leaves is about 2.0 mg/grams chlorophyll a and about 1.5 mg/grams chlorophyll b (Y. Tang et al (2015) Heavy metal cadmium tolerance on the growth characteristics of industrial hemp (Cannabis sativa L.) in China. International Conference on Advances in Energy, Environment and Chemical Engineering (AEECE-2015). 289-295).

Fatty acids can be measured and identified by, e.g., gas chromatography-mass spectroscopy (Shimadzu GCNS-QP2010). Fatty acids can be separated by capillary column DB-17 (J&W Scientific, Folsom, Calif., acquired by Agilent, Palo Alto, Calif.).

Regarding wax content, hemp contains about 0.7 percent wax (T. Humber and J. Mussig (2008) Composite Interfaces. 15:335-349; A. B. Thomsen et al (March 2005) Hemp raw materials: The effect of cultuvar, growth conditions and pretreatment on the chemical composition of the fibers. Riso National Laboratory, Roskilde, Denmark. ISBN 87-550-3419-5 (30 pages)). Regarding wax content, the present disclosure provides system, methods, and compositions prepared by system and method, where wax content is reduced, and where wax content is below 2% (w/w), below 1.5%, below 1.0%, below 0.8%, below 0.6%, below 0.4%, below 0.2%, below 0.1%, below 0.8%, below 0.6%, below 0.4%, below 0.2%, and so on. These numbers are based on determining amount of wax present in the prepared oil, based on calculations that normalize the measured wax to 100 grams of starting material (fresh hemp). The present disclosure provides reduced wax content, as measurable by ratio of wax/chlorophyll (wt/wt), where a prepared oil, an oil-enriched solution, or an oil-enriched product, has a wax/chlorophyll ratio of less than 4 grams wax/gram chlorophyll, less than 3.5, less than 3.0, less than 2.5, less than 2.0, less than 1.5, less than 1.0, less than 0.8, less than 0.6, less than 0.4, less than 0.2, less than 0.1, less than 0.08, less than 0.06, less than 0.04, less than 0.02, or less than 0.01 grams wax/gram chlorophyll. These parameters may be based on total chlorophyll, on chlorophyll (a), or on chlorophyll (b). The extent of wax reduction can be expressed by way of two different parameters: (1) Wax in the processed oil-containing substance/chlorophyll in the processed oil-containing substance; or (2) Wax in the processed oil-containing substance/chlorophyll in corresponding amount of starting material (e.g., fresh hemp).

Cannabis leaves contain total chlorophyll (about 3 mg/gram, dry weight), chlorophyll a (about 2.0 mg/gram, dry weight), chlorophyll B (about 1.0 mg/gram, dry weight), delta-9 tetrahydrocannabinol (THC) (about 0.1 mg/gram, dry weight), cannabidiol (CBD) (about 1.0 mg/gram, dry weight). These numbers apply to leaves (see, Mansouri, Salari, Asrar (2013) Industrial Crops and Products. 46:269-273). Regarding cannabis flowers, cannabis flowers contain delta-9 tetrahydrocannabinol (THC) (about 2.3 mg/gram, dry weight), and cannabidiol (CBD) (about 0.75 mg/gram, dry weight, male plant), cannabidiol (CBD) (about 0.2 mg/gram dry weight, female plant). These numbers apply to cannabis flowers (see, Mansouri, Salari, Asrar (2013) Industrial Crops and Products. 46:269-273).

RATIO OF THC TO CHLOROPHYLL. The present disclosure provides formulations, liquids, slurries, oils, fluids, solutions, lotions, powders, and other compositions, where the ratio (by weight) of THC to chlorophyll (a) is, or where the ratio (by weight) of delta-8 THC to chlorophyll (a) is, or where the ratio (by weight) of delta-9 THC to chlorophyll (a) is, about 1.0/1.0, about 1.2/1.0, about 1.4/1.0, about 1.6/1.0, about 1.8/1.0, about 2.0/1.0, about 2.5/1.0, about 3.0/1.0, about 4.0/1.0, about 5.0/1.0, about 6.0/1.0, about 7.0/1.0, about 8.0/1.0, about 9.0/1.0, about 10/1, about 12/1, about 14/1, about 16/1, about 18/1, about 20/1, about 25/1, about 30/1, and so on. Also provided are one or more of the above compositions, where the ratio (by weight) of THC to chlorophyll (a) is greater than 1.0/1.0, greater than 1.2/1.0, greater than 1.4/1.0, greater than 1.6/1.0, greater than 1.8/1.0, greater than 2.0/1.0, greater than 2.5/1.0, greater than 3.0/1.0, greater than 4.0/1.0, greater than 5.0/1.0, greater than 6.0/1.0, greater than 7.0/1.0, greater than 8.0/1.0, greater than 9.0/1.0, greater than 10/1, greater than 12/1, greater than 14/1, greater than 16/1, greater than 18/1, greater than 20/1, greater than 25/1, greater than 30/1, and so on. Also provided are the above ranges, values, and cut-off points, as applied to total chlorophyll, and as applied to chlorophyll (b). In exclusionary embodiments, the systems, devices, instruments, methods, and compositions of the present disclosure can exclude any system, device, instrument, method, and composition that does not meet one of the above values for the indicated ratios.

The present disclosure can include compositions, and methods for making compositions, where the composition has an optical density (OD) of about 0.02, about 0.04, about 0.06, about 0.08, about 0.10, about 0.2, about 0.3, about 0.4, about 0.5, about 0.6, about 0.7, about 0.8, about 0.9, about 1.0, about 1.2, and so on. Also, the present disclosure can exclude a composition and methods that is characterizable by one of these ODs. Also, the present disclosure can include compositions, and methods for making compositions, where the composition has an OD of greater than (or lesser than) 0.02, 0.04, 0.06, 0.08, 0.10, 0.2, 0.3, 0.4, 0.5, 0.6, 0.7, 0.8, 0.9, 1.0, 1.2, and so on. Also, the present disclosure can exclude compositions and related methods, where the composition is characterizable by one of these ODs. The OD of the compositions of the present disclosure can be measured at, for example, 425 nm (violet), 450 nm, 500 nm, 525 nm (green), 550 nm (yellow), 600 nm (orange), 650 nm, 675 nm (red), 700 nm (red), and so on.

Reagents, chemicals, solvents, filters, and instrumentation such as spectrophotometers, mixers, and rotary evaporators, are available from, e.g., Sigma-Aldrich, St. Louis, Calif.; Life Technologies, Carlsbad, Calif.; BD Biosciences, San Jose, Calif.; EMD Millipore, Billerica, Mass.; Thomas Scientific, Swedesboro, N.J. What is available are fluorescent dyes, radioactive isotopes, electron-dense reagents, fluorettes (see, e.g., Rozinov and Nolan (1998) Chem. Biol. 5:713-728). Balances for weighing reagents, tubes, tubes containing reagents, cannabis leaves, and so on, are available from, e.g., Mettler Toledo (Columbus, Ohio) and Ohaus Brainweigh (Florham Park, N.J.). Centrifuge tubes, such as Corning polypropylene centrifuge tubes and Nalgene high-speed polycarbonate centrifuge tubes are available, e.g., from ThermoFisher Scientific (Waltham, Mass.). Cannflavin A, cannflavin B, and cannflavin A-d3 are available, for example for use as chromatographic standard compounds, from Toronto Research Chemicals, North York, Ontario, Canada. Delta-8-THC, delta-9-THC, 11-hydroxy-delta-9-THC, cannabinol, cannabidiol, and other cannabinoids are available, for example for use as chromatographic standards, from Sigma-Aldrich, St. Louis, Mo.

Falling film evaporators, rotary evaporators, distilling apparatus, and other separation equipment are available from, e.g., Thermal Kinetics, Amherst, N.Y.; Hebeler Process Solutions, Tonawanda, N.Y., Fisher Scientific, and Thomas Scientific (Swedesboro, N.J.).

In embodiments, the present disclosure encompasses methods, and encompasses any product or extract that is prepared by one or more of, butane extraction, propane extraction, supercritical $CO_2$ extraction, winterization, vacuum distillation, short-path distillation, rotary evaporation, recrystallization of cannabinoids. The present disclosure can exclude any system, device, instrument, component, parts, components, methods, product made by, or extract made by, any of the above.

The present disclose encompasses Huber® chillers, including unichiller, minichiller, industrial scale Temperature Control Unit, Unistat series for cooling solvent tanks, such as Huber® TC Immersion cooler, Unistat® down to minus 60° C. (Unistat® 405, 410, 425, 650W, 680), Unistat® down to minus 120° C. (Unistat 705, 815, 825, 905, 950), Unistat® Tango (Huber, Cary, N.C.). The present disclosure also encompasses Huber heating units, for example, for inducing decarboxylation of cannabinoids. Also encompased, is Huber® wiped film evaporator, and Huber® short path distillation apparatus, and Huber® Chili Heating Circulation Thermostat.

Additionally, what is encompassed is, Telemark Cryogenics cryochiller for ethanol chilling and winterization, and optional ethanol pump and fill tube, ethanol drain tube, and water cooler for supplying cryochiller (Telemark Cryogenics, Battle Ground, Wash.). Moreover, what is provided is, KPD Series Volcan Industrial Extractor (Precision. Extraction Solutions, Troy, Mich.), where the specifications are, compatible solvent (ethanol), filter media (diatomaceous earth and/or carbon), solvent capacity of 1,000 gallons). Also provided is, X40MSE Multi-Solvent Extractor from Precision Extraction Solutions, which has, e.g., baffled jacketing on collection vessel, and vacuum jacketing on solvent vessel with internal cooling coil.

Moreover, the present disclosure encompasses rotax extraction unit, multi-stage evaporator, solvent regenerating system, short-path distillation, winterization, and biomass drying screw, cavity pumps, homogenizers, emulsification units, evaporation units, homogenizers, as available from Deutsche Process (Charlotte, N.C.).

The present disclosure encompasses devices, any product or extract made by said devices, methods, and any product or extract made by said method, where the device is (or method utilizes) falling film evaporator solvent recovering system, e.g., Model AV-300, AV-100, AV-30, or AV-15 (Evolved Extraction Systems®, British Columbia, Canada). Thin-Film Distiller with PTFE wiper basket, heat from electric heat bands, and monitoring with vacuum gauge. Dual stage thin film evaporator with jacketed feed tank, flow meter, variable frequency drive gear pump.

Additionally, the present disclosure encompasses devices, any product or extract made by said device, methods, and any product or extract made by said method, where the device is (or method uses), EdenLabs® Hi-Flo FX2 supercritical fluid extraction, or EdenLabs® Cryo-Capable Ethanol Extraction Platform; EdenLabs® Cold Finger Benchtop small batch extractor (suitable for extracting plant-matter with ethanol, water, or any organic solvent (EdenLabs, Seattle, Wash.).

Moreover, the present disclosure encompasses devices, any product or extract made by said device, methods and any product or extract made by said method, and where the device is (or method uses), Summit Extraction Systems® (Golden, Colo.). In exclusionary embodiments, the present disclosure can exclude any system, device, instrument, methods, or product made by, or extract made by, any of the above.

Furthermore, the present disclosure encompasses devices, any product or extract made by said device, methods and any product or extract made by said method, and where the device is (or method uses), Capna Systems Ethos-4® extractor, Ethos-6® extractor, Atles® extractor, EthosX® extractor (Capna Systems, Sylman, Calif.).

In yet another aspect, the present disclosure provides oil and ethanol recovery systems (SC-Series, usable with ethanol, isopropyl, pentane, hexane, heptane, provides recovery of from 50 to 400 gallons per day), Oil and Ethanol recovery system (C-Series), fractional distillation systems (300-40,000 gallons per day), "Turnkey Automatic Winterization Systems" (from 600 to 500 kg of $CO_2$ extract per day), Fractional Distillation and Dewatering Systems (F-Series), all of these from MARATEK (Detroit, Mich.).

Additionally, the present disclosure provides equipment for oil extraction, solvent recovery, distilling, and recrystallization, such as, TripleXtract System 3-20 pound per hour alcohol extraction that has three inline filters (Colorado Extraction Systems, Wheat Ridge, Co.). Provided also, is "Dual ETS Expansion filter," Dual Julabo Corio hot water recirculating system," Air-Driven Vacuum Pump, Modular Extraction Platform, each from ExtractionTek (Englewood, Co.).

Unless expressly stated otherwise, the above inclusionary embodiments and exclusionary embodiments to systems, parts, components, devices, reagents, and methods, are also encompassed by the present disclosure but without regard to the catalog number, name of the model, or manufacturer. In exclusionary embodiments, the systems, devices, instruments, machines, and methods, of the present disclosure can exclude one or more of the following systems, devices, instruments, machines, and related methods, without regard to the manufacturer and without regard to the trade name or catalogue number.

Moreover, what can be excluded is any composition, reagent, fluid, extract, or powder, that is made by a method, where the method requires one of the following systems, devices, instruments, and machines (see, list disclosed below). Also, the systems, devices, instrumentation, machines, and methods, of the present disclosure can exclude one or more of the following systems, devices, instruments, machines, and related methods, from the indicated manufacturer, and with regard to the trade name, and with regard to the catalog number (see, list disclosed below that does not identify manufacturers or catalog numbers).

This is the list without manufacturers or catalogue numbers. What can be excluded, and alternatively, what can be included, is the following. Balances and scales. Falling film evaporators, rotary evaporators, distilling apparatus, and other separation equipment. Chillers, heating units, wiped film evaporator, short path distillation apparatus, cryochiller for ethanol chilling and winterization. Filter media (diatomaceous earth and/or carbon). Multi-solvent with baffled jacketing on collection vessel, and vacuum jacketing on solvent vessel with internal cooling coil. Multi-stage evaporator, solvent regenerating system, short-path distillation, winterization, and biomass drying screw, cavity pumps, homogenizers, emulsification units, evaporation units, homogenizers. Thin-film distiller. Dual stage thin film evaporator with jacketed feed tank, flow meter, variable frequency drive gear pump. Supercritical fluid extraction devices and methods. Oil and ethanol recovery systems. In inclusionary embodiments, the systems, devices, instruments, machines, and methods, can include one or more of the above systems, devices, instruments, machines, and related methods, without regard to the manufacturer and without regard to the trade name or catalog number.

Initial Physical State of Oil-Containing Material

Starting material for the compositions and methods of present disclosure can be one or more of, whole hemp stalk, shive, bast fiber, leaves, flower buds, whole hemp stalk harvested when hemp plant was in flower and before seed had formed, whole hemp stalk harvested after seed had formed. In embodiments, moisture of starting material has an upper limit of 4% by weight, 6% by weight, 8% by weight, 10% by weight, 12% by weight, 14% by weight, 16% by weight, 18% by weight, 20% by weight, 22% by weight, 24% by weight, and so on. In embodiments, the present compositions and methods include a composition that is less than (or where there is a step that dries composition to be less than), 4% by weight, 6% by weight, 8% by weight, 10% by weight, 12% by weight, 14% by weight, 16% by weight, 18% by weight, 20% by weight, 22% by weight, 24% by weight, and so on.

Extraction Chambers

System and method of the present disclosure can include, or alternatively exclude, baffles capable of collecting oils, convex baffles, or concave baffles. Also, system and method can include, or alternatively exclude, an extraction chamber with a upper end (or top end) and a lower end (or bottom end), and where top end comprises an aperture that is capable of allowing entry of solvent into extraction chamber and where bottom end comprises an aperture that is capable of draining (or capable of pumping out) or extracted oil. In said embodiments, extraction chamber possesses a region capable of holding oil-containing biological material, where this region is situated in between inlet aperture (at top) and outlet aperture (at bottom).

The system of the present disclosure provides one or more pressure locks, where a pressure lock can reside at point in system where oil-containing product leaves the laboratory (ambient conditions) and enters extraction chamber or vessel. Pressure lock has a first door or port that conveys oil-containing product from ambient conditions into pressure lock, and a second door or port that conveys oil-containing product from pressure lock to extraction chamber or vessel. Also, the present disclosure has a corresponding pressure lock, where oil-depleted product exits extraction chamber or vessel, and returns to ambient conditions. In exclusionary embodiments, the present disclosure can exclude pressure locks.

Devices for Directing Solvent Towards Oil-Containing Material

In embodiments, what can be included is a system where there is only one aperture (or only one nozzle) that is used to direct a jet or a mist of solvent to oil-containing biological materials. This can also be excluded. Also, in embodiments, what can be included is a system where there is a plurality of apertures (or a plurality of nozzles) that is used to direct a jet or a mist of solvent to oil-containing biological materials. This can also be excluded. Additionally, what can be included is a system where there is a plurality of apertures (or a plurality of nozzles) that is used to direct a jet or a mist of solvent to oil-containing biological materials, and where at least one aperture or nozzle directs solvent in a first vector towards oil-containing materials and where at least one aperture or nozzle directs solvent in a second vector that points opposite the first vector, and where both the first vector and the second vector point to the oil-containing biological materials. Put another way, the first at least one nozzle can point downwards and the second at least one nozzle can point upwards, where the oil-containing materials are in between. Also, the first at least one nozzle can point rightwards and the second at least one nozzle can point leftwards, where the oil-containing materials are in between. This can also be excluded.

In embodiments, the method provides that liquid solvent be admitted to extraction chamber at same temperature or, alternatively, at lower temperature, as temperature used to accomplish oil extraction. Temperature of liquid solvent when admitted to extraction chamber can be at about 4 degrees C., about 8 degrees C., about 12 degrees C., about 16 degrees C., about 20 degrees C., about 24 degrees C., about 28 degrees C., and so on, lower than temperature that is used to accomplish oil extraction. In embodiments, the present disclosure can also exclude systems and methods that do not meet one or more of these solvent admission temperatures.

Supercritical Fluids and Subcritical Fluids

The following provides non-limiting guidance on solvents that are encompassed by the present disclosure. Supercritical fluids are substances at pressures and temperatures above their critical values. Their solvent power is the highest for non-polar or slightly polar components and decreases with increasing molecular weight. They can easily be removed from the solutes by mere expansion to ambient pressure. Carbon dioxide ($CO_2$) is particularly advantageous for processing food materials. Supercritical fluids are used for batch extractions of solids, for multi-stage counter-current separation (fractionation) of liquids, and for adsorptive and chromatographic separations (Brunner G (2005) Supercritical fluids:technology and application to food processing. J. Food Eng. 67:21-33). As stated by Poliakoff, "Supercritical fluids are highly compressed gases which combine properties of gases and liquids in an intriguing manner. Fluids such as supercritical xenon, ethane and carbon dioxide offer a range of unusual chemical possibilities in both synthetic and analytical chemistry." Below critical parameters, two distinct phases exist (liquid and vapor). As temperature rises, the liquid expands and the two phases become less distinct, and what is formed is a new supercritical phase (Simon Poliakoff (January 2001) An Introduction to Supercritical Fluids, Univ. of Nottingham). According to US2009/0053382 of Kawamura, "Once a specific temperature and pressure (critical point) are exceeded, the boundary between gas and liquid will dissipate, leaving a region where the fluid is sustained in a state in which both phases are blended together. Such a fluid is called a supercritical fluid. Supercritical fluids have high density and have properties somewhere between a gas and a liquid. Subcritical fluids are fluids in a state in which the pressure and temperature are below the critical point. Examples of the method for supplying the high-temperature, high-pressure fluid include batch systems, in which the fluid is supplied to a pressure vessel, and a set processing time is maintained while the temperature and pressure are increased. Alternatively, in a continuous system, the fluid is made to flow for a set period of time in a pressure vessel from a fluid-supply pathway to a fluid-discharge pathway provided to the pressure vessel so that the fluid will be discharged from the fluid-discharge pathway at an exit pressure that is higher than atmospheric pressure." The system, methods, and compositions produced by the current disclosure can encompass one or more of supercritical fluids, near-critical fluids, subcritical fluids, and critical fluids, and can exclude one or more of supercritical fluids, near-critical fluids, subcritical fluids, and critical fluids. In embodiments, the present disclosure provides solvent that is carbon dioxide in its supercritical phase, and where plant oils form micelles with the solvent during extraction.

Subcritical fluids are compressed fluids below their critical temperatures, yet kept in their liquid state and used above their boiling points by applying pressure (see, A. Procter (ed.) Alternatives to Conventional Food Processing, Volume 1. RSC Publishing, page 97).

Regarding carbon dioxide, subcritical pressure and temperature can be 55 bar and 25 degrees C., or 70 bar and 50 degrees C., or 60 bar and 30 degrees C., or 55 bar and 25 degrees C., or 50 bar and 20 degrees C. Also, subcritical conditions can be about 55 bar and about 25 degrees C., or about 70 bar and about 50 degrees C., or about 60 bar and about 30 degrees C., or about 55 bar and about 25 degrees C., or about 50 bar and about 20 degrees C. In exclusionary embodiments, the present disclosure can exclude system and methods that use these conditions, and compositions made under these conditions.

Regarding carbon dioxide, supercritical pressure and temperature can be 300 bar and 70 degrees C., or 180 bar and 55 degrees C. Also, supercritical conditions can be about 300 bar and about 70 degrees C., or about 180 bar and about 55 degrees C. In exclusionary embodiments, the present disclosure can exclude system and methods that use these conditions, and compositions made under these conditions.

Solvents for Extracting Oils

Solvents can be one or more of methyl alcohol, acetone, methylethylketone, butrylcarbitol, petroleum ether, butane, isobutane, propane, methane, ethane, butylene, hexane, sulfur dioxide, carbon dioxide, $CClF_3$, $CFBr_3$, ammonia, nitrogen, halogenated hydrocarbons. Also, one or more of these solvents can be excluded. The present disclosure can include compositions prepared by a method that uses dioxane, and it can include a method that uses dioxane. Also, these can be excluded.

Co-solvents can be used, where co-solvent is about 5%, about 10%, about 20%, about 30%, about 40%, about 50%, about 60%, about 70%, about 80%, about 90% of the volume of the primary solvent. The present disclosure can also exclude any method that uses a co-solvent, or any composition prepared by a method that uses a co-solvent. Ratio of solvent to oil-containing biological substance, or ratio of [sum of solvent plus co-solvent] to oil-containing biological substance, can be 1:1, 1:1.2, 1:1.4, 1:1.6, 1:1.8, 1:2.0, 1:2.5, 1:3, 1.3.5, 1:4, 1.4.5, 1.5, and so on (ratio on per weight basis). Also, ratio can be 1:1, 1.2:1, 1.4:1, 1.6:1, 1.8:1, 2:1, 2.5:1, 3:1, 3.5:1, 4:1, 4.5:1, 5:1, and so on (ratio on per weight basis). What can be excluded is any compositions and related methods that uses a co-solvent, and what can be excluded is compositions characterizable by any of these ratios.

Also, ratio can be about 1:1, about 1:1.2, about 1:1.4, about 1:1.6, about 1:1.8, about 1:2.0, about 1:2.5, about 1:3, about 1.3.5, about 1:4, about 1.4.5, about 1.5, and so on (ratio on per weight basis). Also, ratio can be about 1:1, about 1.2:1, about 1.4:1, about 1.6:1, about 1.8:1, about 2:1, about 2.5:1, about 3:1, about 3.5:1, about 4:1, about 4.5:1, about 5:1, and so on (ratio on per weight basis). Compositions and related methods characterizable by any of these ratios can be excluded.

Amount of Chlorophyll with Respect to Amount of Cannabidiol (CBD)

In embodiments, the present disclosure provides compositions, intermediates, methods to generate compositions, and equipment capable of generating compositions, with 0.01%, 0.02%, 0.05%, 0.1%, 0.2%, 0.5%, 1.0%, 2%, 4%, 6%, 8%, 10% chlorophyll by weight, or with about 0.01%, about 0.02%, about 0.05%, about 0.1%, about 0.2%, about 0.5%, about 1.0%, about 2%, about 4%, about 6%, about 8%, about 10% chlorophyll by weight. Also, provided are compositions, methods, and equipment capable of generating compositions with greater than (or less than) 0.01%, 0.02%, 0.05%, 0.1%, 0.2%, 0.5%, 1.0%, 2%, 4%, 6%, 8%, 10% chlorophyll by weight. In exclusionary embodiments, what is provided are compositions, methods, and equipment that excludes compositions characterizable by one or more of the above parameters.

In embodiments, the present disclosure provides compositions, intermediates, methods to generate compositions, and equipment capable of generating compositions, with about, 1%, 2%, 6%, 8%, 10%, 12%, 14%, 16%, 18%, 20%, 25%, 30%, 35%, 40%, 45%, 50%, 55%, 60%, cannabidiol (CBD) by weight. Also, the present disclosure provides compositions, intermediates, methods to generate compositions, and equipment capable of generating compositions, with about greater than, 1%, 2%, 6%, 8%, 10%, 12%, 14%, 16%, 18%, 20%, 25%, 30%, 35%, 40%, 45%, 50%, 55%, 60%, cannabidiol (CBD) by weight. Moreover, the present disclosure provides compositions, intermediates, methods to generate compositions, and equipment capable of generating compositions, with about lesser than, 1%, 2%, 6%, 8%, 10%, 12%, 14%, 16%, 18%, 20%, 25%, 30%, 35%, 40%, 45%, 50%, 55%, 60%, cannabidiol (CBD) by weight. In exclusionary embodiments, what is provided are compositions, methods, and equipment that excludes compositions characterizable by one or more of the above parameters.

What is provided for each of the above inclusionary embodiments, and for each of the above exclusionary embodiments, is a composition where "by weight" is in terms of wet weight or alternatively, in terms of dry weight where essentially all solvent and all moisture is removed.

In ratio embodiments, the present disclosure provides compositions, methods, and equipment capable of making said compositions, where the ratio (by weight) of chlorophyll/cannabidiol (CBD) is about 0.0001, about 0.0002, about 0.0005, about 0.001, about 0.002, about 0.005, about 0.01, about 0.02, about 0.05, about 0.1, about 0.2, or about 0.05. Also provided are compositions, methods, and equipment capable of making said compositions, where the ratio (by weight) of chlorophyll/cannabidiol (CBD) is above 0.0001, above 0.0002, above 0.0005, above 0.001, above 0.002, above 0.005, above 0.01, above 0.02, above 0.05, above 0.1, above 0.2, or above 0.05. Moreover, what is provided is compositions, methods, and equipment capable of making said compositions where the ratio (by weight) of chlorophyll/cannabidiol (CBD) is under 0.0001, under 0.0002, under 0.0005, under 0.001, under 0.002, under 0.005, under 0.01, under 0.02, under 0.05, under 0.1, under 0.2, or under 0.05.

Freezers, Valves, Gauges, Pumps, Chillers, Thermometers, Sight Glass

Freezers and ultra-low temperature freezers are available from VWR (Visalia, Calif.) and from Fisher Scientific (South San Francisco, Calif.). Freezers include −86° Select® Ultra-Low Freezer, and Premier® Solid Door Low Temp Freezer −40° C. (Nor-Lake, Inc., Hudson, Wis.). The skilled artisan can modify freezers to include pipes or hoses for circulating cold air out for cooling an extraction chamber or Extraction Tank, and for returning cold air back to the freezer.

Filtration can be with lenticular filtration, plate and frame filtration, membrane filters, strainers (G.W. Kent, Ypsilanti, Mich.). Valves such as solanid valves and conical fermenters dual valve tap, spray rinse valve, goggle valve, vacuum distillation valve, lift plug valve, changeover valve, disc bottom outlet valve, globe valve, line blind valve, in-tank shut-off valve are available (SchuF Chemieventile Vertriebs, Frankfurt, Germany; G.W. Kent, Ypsilanti, Mich.; Midwest Suppliers, St. Louis Park, Minn.). Gauges such as vacuum gauges are available (W.W. Grainger, Inc., Los Angeles, Calif.). Vacuum pumps, such as liquid ring vacuum pump, dry screw vacuum pump, rotary vane vacuum pump, scroll vacuum pump, diffusion vacuum pump, dry claw vacuum pump, PTFE diaphragm vacuum pump; DuoSeal® high vacuum pump; Vacuubrand RZ2.5® vacuum pump; are available (Busch Vacuum Pumps and Systems, Virginia Beach, Va.; Thomas Scientific, Swedesboro, N.J.). Recording thermometers are available (Thomas Scientific, Swedesboro, N.J.). Automated control of temperatures, for use in reactors, are available (M. Coughran (June 2008) Improve Batch Reactor Temperature Control. Chemical Processing. Emerson Process Managment, Austin, Tex.).

Chillers, air compressors, Extraction Tanks, extractors that use carbon dioxide, gas pumps, liquid pumps, temperature probes, cooling jackets, for example, for cooling an Extraction Tank or extraction chamber are available (MRX Xtractors, Inc. Canby, Oreg.; Apeks, LLC, Johnstown, Ohio).

The sight glass of the present disclosure allows the operator to have a visual gauge on the saturation of the solution. Also, sight glass shows the operator how much ethanol is releasing from the plant material during the collection and evacuation process. The sight glass is an INLINE device that is of preferably of glass, silicone, and stainless construction. As solvent passes over plant material, it begins to absorb actives and becomes rich in color. The sight glass allows the operator to understand at which point the solution has stopped absorbing chemicals during the extraction process. Likewise, after the final rinse with clean ethanol, an operator can determine whether he is still washing color out of the plant material (color means that actives are still being releasing).

Sight glass is available (Dixon Valve, Chesterton, Md.; Abrisa Technologies, Santa Paulo, Calif.; L.J. Star, Inc., Twinsburg, Ohio). Sight glass is a visual observation window made of robust glass, used to verify conditions in pipes, vessels, and chemical reactors. The window resists high temperatures, caustic chemicals and solvents, and high pressure. Sight glass can be made of thick borosilicate glass, quartz, sapphire (Abrisa Technologies, Application Note: Sight Glass (November 2017) (2 pages)).

Exclusionary Embodiments

In embodiments, the present disclosure can exclude any system, device, or method, that comprises more than one solvent storage tank, that comprises more than one extraction tank, that comprises more than one collection tank, that comprises less than two solvent storage tanks, that comprises less than three solvent storage tanks, and so on.

Also, what can be excluded is any system, device, or method, where plant matter is extracted, and where the temperature of plant matter extraction is at a temperature greater than minus 40 degrees C., greater than minus 35 degrees C., greater than minus 30 degrees C., greater than minus 25 degrees C., greater than minus 20 degrees C., greater than minus 15 degrees C., greater than minus 10 degrees C., greater than 0 degrees C., or greater than plus 10 degrees C. Each of these exclusionary embodiments can be further defined, where the relevant temperature cutoff point is relevant for the entire extraction procedure (e.g., time that solvent is in contact with plant matter), for about 95% of the extraction procedure, for about 90%, for about 85%, for about 80%, for about 75%, for about 70%, for about 65%, for about 60%, for about 55%, for about 50%, for about 45%, for about 40%, for about 35%, for about 30%, for about 25%, for about 20%, for about 15%, and the like, of the entire extraction procedure, or for under 95%, under 90%, under 85%, under 80%, under 75%, under 70%, under 65%, under 60%, under 55%, under 50%, under 45%, under 40%, under 35%, under 30%, under 25%, under 20%, under 15% of the entire extraction procedure, and so on, or for over 95%, over 90%, over 85%, over 80%, over 75%, over 70%, over 65%, over 60%, over 55%, over 50%, over 45%, over 40%, over 35%, over 30%, over 25%, over 20%, and the like, of the entire extraction procedure.

In other words, the above designations serve as an algorithm that can support a claim element reading, "wherein the method of plant matter extraction excludes any method of plant matter extraction, where plant matter is extracted at greater than minus 20 degrees C. for under 50% of the entire extraction procedure."

In embodiments, the present disclosure can include, or alternatively exclude, a system, method, or apparatus that comprises a continuous extractor with a first-stage Extraction Tank and a second-stage Extraction Tank. What can also be included, or alternatively excluded, is a system, method, or apparatus that comprises a first-stage Extraction Tank with a trap and a conduit leading to an oil/solvent separator, where the trap and conduit leads the mixture of oil and solvent to an oil/solvent separator, and where this generator produces: (1) Separated oil; and (2) Solvent that is substantially reduced in oil content. What can also be excluded is system, method, or apparatus, where a solvent that is substantially reduced in oil is transported to a reservoir where the reservoir is capable of chilling gaseous solvent or, alternatively, where the solvent that is substantially reduced in oil is cooled by a chiller and then transported to a reservoir. Regarding an apparatus or step where oil-containing biological material is extracted, the present disclosure can encompass, or alternatively exclude, an apparatus or method where liquid solvent such as liquid butane is transported through a conduit, then contacted to, sprayed on, or dripped on, an oil-containing biological product that resides in an Extraction Tank. In one embodiment, what can be encompassed or excluded, is a system or method where Extraction Tank contains a conveyor that moves oil-containing product from an inlet (inlet where oil-containing product is placed into Extraction Tank) to an outlet (outlet where extracted oil-containing product is removed from Extraction Tank).

What can be included, or alternatively excluded, is system or method where vaporized solvent is recycled and placed into a reservoir, where reservoir chills the gaseous solvent to a temperature resulting in change from gaseous state to a liquid state.

In embodiments, the system and method encompasses only one Extraction Tank (or encompasses only one extraction step), and wherein what can be included, or alternatively excluded, is that solvent placed into extraction chamber can be either pure solvent that does not have any residual oil from biological product or alternatively the solvent can take the form of recycled solvent that has traces of residual oil from biological product (recycled using an oil/solvent separator).

In an embodiment with a first-stage Extraction Tank and a second-stage Extraction Tank, solvent placed into second-stage extraction chamber can be either pure solvent that does not have any residual oil from biological product or alternatively the solvent can take the form of recycled solvent that has traces of residual oil from biological product (recycled using an oil/solvent separator). In an exclusionary embodiment, this system and method can be excluded.

Also, in an embodiment with a first-stage Extraction Tank and a second-stage Extraction Tank, solvent placed into first-stage extraction chamber can be either pure solvent that does not have any residual oil from biological product or alternatively the solvent can take the form of recycled solvent that has traces of residual oil from biological product (recycled using an oil/solvent separator). In an exclusionary embodiment, this system and method can be excluded.

Solvent Combinations (Inclusionary and Exclusionary Embodiments)

Without implying any limitation, the present disclosure provides compositions, reagents, devices, systems, and methods, that comprise one or more of the following solvents, for example, combinations of only two, of only three, of only four, of only five, of only six, or of more than six of the following solvents. The solvents are liquid carbon dioxide, supercritical carbon dioxide, ethanol in water, ethanol in a solvent that is not water, ethanol in a mixture of solvents where none are water, or ethanol in a solvent that is mixture of water plus another solvent that is not water. The solvents that are used with, or that are comprised by, the compositions, reagents, devices, systems, and methods of the present disclosure, can also include one or more of, any non-polar solvent, any mildly polar solvent, butane, hexane, cyclohexane, ethane, pentane, octane, diethyl ether, methanol, ethanol, isopropanol, n-propanol, chloroform, ethyl acetate, acetone, diethylamine, xylene, dioxane or similar hydrocarbons or alcohols. Regarding the above-disclosed solvents (and also in the solvents disclosed below), unless specified otherwise, the list does not impose any limitation on which solvent is to be dissolved in which other solvent (or in which other of a plurality solvents).

The solvent, such as ethanol, can be chosen from the following concentrations, 0%, 0.01%, 1%, 5%, 10%, 15%, 20%, 25%, 30%, 35%, 40%, 45%, 50%, 55%, 60%, 65%, 70%, 75%, 80%, 85%, 90%, 95%, 99%, or 100% solvent (or the solvent can be in a range that is defined by any two of these percentages).

The solvent, such as ethanol, can be chosen from one of the following concentrations: about 5%, about 10%, about 15%, about 20%, about 25%, about 30%, about 35%, about 40%, about 50%, about 60%, about 70%, about 75%, about 80%, about 85%, about 90%, about 95%, about 99.5%, about 100% solvent (or the solvent can be in a range that is defined by any two of these percentages). The term "about" can mean plus or minus 5%. The term "percent" means by volume. In exclusionary embodiments, the compositions, reagents, devices, systems, and methods of the present disclosure can exclude any one or more of the above solvents, and can exclude any one or more of the above solvents at any one or more of the indicated percentage values, and optionally, at the indicated "about" values.

The solvent, such as ethanol, can be chosen from the following concentrations, under 5%, under 10%, under 15%, under 20%, under 25%, under 30%, under 35%, under 40%, under 45%, under 50%, under 55%, under 60%, under 65%, under 70%, under 75%, under 80%, under 90%, under 95%, under 100% solvent.

The solvent, such as ethanol, can be chosen from the following concentrations: Concentrations that are over 5%, over 10%, over 15%, over 20%, over 25%, over 30%, over 35%, over 40%, over 45%, over 50%, over 55%, over 60%, over 65%, over 70%, over 75%, over 80%, over 85%, over 90%, over 95% solvent, or over 99%. In exclusionary embodiments, the compositions, reagents, devices, systems, and methods of the present disclosure can exclude any one or more of the above solvents, and can exclude any one or more of the above solvents at the indicated percentage values, and at the indicated "about" values.

In a preferred embodiment, a solvent (such as ethanol) is dissolved in only one solvent, where this one solvent is water. In another embodiment, a solvent (such as ethanol) is dissolved in a mixture of only two other solvents. In yet another embodiment, a solvent (such as ethanol) is dissolved in a mixture of only three solvents. In still another embodiment, a solvent (such as ethanol) is dissolved in a mixture of one or more additional solvents, or dissolved in mixture of two or more additional solvents, or dissolved in a mixture of three or more additional solvents. Also, in another embodiment, the solvent (such as ethanol) can be dissolved in a mixture of a plurality of solvents, where one of these is water. Also, the solvent (such as ethanol) can be dissolved in a mixture of a plurality of solvents, where none of these is water. The term "about" preferably means plus or minus 5%. In other embodiments, the term "about" can mean plus or minus 1%, plus or minus 2%, plus or minus 6%, or plus or minus 8%. The term "percent" means by volume. Regarding the above-disclosed solvents, unless specified otherwise, the list does not impose any limitation on which solvent is to be dissolved in which other solvent (or in which plurality of other solvents). In exclusionary embodiments, the compositions, reagents, devices, systems, and methods of the present disclosure can exclude any one or more of the above solvents, and can exclude any one or more of the above solvents at the indicated percentage values, and at the indicated "about" values.

Combinations of Polar Solvents; Combinations of Non-Polar Solvents (Inclusionary and Exclusionary Embodiments.

The present disclosure provides compositions, reagents, devices, systems, and methods, that comprise one or more polar solvents, one or more non-polar solvents, or that comprise one or more of each of polar and non-polar solvents. Polar solvents have large dipole moments, also known as, "partial charges." They contain bonds between atoms with very different electronegativities, such as oxygen and hydrogen. Non-polar solvents contain bonds between atoms with similar electronegativities, such as carbon and hydrogen, such as octane. Bonds between atoms with similar electronegativities will lack partial charges. This absence of charge which makes these molecules "non-polar." Polarity can be measured by two direct ways. One is through measuring a constant called "dielectric constant." The greater the dielectric constant, the greater the polarity (value for water is high, value for gasoline is low). A second way comes from directly measuring the dipole moment. Polarity is a continuum. While pentane is "non-polar" and water is "polar", there are borderline cases such as diethyl ether, dichloromethane, and tetrahydrofuran (THF) which have both polar and non-polar characteristics. A dividing line between "polar" and "non-polar" is miscibility with water. Diethyl ether and dichloromethane do not mix with water. On the other hand, THF, DMSO, acetonitrile, DMF, acetone and short-chain alcohols do (see, Ashenhurst, James. Substitution Reactions. Masterorganicchemistry dot com). For several nonpolar solvents, the dielectric constants are as follows: pentane (1.8), hexane (1.9), cyclohexane (2.0), benzene (2.4), toluene (2.3), chloroform (4.8), diethylether (4.3). For several polar solvents, the dielectric constants are as follows: acetone (21), demethylformamide (38), acetonitrile (37), ammonia (25), t-butanol (12), ethanol (25) methanol (33), acetic acid (6.2), water (80). The dielectric constants of glycerol (45), ethanol (25), and water (80), and dependence on temperature, are disclosed in, Ponomarenko, Yang, Katsnelson (2009) Effect of high-kappa environment on charge carrier mobility in graphene. Physical Review Letters. 102:206603. The dielectric constraint of acetone (20.7) is disclosed by Goto, Kawata, Nakamura, Aoyama (1986) J. Microencapsulation. Vol. 3, Issue 4. In embodiments, the present disclosure provides compositions, reagents, devices, systems, and methods, can include one or more of the above solvents, such as about 20% acetone, about 30% acetone, about 40% acetone, about 50% acetone, about 60% acetone, about 70% acetone, about 80% acetone, about 90% acetone, or about 95% acetone dissolved in a solvent that is water, or 100% acetone. The term "about" can mean plus or minus 5%. The term "percent" means by volume. Regarding the above-disclosed solvents, unless specified otherwise, the list does not impose any limitation on which solvent is to be dissolved in which other solvent (or in which other solvents). In exclusionary embodiments, the compositions, reagents, devices, systems, and methods of the present disclosure can exclude any one or more of the above solvents, and can exclude any one or more of the above solvents at the indicated percentage values, and at the indicated "about" values.

Temperatures and Temperature Ranges Used in Methods of the Present Disclosure (Inclusionary Embodiments and Exclusionary Embodiments).

In temperature embodiments, the present disclosure provides compositions, reagents, devices, systems, and methods, that include one or more solvents, such as any of the solvents that are disclosed in the above paragraphs, or in any of the following paragraphs, where the temperature (Centigrade) is 20 degrees, 15 degrees, 10 degrees, 5 degrees, 0 degrees, minus 5 degrees, minus 10 degrees, minus 15 degrees, minus 20 degrees, minus 25 degrees, minus 30 degrees, minus 35 degrees, minus 40 degrees, minus 45 degrees, minus 50 degrees, minus 55 degrees, minus 60 degrees, minus 65 degrees, minus 70 degrees, minus 75 degrees, or minus 80 degrees. What is also provided is a solvent with a temperature that is in a range defined by any of the above two temperatures, such as the range of minus 30 degrees to minus 50 degrees. In exclusionary embodiments, the present disclosure can exclude any solvent that has one of the above temperatures, or it can exclude any composition, reagent, device, system, or method that comprises a solvent having one of the above temperatures.

Also, what is provided is a solvent that has a temperature (Centigrade) of about 20 degrees, about 15 degrees, about 10 degrees, about 5 degrees, about 0 degrees, about minus 5 degrees, about minus 10 degrees, about minus 15 degrees, about minus 20 degrees, about minus 25 degrees, about minus 30 degrees, about minus 35 degrees, about minus 40 degrees, about minus 45 degrees, about minus 50 degrees, about minus 55 degrees, about minus 60 degrees, about minus 65 degrees, about minus 70 degrees, about minus 75 degrees, or about minus 80 degrees. What is also provided is a solvent that has a temperature that is in a range defined by any of the above two temperatures, such as the range of about minus 30 degrees to about minus 50 degrees. The term "about" can mean plus or minus 5 degrees. In exclusionary embodiments, the present disclosure can exclude any solvent that has one of the above temperatures, or it can exclude any composition, reagent, device, system, or method that comprises a solvent that has one of the above temperatures.

In "greater than" embodiments, the present disclosure provides compositions, reagents, devices, systems, and methods, that include one or more solvents, such as any of the above-disclosed solvents has a temperature that is "greater than" 20 degrees, 15 degrees, 10 degrees, 5 degrees, 0 degrees, minus 5 degrees, minus 10 degrees, minus 15 degrees, minus 20 degrees, minus 25 degrees, minus 30 degrees, minus 35 degrees, minus 40 degrees, minus 45 degrees, minus 50 degrees, minus 55 degrees, minus 60 degrees, minus 65 degrees, minus 70 degrees, minus 75 degrees, or minus 80 degrees. "About" embodiments of these "greater than" ranges are also provided by the present disclosure, where "about" means plus or minus five degrees.

In "lesser than" embodiments, the present disclosure provides compositions, reagents, devices, systems, and methods, that include one or more solvents, such as any of the above-disclosed solvents has a temperature that is "lesser than" 20 degrees, 15 degrees, 10 degrees, 5 degrees, 0 degrees, minus 5 degrees, minus 10 degrees, minus 15 degrees, minus 20 degrees, minus 25 degrees, minus 30 degrees, minus 35 degrees, minus 40 degrees, minus 45 degrees, minus 50 degrees, minus 55 degrees, minus 60 degrees, minus 65 degrees, minus 70 degrees, minus 75 degrees, or minus 80 degrees. "About" embodiments of these "lesser than" ranges are also provided by the present disclosure, where "about" means plus or minus five degrees.

Published values for chlorophyll content, THC content, and CBD content, in *Cannabis sativa*. Data are available on the amounts of chlorophyll (a) (dotted histogram), chlorophyll (b) (hatched histogram), and total chlorophyll (open histogram) in leaves of female *Cannabis sativa* plants. See, Mansouri, Asrar, Mehrabani (2009) J. Integrative Plant Biology. 51:553-561, FIG. 1, where data are in units of micrograms/gram dried leaves. Another publication (Mansouri, Salari, Asrar (2013) Industrial Crops and Products. 46:269-273), reports THC in leaves, THC in flowers, CBD in leaves, CBD in flowers, and chlorophyll (a) and (b) in leaves (no info on flowers). THC in leaves (mg/gram dry weight) is 0.4 mg/g for leaves from both male and female plants (FIG. 1 of Mansouri). THC in flowers (mg/gram dry weight) is 2.0 mg/gram for male flowers, and 2.75 mg/gram for female flowers (FIG. 2 of Mansouri). CBD in leaves for both male and female plants is 0.9 mg/gram dry weight (FIG. 3). CBD in flowers from male plants (0.75 mg/gram) and CBD in flowers from female plants (0.2 mg/gram dry weight (FIG. 4 of Mansouri). Regarding chlorophyll, data was provided only for leaves (not flowers). Chlorophyll (a) in leaves from male plants (2 mg/gram fresh weight), chlorophyll (b) in leaves of male plants (1.0 mg/gram fresh weight (see, FIG. 5 of Mansouri). Chlorophyll (a) in leaves of female plants, 1.9 mg/gram fresh weight. Chlorophyll (b) in leaves female plants (1.0 mg/gram fresh weight (FIG. 6 of Mansouri).

ETHANOLIC SOLVENTS. The ethanolic solvent can be solution that is 100% ethanol, a solution that is 99% ethanol and 1% water (by volume, where the respective volumes are those prior to combining the ethanol and water), a solution that is 98% water and 2% water, a solution that is, 97% ethanol and 3% water, 96% ethanol and 4% water, 95% ethanol and 5% water, 94% ethanol and 6% water, 93% ethanol and 7% water, 92% ethanol and 8% water, 91% ethanol and 9% water, 90% ethanol and 10% water, 85% ethanol and 15% water, or the required ethanol can be in a range that is bracket by any two of the above solutions, and so on. The ethanol can be, reagent grade ethanol, or can be 100% ethanol. The water can be deionized water, or it can be distilled water, or it can be double-distilled water, or it can be 100% water.

DRYING THE CANNABIS EXTRACT. Ethanol and water (if any water) can be removed from mixture of cannabis plant matter and ethanolic solvent as follows. Removal can be accomplished by one or more of, or any combination of, filtering, centrifuging followed by pouring out or sucking out supernatant, filtering followed by drying, centrifuging followed by drying. Drying can be with aid of a desiccant, such as, phosphorous pentoxide, silicate, or calcium oxide, activated alumina, and so on. Drying can be with heating with exposure to atmospheric conditions, or drying can be with heating under a vacuum, or drying can be with heating with or without assistance from a desiccant. Residual water in the cannabis extract can be measured, e.g., by scanning absorption spectral lines (see, Zhang, Chen, Kong, Song (2012) Photonic Sensors. 2:71-76), or by aggregation-induced emission enhanced Cu nanoclusters (see, Song, Zhang, Zhao (2018) Analyst. 143:3068-3074). The disclosure provides extracts with residual ethanol or residual water or of a combination of residual ethanol and water, of less than 1.0% by weight, less than 0.5%, less than 0.2%, less than 0.1%, less than 0.05%, less than 0.02%, less than 0.01%, by weight, and so on.

RECOVERY OF A GIVEN CHEMICAL IN THE EXTRACT. In the claim set, the values for percentage were calculated from the data in the table in FIG. 13 ("Peak area normalized by yield"). The reason for choosing the set of "Normalized data" in FIG. 13, and for not choosing the set of "Unnormalized data" is as follows. The "Normalized data" show that reducing the temperature from zero degrees shows that cannflavin extraction is increased from "551,844, 722" (zero degrees) to "658,438,656" (minus 70 degrees) (this is a 19 percent increase) and that chlorophyll extraction is reduced from "18,687,144" (zero degrees) to "3,876,571" (minus 70 degrees) (this is a reduction down to 21 percent of value from the zero degrees procedure). Regarding the percentage values that were calculated and shown below, FIG. 15 and FIG. 16 in this patent show the percentage values. These percentage values were calculated from the "Peak area" values from FIG. 13 and FIG. 14 of this patent.

Using the Normalized data, the respective changes were:

Cannflavin value increased (increase of 19%) when minus 70 degrees is used, as compared to the cannflavin value when zero degrees was used.

Reduction of chlorophyll down to 21% of value acquired when the zero degrees procedure was used, when minus 70 degrees is used.

12 Percent increase in linoleic acid.

Reduction in oleic, down to 68% of value acquired when the zero degrees procedure was used.

Reduction in sucrose, down to 73% of value acquired when the zero degrees procedure was used.

Reduction in behenyl arachidate (C42) wax, down to 32% of value acquired when the zero degrees procedure was used.

Using the Unnormalized data, the respective changes were:

Reduction of cannflavin down to 81% when minus 70 degrees was used, as compared to the cannflavin value acquired when zero degrees extraction was used.

Reduction of chlorophyll down to 14% of the value acquired, when the minus 70 degrees was used, as compared to the higher value when zero degrees was used.

Reduction of linoleic acid down to 76%.

Reduction of oleic acid down to 47%.

Reduction of sucrose down to 50%.

Data on the behenyl arachidate wax was not available.

According to the Report by Applicants, the data using Unnormalized produced a pattern of recovery that was more consistent with the properties of the extracted chemicals, and for this reason, the percentage recovery values from the Unnormalized data are used in the claim set. The Report by Applicant states that, "extraction efficiency of pigments . . . fatty acids, waxes, and sugars in ethanol extracts decreases as the extraction temperatures decreased from 0 degrees C. to minus 70 degrees C. . . . this trend suggests that polar compounds can still be extracted in cold temperatures, whereas non-polar compounds become more insoluble as temperature decreases."

But for the wax, it makes sense only to use the Normalized data, because of the fact that Unnormalized data for wax was not mentioned in the Applicant's report. Sivashanmugan, Zhao, and Wang (2019) Biosensors. Vol. 9:129-136, report that, THC has polarity, in its writing that, "A quick migration of the THC on the diatomaceous earth TLC plate was observed and can be attributed to the molecular polarity of THC."

CANNABIS PLANT MATTER. Cannabis plant matter can take the form of mostly cannabis flowers, or mostly leaves, or in at least 90% cannabis flowers by weight, or in at least 90% leaves by weight. Plant matter that is not flowers or leaves can be, e.g., stems or bracts or inflorescences or main shoots or axillary shoots (see, Spitzer-Rimon, Duchin, Bernstein, Kamenetsky (2019) Frontiers in Plant Science. DOI: 10.3389).

VESSELS. A vessel can be a tube (such as a test tube or a centrifuge tube), a flask, a beaker, a cylinder, a vat, or tank, suitable for batchwise processing, and where the vessel comprises a side or sides, and wherein the vessel comprises a bottom. The vessel can have an inlet and an outlet, wherein the inlet and outlet are configured for either batchwise processing or for continual processing. Or the vessel can be a pipe, tube, flask, beaker, cylinder, vat, or tank, configured only for continual processing.

COMBINATIONS OF EXTRACT WITH A CONSUMER DEVICE. The present disclosure provides combinations of cannabis extract (extract enriched in cannabinoids, but depleted in pigments such as chlorophyll and depleted in waxes and lipids, where the extract resides in a vaping device, a dermal patch (see, U.S. Pat. No. 10,272, 125, and U.S. Pat. Publ. No. 2019/0110981, each of which is incorporated herein by reference in its entirety), in an electronic cigarette (e-cigarette), in skin lotion, in an elixir, pill, tablet, capsule, beverage, cookie, cake, and so on, or in combination with one or more terpenes (see, U.S. Pat. No. 10,265,292, which is incorporated herein by reference in its entirety), or in combination with one or more entourage compounds (see, U.S. Pat. No. 10,265,292). An e-cigarette contains these components: A cartridge or reservoir or pod, which holds a liquid solution containing varying amounts of nicotine, flavorings, and other chemicals, a heating element (atomizer), a power source (usually a battery), and a mouthpiece that the person uses to inhale. Vaping solutions and e-cig solutions are described (see, Canistro, Vivarelli, Paolini (2017) Scientific Reports. Vol. 7, Article No. 2018; Morrill, Abel, Chamberlain (2017) Currents in Pharmacology Teaching and Learning. 9:1147-1150; Zhang, Sumner, Chen (2012) Nicotine and Tobacco Research. 15:501-508). Oral formulations that contain cannabinoids are described (see, Mattes, Shaw, Elsohly (1993) Pharmacology, Biochemistry, and Behavior. 44:745-747; Kanhai, Baakman, Cohen (2018) Clinical Therapeutics. 40:1467-1482; Klumpers, Beumer, Freijer (2011) British J. Clinical Pharmacology. 74:42-53).

Cannabinoid suppositories, sublingual formulations, and transdermal formulations, are described (see, Grotenherman (2003) Pharmacokinetics and Pharmacodynamics of Cannabinoids. Clin. Pharmacokinet. 42:327-360).

EXCLUSIONARY EMBODIMENTS. The systems, devices, compositions, extracts, reagents, powders, oils, and methods of the present disclosure can exclude any system, device, composition, extract, reagent, powder, oil, or method, that comprises one or more of the above-disclosed ethanolic solvents. What can excluded is a method for extracting cannabis plant matter in ethanol, or in an ethanolic solution, where the method produces an extract, and where the temperature of the extract is (at any point in the method) above the temperature of minus 30 degrees C., about the temperature of minus 20 degrees C., above the temperature of above minus 10 degrees C., or above the temperature of zero degrees C., or above the temperature of plus ten degrees C.

U.S. Pat. Nos. 10,035,081 and 10,507,407. U.S. Pat. No. 10,035,081 (Methods to reduce chlorophyll co-extraction through extraction of select moieties essential oils and aromatic isolates) and U.S. Pat. No. 10,507,407, are hereby incorporated by reference in their entirety. In addition to encompassing each of the systems, devices, parts, reagents, compositions, and methods, and the like of said patents, the present disclosure also encompasses exclusionary embodiments of said systems, devices, parts, reagents, compositions, and methods. In other words, the present disclosure can expressly exclude any of said systems, devices, parts, reagents, compositions, and methods.

COMPOSITIONS THAT INCLUDE TERPENES. The present disclosure provides compositions derived from an ethanolic extract of hemp, an ethanolic extract of drug-type Cannabis, an ethanolic extract of fiber-type Cannabis, an ethanolic extract of Cannabis flowers, an ethanolic extract of Cannabis leaves, an ethanolic extract of a mixture of Cannabis flowers and leaves, where the extract contains terpenes. The terpenes can consist entirely of terpenes (endogenous terpenes) present in the ethanolic extract created by the methods of the present disclosure. Alternatively, the terpenes can consist of a mixture of added terpenes plus any endogenous terpenes that are present in the ethanolic extract created by the methods of the present disclosure.

The present disclosure provides compositions, and methods for making said compositions, where the composition contains about 0.1% by weight terpenes, about 0.2% by weight terpenes, about 0.4%, about 0.6%, about 0.8%, about 1.0%, about 2.0%, about 4.0%, about 6.0%, about 8.0%, about 10%, about 12%, about 14%, about 16%, about 18%, about 20%, about 25%, about 30% terpenes, where this weight percentage is calculated as follows. The weight percentage is calculated from the total weight of the solid material (solid material derived from the extract, called the "yield") minus the weight of any endogenous terpenes, versus, the combined weight of the endogenous terpenes (if there are any measurable endogenous terpenes) plus the weight of any added terpenes. The added terpenes can be one or more of, alpha-bisabolol, borneol, camphene, camphor, delta-3-carene, caryophyllene oxide, alpha-cedrene, beta-eudesmol, fenchol, geraniol, guaiol, alpha-humulene, isoborneol, linalool, menthol, nerol, cis-ocimene, trans-ocimene, alpha-phellandrene, alpha-pinene, beta-pinene, sabinene, alpha-terpinene, alpha-terpineol, terpinolene, alpha-guaiene, elemene, farnesene, germacrene B, guaia-1 (10),11-diene, trans-2-pinanol, selina-3,7(11)-diene, eudesm-7(11)-en-4-ol, valencene, beta-caryophyllene, limonene, and myrcene, without implying any limitation, or any additional terpenes (see, US2015-0080265 which is incorporated by reference in its entirety). Suppliers of pure terpenes include, Sigma-Aldrich, St. Louis, Mo.

Standard Deviations.

The standard deviation measures the amount of variability in a population of numbers. The standard deviation is a common measure of dispersion or spread. It is the square root of the average of the squared deviations of the observations from the mean. The summation sign Σ is an instruction to sum the elements of a sequence. The standard deviation is the square root of the following: $\Sigma[(\text{of x minus mean of x})^2]/[n-1]$. The value for: (x-mean of x) is called, "deviation from the mean." The value for: $(\text{x-mean of x})^2$, is called, "squared deviation." See, Kirkwood and Sterne (2003) Essential Medical Statistics, 2nd ed., Blackwell Science (pages 33-41); Dawson and Trapp (2004) Basic and Clinical Biostatistics, 4th ed., Lange Medical Books (pages 30-32, 413). Also, see examples of standard deviation calculations in, Jones (2002) Pharmaceutical Statistics, Pharmaceutical Press, pages 21-26.

EXAMPLES (EXTRACTION AT ZERO DEGREES, MINUS 10, MINUS 30, MINUS 50, AND MINUS 70 DEGREES). This reports the Applicant's laboratory data on the efficiency of the removal of impurities from cannabis extracts using cold ethanol extraction as developed by the Applicant. The analytes that were tested included, chlorophyll (a), as well as, pigments, fatty acids, sugars, and waxes were. Applicant determined representative compounds in each class which have been detected in cannabis plants and hemp plants (Brenneisen 2007; Gutiérrez et al., 2006; Leizer et al., 2000; Werz et al., 2014). Six analytes including chlorophyll a were quantified in cannabis extracts prepared at five (5) different extraction temperatures (0° C., minus 10° C., minus 30° C., minus 50° C., minus 70° C.) using LC-MS/MS (LC-MS is, liquid chromatography-mass spectrometry) and GC-MS/MS (GC-MS is: gas chromatography-mass spectrometry). The dependence of removal efficiency on extraction temperature was evaluated based on relative abundance of analyte peaks.

The word "number" as it occurs below, refers to figure numbers in Applicant's original lab report.

SAMPLES. Applicant received five (5) samples of cannabis flower extracted in ethanol at five (5) different temperatures (0° C., minus 10° C., minus 30° C., minus 50° C., minus 70° C.). All samples were stored at room temperature and covered with aluminum foil to minimize both precipitation and the degradation of analytes. A yield test, analysis of pigments, fatty acids, and sugars using LC-MS/MS, and analysis of wax ester using GC-MS/MS was performed within 1 week from the sample delivery. In the case of chlorophyll (a), sample preparation and analysis was performed immediately upon receipt to minimize degradation.

YIELD TEST. Each sample jar was stirred vigorously for 10 seconds and a 5 mL of each sample (n=3) was aliquoted into 50 mL centrifuge tubes. They were placed on a hot plate and the ethanol extracts were evaporated at 50° C. until dried completely. The centrifuge tubes were weighed using an analytical balance before and after aliquoting of samples, as well as after the evaporation was complete. Sample yield was determined from a 5 mL aliquot by calculating the weight after evaporation subtracted by the weight before evaporation.

TARGET COMPOUNDS FOR QUANTITATIVE ANALYSIS. Applicant determined six analytes which cover at least one compound of pigments (chlorophyll (a) and cannflavin A), fatty acids (linoleic acid and oleic acid), waxes (behenyl arachidate), and sugars (sucrose). All analytes except for wax were analyzed using LC-MS/MS. Wax was analyzed using GC-MS/MS because it was not soluble in solvents, such as methanol and acetonitrile, used for LC-MS/MS.

SAMPLE PREPARATION FOR LC-MS/MS. Sample jars were stirred vigorously for 10 seconds to make the samples homogeneous. Methanol (0.9 mL) was aliquoted into an HPLC vial and 0.1 mL of sample was then added to the HPLC vial. Triplicates were prepared for each sample. The aliquots were filtered by 0.45 μm PTFE syringe filters and the filtrates were retained in HPLC vials as a final solution. The analysis of final solutions was performed using LC-MS/MS (Agilent 6470 triple quadrupole mass spectrometer). HPLC is, "high pressure liquid chromatography," also known as, "high performance liquid chromatography." PTFE is, polytetrafluoroethylene.

SAMPLE PREPARATION FOR GC-MS/MS. The sample residues obtained from the yield test were used for the wax analysis. An adjusted volume of dichloromethane was added to the residues in 50 mL centrifuge tubes in order to normalize the sample concentration at 50 mg/mL (e.g. 1.2 mL of dichloromethane was added to 60 mg of sample residue). Triplicates were prepared for each sample. 0.8 mL of dichloromethane was aliquoted into HPLC vials and 0.2 mL of the normalized samples were added to the HPLC vials. The aliquots were filtered by 0.45 μm PTFE syringe filters and the filtrates were received in HPLC vials as a final solution. The analysis of final solutions was performed using GC-MS/MS (Agilent 7010B triple quadrupole mass spectrometer; Agilent Technologies, Inc., Santa Clara, Calif. 95051).

ADDITIONAL GUIDANCE. Guidance for using the Agilent mass spectrometer is provided by, e.g., Application Note Food Testing & Agriculture, Agilent Technologies, Inc. Guidance for LC-MS/MS (liquid chromatography-tandem mass spectroscopy) and in using Agilent 6470 triple quadropole mass spectrometer is available (see, Sutherland, Ozbal, Nicoleau (2018) Future Science. 10.4155/fsoa-2018-0079; Lowry, Truver, Swortwood (2019) Forensic Toxicology. 37:215-223). Guidance for GC-MS/MS Agilent 7010B triple quadrupole mass spectrometer, is available (James, Collins, Amlot, Marczylo (2010) J. Chromatography B. 1109:84-89; Troyer, Causon, Hann (2019) Talanta. DOI.org/10.1016/j.talanta 2019.120147).

REMOVING LIPIDS, WAXES, CHLOROPHYLL. An advantage of removing lipids from cannabinoid preparations is to reduce risk for "lipoid pneumonia," and hypoxemic respiratory failure. An advantage of removing waxes from cannabinoid preparations is to reduce stickiness of the cannabinoid preparation. Stickiness can clog vaping devices. Stickiness can make cannabinoid preparations unpleasant to swallow. And advantage of removing chlorophyll is to reduce the bad flavor or bitter flavor provided by the chlorophyll. Another disadvantage of chlorophyll, is that it may involved cross-reticulations which may prevent the active principles in the extract from being released (e.g., from being released when a soft gelatin is used for encapsulating of the extract). The advantages for removing sugars are primarily for distillation purposes. Sugars are difficult to remediate out of cannabinoid crude, and will always co-distill in short path cannabinoid distillation. When sugars are present in distillate, bad things happen: 1. Sometimes the sugars begin to harden and end up gunking up the distillation equipment. The gunk coagulates on the walls of the hot surfaces, and becomes glassy. It's very difficult to remove from the equipment, but seems to be water soluble. 2. The sugars always co-distill. The end result of sugars in cannabinoid distillate is always a lower potency of distillate (Mid 70% to low 80% THC or CBD potency). Likewise, having the sugars in the distillate gives the distillage a sweet smell, reduced clarity (grainy honey) and lower viscosity, which is an immediate visual identifier for low potency. 3. Most processors that are producing cannabinoid distillate are doing so to manufacture smokable vape products. It is not recommended that people smoke products that include sugars.

QUANTITATIVE ANALYSIS. Peak areas of analytes in final solutions were quantified using Agilent Mass Hunter Software (see, Agilent Mass Hunter Software Quick Start Guide®). Average values of relative peak abundance in triplicates were plotted against the extraction temperature and compared among the extraction temperature with and without normalizing their peak areas to the yield obtained from each sample.

RESULTS FROM THE YIELD TEST. The yield obtained from the ethanol extracts after evaporation showed a decreasing trend as the extraction temperature decreased from 0° C. to minus 70° C. (See, FIG. 6) (number (1) in original lab report). A mass of the ethanol extracts (5 mL) was almost the same among the 5 samples: 3.87 g (0° C.), 3.89 g (−10° C.), 3.87 g (−30° C.), 3.86 g (−50° C.) and 3.87 g (−70° C.). The yield obtained from the ethanol extracts was 1.78%, 1.89%, 1.47%, 1.34% and 1.21% based on their mass. The figure shows yield obtained from 5 mL of ethanol extracts (0° C., minus 10° C., minus 30° C., minus 50° C. and minus 70° C.) after evaporation at 50° C.

EXTRACTION TIME. Extraction time was ten (10) minutes of soaking with one minute of agitation. Preferably, the one minute of agitation occurs immediately before the ten minutes of soaking.

ALTERNATIVE TEMPERATURE RANGES; ALTERNATIVE EXTRACTION TIMES. In alternative embodiments, the present disclosure provides a total extraction time at given temperature plus or minus one degree C., or at a given temperature plus or minus two degrees C., or at a given temperature plus or minus four degrees C., or at a given temperature plus or minus six degrees C., and so on. The present disclosure provides a total extraction time of two minutes, four minutes, five minutes, six minutes, eight minutes, ten minutes, 11 minutes, 12 min, 14 min, 16 min, 18 min, 20 min, or for not more than two minutes, not more than four minutes, not more than six minutes, not more than eight minutes ten minutes, no more than 12 min, not more than 14 min, not more than 16 min, not more than 18 min, not more than 20 min, and the like. In other embodiments, the present disclosure provides an extraction time of 1-2 min, 1-4 min, 2-4 min, 6-8 min, 6-10 min, 6-12 min, 6-14 min, 8-10 min, 8-12 min, 8-14 min, 8-16 min, 10-12 min, 10-14 min, 10-16 min, 10-18 min, 10-20 min, 12-14 min, 12-16 min, 12-18 min, 12-20 min, and so on.

In exclusionary embodiments, the present disclosure can exclude any system, device, method, composition made by such method, that uses one or more of the above-disclosed durations of time, or that uses one or more of the above-disclosed ranges of time (e.g., 6-10 min). Without employing any limitation, duration of extraction time can be measured from the moment when the solution has been successfully brought to the desired extraction temperature until the moment when extraction is terminated. Extraction may be terminated, for example, by filtration to remove solvent, by freezing (e.g., by plunging vial or container in liquid nitrogen), or by rapid evaporation to remove solvent.

QUANTITATIVE ANALYSIS OF PIGMENTS, FATTY ACIDS, AND SUGAR, USING LC-MS/MS. Chromatograms of the 5 analytes (chlorophyll (a), cannflavin A, linoleic acid, oleic acid and sucrose) showed almost symmetrical peaks without matrix interferences. The injections of triplicates also showed reproducible results. All the analytes showed a decreasing trend with extraction temperature, which means that a colder extraction removes these impurities in the ethanol extracts (number (3) in original lab report). Number (3) in original lab report shows, relative peak abundance of pigments (chlorophyll (a) and cannflavin A), fatty acids (linoleic acid and oleic acid), and sugar (sucrose) in ethanol extracts (0° C., −10° C., −30° C., −50° C. and −70° C.) without normalization to yield.

On the other hand, when the peak areas were normalized by the yield, it showed a compound-specific trend. Cannflavin A increased in colder extractions, linoleic acid did not change noticeably with the extraction temperature, chlorophyll a and oleic acid decreased in colder extractions, and sucrose decreased until −50° C. but increased at −70° C. (number (4) in original lab report). This trend suggests that polar compounds (e.g. cannflavin A) are extracted more effectively than non-polar compounds (e.g. chlorophyll a and oleic acid) in the final products.

Number (2) in original lab report shows, extracted ion chromatograms of pigments (chlorophyll a and cannflavin A), fatty acids (linoleic acid and oleic acid), and sugar (sucrose) in ethanol extract (0° C.).

QUANTITATIVE ANALYSIS OF WAX USING GC-MS/MS. Extracted ion chromatograms of wax (behenyl arachidate) showed almost undetectable peaks (number (5) in original lab report). The mass transitions of C42 and C44 waxes which were abundant in hemp based fibers (Gutierrez et al., 2006) were almost negligible in the ethanol extract (0° C.). Relative peak abundance of behenyl arachidate normalized to yield showed a decreasing trend (number (5) in original lab report). The trend was the same as that seen for the other non-polar compounds such as chlorophyll (a) and oleic acid (FIG. 4 in original lab report). According to Holser and Akin (2008), waxes (e.g. C50, C52, and C54) showed a strong decrease in solubility between 70° C. and 40° C. as the solution was cooled (number (6) in original lab report). Also, a hot ethanol extract (80° C.), which contained 0.86 mg total lipids/mL with 25% of these lipids represented by the waxes, was cooled overnight at 10° C. and there were no waxes detected in the liquid phase after cooling (Holser and Akin, 2008). This fact strongly suggests that waxes were not extracted in the cold ethanol which was below 0° C. The above-mentioned numbers refer to figures in the original lab report.

NORMALIZATION. The peak area was normalized by yield to compare their quantity in the final product, and also compared without the normalization (except for wax because it was normalized during the reconstitution) to quantify them in the liquid extracts.

SAMPLE PREPARATION. Sample preparation for LC-MS/MS involved these steps:

(1) Stir sample jars for about 10 seconds, to make the sample homogeneous.

(2) Add methanol (0.9 mL) into HPLC vials.

(3) Aliquot samples (0.1 mL) into HPLC vials (10× dilution).

(4) Filter the aliquots with 0.45 micrometer PTFE syringe filter and receive the filtrates in HPLC vials.

(5) Ready for LCQQQ. The abbreviation, "QQQ" means, triple quadrupole.

Sample preparation for GC-MS/MS involved these steps:

(1) Use sample residues obtained in the Yield Test.

(2) Add dichloromethane (volume is normalized by the yield) into the 50 mL PP tubes.

(3) Vortex until the residues are completely dissolved.

(4) Add dichloromethane (0.8 mL) into HPLC vials.

(5) Aliquot samples (0.2 mL) into HPLC vials.

(6) Filter the aliquots with 0.45 micrometer PTFE syringe filters and receive the filtrates in HPLC vials.

(7) Ready for GC-MS/MS.

The methods, instruments, and reagents, for sample preparation, as well as other methods, instruments, and reagents that are disclosed herein, are not to be construed as limitations on the present disclosure, unless written in the claim set.

CONCLUSIONS. The extraction efficiency of pigments (including chlorophyll (a)), fatty acids, waxes, and sugars in ethanol extracts decreased as the extraction temperature decreased from 0° C. to −70° C. On the other hand, the abundance of these impurities in residues obtained from the ethanol extracts after evaporation was compound dependent. Cannflavin A increased in colder extractions, whereas chlorophyll (a), oleic acid, and wax decreased in the colder extractions. This trend suggests that polar compounds can still be extracted in cold temperatures whereas non-polar compounds become more insoluble as temperature decreases. In conclusion, a colder ethanol extraction reduces the overall impurities in extracts while the composition of residues (that is, residues in the final products) exhibits a downward trend for some compounds including chlorophyll (a), but not all compounds and particularly not for certain polar compounds which may increase in the final products.

FIG. 6 in the present patent (numbered "FIG. 1" in original lab report) shows, yield obtained from 5 mL of ethanol extracts (0° C., −10° C., −30° C., −50° C. and −70° C.) after evaporation at 50° C.

Number (2), referring to a figure in original lab report, shows extracted ion chromatograms of pigments (chlorophyll (a) and cannflavin A), fatty acids (linoleic acid and oleic acid), and sugar (sucrose) in ethanol extract (0° C.).

Number (3) in original lab report shows, relative peak abundance of pigments (chlorophyll (a) and cannflavin A), fatty acids (linoleic acid and oleic acid), and sugar (sucrose) in ethanol extracts (0° C., −10° C., −30° C., −50° C. and −70° C.) without normalization to yield.

Number (4) in original lab report shows, relative peak abundance of pigments (chlorophyll (a) and cannflavin A), fatty acids (linoleic acid and oleic acid), and sugar (sucrose) in ethanol extracts (0° C., −10° C., −30° C., −50° C. and −70° C.). The peak areas of each sample were normalized to yield (see, FIG. 1 in original lab report).

Number (5) in original lab report shows, extracted ion chromatograms of wax (behenyl arachidate) in ethanol extract (0° C.) after evaporation at 50° C. (left) and its relative peak abundance in ethanol extracts (0° C., −10° C., −30° C., −50° C. and −70° C.) after evaporation at 50° C. (right).

Number (6) in original lab report shows, solubility of long chain waxes in ethanol as a function of temperature (Holser and Akin, 2008).

The word "number" as it occurs above, refers to figure numbers in Applicant's original lab report.

CANNFLAVINS. The present disclosure provides methods for extracting cannabis, and where the method selectively increases extraction of one or more cannflavins, such as, Cannflavin A or Cannflavin B, and where the method selective reduces extraction of one or more of, total chlorophyll, of chlorophyll a, of chlorophyll b, of total free fatty acids, of total triglycerides, of total diglycerides, of linoleic acid, of oleic acid, of sugars, and of sucrose. Cannflavins A and B can inhibit production of prostaglandin E2 in human rheumatoid synovial cells, and reduce inflammation of rheumatoid arthritis (see, Rea, Casaretto, Rothstein (2019) Phytochemistry. 164:162-171). Cannflavins A and B can also inhibit production of leukotrienes. Cannflavins A and B are not psychoactive. They are "flavone" compounds, and they have a prenyl side-chain.

The present invention is not to be limited by compositions, reagents, methods, diagnostics, laboratory data, and the like, of the present disclosure. Also, the present invention is not be limited by any preferred embodiments that are disclosed herein. Unless expressly stated otherwise, the above inclusionary embodiments and exclusionary embodiments to systems, devices, reagents, and methods, are also encompassed by the present disclosure but without regard to the catalog number, name of the model, or manufacturer.

What is claimed is:

1. A method for processing cannabis plant matter, wherein the method produces a cannabis extract, and
wherein the method comprises exposing the plant matter to an ethanolic solvent that is initially at a predetermined temperature of zero degrees C. or less,
wherein the exposing takes place in a vessel, and where a result of the exposing is a mixture of the plant matter and the ethanolic solvent, where the temperature of this mixture is at essentially the same temperature of said predetermined temperature zero degrees C. or less, and
wherein mixture comprises a suspension of plant matter and the ethanolic solution, wherein the method includes the steps of:
(a) Exposing the cannabis plant matter to the ethanolic solvent, wherein the exposing produces a suspension of the cannabis plant matter in the ethanolic solvent,
(b) Maintaining the exposing of the plant matter to the ethanolic solvent, wherein the maintaining is for a predetermined time that is optionally ten minutes, and wherein the exposing results in an extracted plant matter residue and also results in an extract that takes the form of the ethanolic solvent with extracted substances,
(c) Separating the extract from the extracted plant matter residue, wherein the extract is optionally maintained at essentially the same temperature of said predetermined zero degrees C. or less, and,
(d) Drying the extract to produce a dried extract, and wherein the step of drying removes the ethanol, and also removes the water, if there was any water.

2. The method of claim 1, wherein the method comprises:
(a) Exposing the plant matter to an ethanolic solvent that is initially at a temperature of minus 30 degrees C. and wherein the steps of exposing, maintaining, and separating, are each conducted at minus 30 degrees C.
(b) Or exposing the plant matter to an ethanolic solvent that is initially at a temperature of minus 50 degrees C. and wherein the steps of exposing, maintaining, and separating, are each conducted at minus 50 degrees C.
(c) Or exposing the plant matter to an ethanolic solvent that is initially at a temperature of minus 70 degrees C. and wherein the steps of exposing, maintaining, and separating, are each conducted at minus 70 degrees C.
(d) Or exposing the plant matter to an ethanolic solvent that is initially at one particular temperature in the range between minus 30 degrees C. and minus 70 degrees C., and wherein the steps of exposing, maintaining, and separating, are each conducted at a temperature that is the same one particular temperature in the range between minus 30 degrees C. and minus 70 degrees C.

3. The method of claim 1, and wherein the temperatures of exposing, maintaining, and separating are each conducted at minus 30 degrees C., and wherein the recoveries of the indicated chemicals at minus 30 degrees C. is compared to recoveries of the same chemicals that can be calculated from a control experiment conducted at zero degrees C.,
wherein the dried extract has a weight (grams), and wherein the value for the weight of the entire dried extract is called a "yield," and wherein the dried extract contains one or more cannabinoids, and wherein the dried extract contains one or more of, chlorophyll a, linoleic acid, oleic acid, a wax, behenyl arachidate (C42), a cannflavin, and cannflavin A, and wherein, the recoveries of one or more or all of:
(i) Cannflavin A (91%)
(ii) Chlorophyll a (19%)
(iii) Linoleic acid (85%)
(iv) Oleic acid (73%)
(v) Sucrose (51%)
(vi) Behenyl arachidate (C42) (41%)
are each at the indicated percentage of that found in the control experiment (control experiment with extracting, maintaining, and separating, that is conducted at zero degrees C.), wherein the values for percentage for the data collected at minus 30 degrees have a range that is defined by the standard deviations (SD) set forth in FIGS. 14 and 15.

4. The method of claim 1, and wherein the temperatures of exposing, maintaining, and separating are each conducted at minus 50 degrees C., and wherein the recoveries of the indicated chemicals at minus 50 degrees C. is compared to recoveries of the same chemicals that can be calculated from a control experiment conducted at zero degrees C.,
wherein the dried extract has a weight (grams), and wherein the value for the weight of the entire dried extract is called a "yield," and wherein the dried extract contains one or more cannabinoids, and wherein the dried extract contains one or more of, chlorophyll a, linoleic acid, oleic acid, a wax, behenyl arachidate (C42), a cannflavin, and cannflavin A, and wherein, the recoveries of one or more or all of:
(i) Cannflavin A (84%)

(ii) Chlorophyll a (22%)
(iii) Linoleic acid (78%)
(iv) Oleic acid (57%)
(v) Sucrose (45%)
(vi) Behenyl arachidate (C42) (38%)

are each at the indicated percentage of that found in the control experiment (control experiment with extracting, maintaining, and separating that is conducted at zero degrees C.), wherein the values for percentage for the data collected at minus 50 degrees have a range that is defined by the standard deviations (SD) set forth in FIGS. 14 and 15.

5. The method of claim 1, and wherein the temperatures of exposing, maintaining, and separating are each conducted at minus 70 degrees C., and wherein the recoveries of the indicated chemicals at minus 70 degrees C. is compared to recoveries of the same chemicals that can be calculated from a control experiment conducted at zero degrees C.,
wherein the dried extract has a weight (grams), and wherein the value for the weight of the entire dried extract is called a "yield," and wherein the dried extract contains one or more cannabinoids, and wherein the dried extract contains one or more of, chlorophyll a, linoleic acid, oleic acid, a wax, behenyl arachidate (C42), a cannflavin, and cannflavin A, and wherein, the recoveries of one or more or all of:
(i) Cannflavin A (81%)
(ii) Chlorophyll a (14%)
(iii) Linoleic acid (76%)
(iv) Oleic acid (47%)
(v) Sucrose (50%)
(vi) Behenyl arachidate (C42) (32%)

are each at the indicated percentage of that found in the control experiment (control experiment with extracting, maintaining, and separating that is conducted at zero degrees C.), and wherein the values for percentage for the data collected at minus 70 degrees have a range that is defined by the standard deviations (SD) set forth in FIGS. 14 and 15.

6. The method of claim 1, further comprising the step of drying the extract, wherein the step of drying produces a substance that comprises one or more of an oil, a powder, a film, a crust, or flakes, or comprises a mixture thereof.

7. The method of claim 1, wherein the suspension is entirely a suspension of the cannabis plant matter in the ethanolic solvent or, alternatively, where the suspension is a partial suspension of the cannabis plant matter in the ethanolic solvent with the remaining cannabis plant matter in constant or in occasional contact with the bottom of the vessel.

8. The method of claim 1, wherein the predetermined time is for two minutes, for four minutes, for six minutes, for eight minutes, for 10 minutes, for 12 minutes, for 14 minutes, or for 16 minutes.

9. The method of claim 1, wherein the predetermined time is for two minutes, for four minutes, for six minutes, for eight minutes, for 10 minutes, for 12 minutes, for 14 minutes, or for 16 minutes, and wherein the period of maintaining the plant matter includes a period of about one minute where the mixture is agitated or shaken, and wherein said period occurs within the first two minutes of exposure.

10. The method of claim 1, wherein the ethanolic solvent is one of, 100% ethanol, 95% ethanol and 5% water (by volume), or 90% ethanol and 10% water (by volume).

11. The method of claim 1, wherein the temperature of the ethanolic solvent prior to mixing, and the temperature of the mixture, is at one of these temperatures:
(a) Minus 30 degrees C.
(b) Minus 35 degrees C.
(c) Minus 40 degrees C.
(d) Minus 45 degrees C.,
(e) Minus 50 degrees C.
(f) Minus 55 degrees C.
(g) Minus 60 degrees C.
(h) Minus 65 degrees C.
(g) Minus 70 degrees C.

12. The method of claim 1, wherein the temperature of the ethanolic solvent prior to mixing, and the temperature of the mixture, is at one of these temperatures:
(a) About minus 30 degrees C.
(b) About minus 35 degrees C.
(c) About minus 40 degrees C.
(d) About minus 45 degrees C.
(e) About minus 50 degrees C.
(f) About minus 55 degrees C.
(g) About minus 60 degrees C.
(h) About minus 65 degrees C.
(g) About minus 70 degrees C.

13. The method of claim 1, wherein the cannabis is *Cannabis sativa*, and wherein the cannabis plant matter comprises by weight:
(a) At least 90% flowers (by weight),
(b) At least 90% leaves (by weight), or
(c) Comprises a mixture, wherein at least 90% of the mixture consists of flowers and leaves (by weight).

14. The method of claim 1, wherein said predetermined temperature is zero degrees C., and wherein the method that is conducted with extraction at zero degrees C. is used to provide control data, and where the control data can be compared with experimental data, and wherein the method is conducted with a predetermined temperature of minus 30 degrees C. or lower, the method conducted at minus 30 degrees C. or lower provides experimental data, and the control data and experimental data can be used in calculations that measure relative enrichment or depletions of one or more of tetrahydrocannabinol (THC), chlorophyll, cannflavin, oleic acid, linoleic acid, and sucrose.

15. The method of claim 1, wherein said predetermined temperature is minus 30 degrees C., minus 40 degrees C., minus 50 degrees C., minus 60 degrees C., or minus 70 degrees C.

16. The method of claim 1, wherein the vessel is an extraction tank, a vat, a tank, a reservoir, a bucket, a flask, or a centrifuge tube.

17. An oil, a slurry, a terpene, an essential oil, a plurality of terpenes, a powder, a vaping solution, an aerosol, a vape juice, an e-liquid, an e-juice, an oral formulation, a suppository, a sublingual formulation, or a dermal formulation, that comprises a composition prepared by the method of claim 1.

18. A device that is an e-cigarette, a vaping device, dermal patch, a pharmaceutical capsule, or a pharmaceutical tablet, that comprises a composition prepared by the method of claim 1.

19. A formulation that comprises the composition prepared by the method of claim 1, wherein the formulation also includes one or more terpenes, and wherein the one or more terpenes are selected from alpha-bisabolol, borneol, camphene, camphor, delta-3-carene, caryophyllene oxide, alpha-cedrene, beta-eudesmol, fenchol, geraniol, guaiol, alpha-humulene, isoborneol, linalool, menthol, nerol, cis-ocimene, trans-ocimene, alpha-phellandrene, alpha-pinene, beta-pinene, sabinene, alpha-terpinene, alpha-terpineol, terpinolene, alpha-guaiene, elemene, farnesene, germacrene B, guaia-1(10),11-diene, trans-2-pinanol, selina-3,7(11)-diene, eudesm-7(11)-en-4-ol, valencene, eudesm-7(11)-en-4-ol, beta-caryophyllene, limonene, and myrcene.

* * * * *